(12) United States Patent
Mao et al.

(10) Patent No.: US 12,033,082 B2
(45) Date of Patent: Jul. 9, 2024

(54) MAINTAINING FIXED SIZES FOR TARGET OBJECTS IN FRAMES

(71) Applicant: QUALCOMM Incorporated, San Diego, CA (US)

(72) Inventors: Songan Mao, Poway, CA (US); Youngmin Huh, San Diego, CA (US); Ehsan Shahrian Varnousfaderani, San Diego, CA (US); Ajit Chourasia, San Diego, CA (US); Donald Gosnell, Escondido, CA (US); Muhua Li, San Diego, CA (US); Denis Mamedov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/476,078

(22) Filed: Sep. 27, 2023

(65) Prior Publication Data

US 2024/0028904 A1 Jan. 25, 2024

Related U.S. Application Data

(63) Continuation of application No. 17/239,300, filed on Apr. 23, 2021, now Pat. No. 11,809,998.

(Continued)

(51) Int. Cl.
*G06T 3/40* (2024.01)
*G06N 3/084* (2023.01)
(Continued)

(52) U.S. Cl.
CPC ............... *G06N 3/084* (2013.01); *G06T 3/40* (2013.01); *G06V 10/235* (2022.01); *G06V 10/25* (2022.01);
(Continued)

(58) Field of Classification Search
CPC ................. H04N 23/631; G06T 3/40
(Continued)

(56) References Cited

U.S. PATENT DOCUMENTS

2009/0251594 A1* 10/2009 Hua .................. H04N 21/2662
348/E7.003
2014/0240553 A1 8/2014 Pylvanainen et al.
(Continued)

FOREIGN PATENT DOCUMENTS

| CN | 111083380 A | 4/2020 |
|---|---|---|
| JP | 2015228113 A | 12/2015 |
| WO | 2020047745 A1 | 3/2020 |

OTHER PUBLICATIONS

International Preliminary Report On Patentability—PCT/US2021/029070—The International Bureau of WIPO—Geneva, Switzerland—Dec. 1, 2022.
(Continued)

*Primary Examiner* — Joel W Fosselman
(74) *Attorney, Agent, or Firm* — QUALCOMM Incorporated

(57) ABSTRACT

Techniques are provided for processing one or more frames. For example, a region of interest can be determined in a first frame of a sequence of frames. The region of interest in the first frame includes an object having a size in the first frame. A portion of a second frame of the sequence of frames (occurring after the first frame in the sequence of frames) can be cropped and scaled to cause the object in the second frame to have a same size (and in some cases a same location) as the object in the first frame.

30 Claims, 56 Drawing Sheets

Related U.S. Application Data

(60) Provisional application No. 63/070,714, filed on Aug. 26, 2020, provisional application No. 63/027,744, filed on May 20, 2020.

(51) Int. Cl.
| | | |
|---|---|---|
| *G06V 10/22* | (2022.01) | |
| *G06V 10/25* | (2022.01) | |
| *G06V 10/32* | (2022.01) | |
| *G06V 10/62* | (2022.01) | |
| *G06V 10/764* | (2022.01) | |
| *G06V 10/82* | (2022.01) | |
| *G06V 20/40* | (2022.01) | |
| *H04N 23/63* | (2023.01) | |

(52) U.S. Cl.
CPC .............. *G06V 10/32* (2022.01); *G06V 10/62* (2022.01); *G06V 10/764* (2022.01); *G06V 10/82* (2022.01); *G06V 20/40* (2022.01); *G06V 20/46* (2022.01); *H04N 23/631* (2023.01)

(58) Field of Classification Search
USPC ........................................ 348/222.1
See application file for complete search history.

(56) References Cited

U.S. PATENT DOCUMENTS

| | | | |
|---|---|---|---|
| 2014/0313329 A1* | 10/2014 | Julien | H04N 23/69 |
| | | | 348/143 |
| 2017/0094184 A1 | 3/2017 | Gao et al. | |
| 2017/0272661 A1 | 9/2017 | Tsubusaki | |
| 2019/0096047 A1 | 3/2019 | Ogasawara | |
| 2021/0051273 A1 | 2/2021 | Zhang et al. | |
| 2021/0365707 A1 | 11/2021 | Mao et al. | |

OTHER PUBLICATIONS

International Search Report and Written Opinion—PCT/US2021/029070—ISA/EPO—Jul. 22, 2021.

* cited by examiner

| block | examplar output size | search output size | backbone |
|---|---|---|---|
| conv1 | 61×61 | 125×125 | 7×7, 64, stride 2 |
| conv2_x | 31×31 | 63×63 | 3×3 max pool, stride 2 $\begin{bmatrix} 1\times1, 64 \\ 3\times3, 64 \\ 1\times1, 256 \end{bmatrix} \times 3$ |
| conv3_x | 15×15 | 31×31 | $\begin{bmatrix} 1\times1, 128 \\ 3\times3, 128 \\ 1\times1, 512 \end{bmatrix} \times 4$ |
| conv4_x | 15×15 | 31×31 | $\begin{bmatrix} 1\times1, 256 \\ 3\times3, 256 \\ 1\times1, 1024 \end{bmatrix} \times 6$ |
| adjust | 15×15 | 31×31 | 1×1, 256 |
| xcorr | 17 × 17 | | depth-wise |

DETERMINE A REGION OF INTEREST IN A FIRST FRAME OF A SEQUENCE OF FRAMES, THE REGION OF INTEREST IN THE FIRST FRAME INCLUDING AN OBJECT HAVING A SIZE IN THE FIRST FRAME
1802

CROP A PORTION OF A SECOND FRAME OF THE SEQUENCE OF FRAMES, THE SECOND FRAME OCCURRING AFTER THE FIRST FRAME IN THE SEQUENCE OF FRAMES
1804

SCALE THE PORTION OF THE SECOND FRAME TO MAINTAIN THE SIZE OF THE OBJECT IN THE SECOND FRAME
1806

FIG. 18

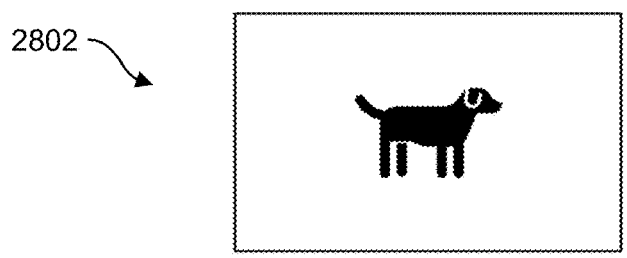
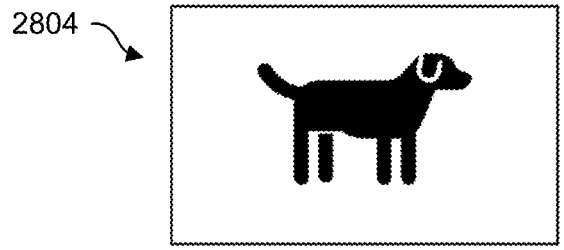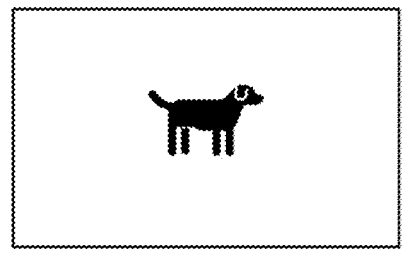
FIG. 28

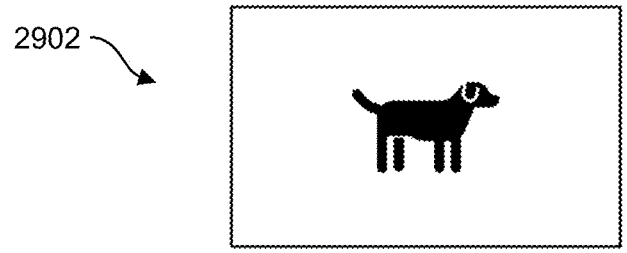
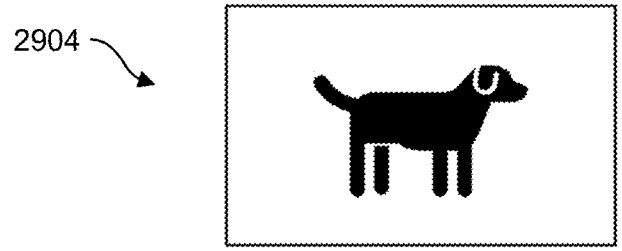
FIG. 29

4 x 4 Feature Map 8 x 8 Feature Map

Image with GT Boxes

MAINTAINING FIXED SIZES FOR TARGET OBJECTS IN FRAMES

CROSS-REFERENCE TO RELATED APPLICATIONS

The present application is a continuation of U.S. Non-Provisional application Ser. No. 17/239,300, filed Apr. 23, 2021, entitled "MAINTAINING FIXED SIZES FOR TARGET OBJECTS IN FRAMES", which claims the benefit of U.S. Provisional Application No. 63/027,744, filed May 20, 2020, entitled "MAINTAINING FIXED SIZES FOR TARGET OBJECTS IN FRAMES" and the benefit of U.S. Provisional Application No. 63/070,714, filed Aug. 26, 2020, entitled "MAINTAINING FIXED SIZES FOR TARGET OBJECTS IN FRAMES," all of which are hereby incorporated by reference in their entirety and for all purposes.

FIELD

The present disclosure generally relates to video analytics, and more specifically to techniques and systems for maintaining a consistent (e.g., fixed or nearly fixed) size for a target object in one or more frames (e.g., in video analytics, for recorded video, among other uses).

BACKGROUND

Many devices and systems allow a scene to be captured by generating images (or frames) and/or video data (including multiple frames) of the scene. For example, a camera or a computing device including a camera (e.g., a mobile device such as a mobile telephone or smartphone including one or more cameras) can capture a sequence of frames of a scene. In another example, an Internet protocol camera (IP camera) is a type of digital video camera that can be employed for surveillance or other applications. Unlike analog closed circuit television (CCTV) cameras, an IP camera can send and receive data via a computer network and the Internet.

The image and/or video data can be captured and processed by such devices and systems (e.g., mobile devices, IP cameras, etc.) and can be output for consumption (e.g., displayed on the device and/or other device). In some cases, the image and/or video data can be captured by such devices and systems and output for processing and/or consumption by other devices.

SUMMARY

In some examples, techniques and systems are described for processing one or more frames of image or video data to maintain a fixed size for a target object (also referred to as an object of interest) in the one or more frames. According to at least one illustrative example, a method of one or more frames is provided. The method includes: determining a region of interest in a first frame of a sequence of frames, the region of interest in the first frame including an object having a size in the first frame; cropping a portion of a second frame of the sequence of frames, the second frame occurring after the first frame in the sequence of frames; and scaling the portion of the second frame based on the size of the object in the first frame.

In another example, an apparatus for processing one or more frames is provided that includes a memory configured to store at least one frame and one or more processors implemented in circuitry and coupled to the memory. The one or more processors are configured to and can: determine a region of interest in a first frame of a sequence of frames, the region of interest in the first frame including an object having a size in the first frame; crop a portion of a second frame of the sequence of frames, the second frame occurring after the first frame in the sequence of frames; and scale the portion of the second frame based on the size of the object in the first frame.

In another example, a non-transitory computer-readable medium is provided that has stored thereon instructions that, when executed by one or more processors, cause the one or more processors to: determine a region of interest in a first frame of a sequence of frames, the region of interest in the first frame including an object having a size in the first frame; crop a portion of a second frame of the sequence of frames, the second frame occurring after the first frame in the sequence of frames; and scale the portion of the second frame based on the size of the object in the first frame.

In another example, an apparatus for processing one or more frames is provided. The apparatus includes: means for determining a region of interest in a first frame of a sequence of frames, the region of interest in the first frame including an object having a size in the first frame; means for cropping a portion of a second frame of the sequence of frames, the second frame occurring after the first frame in the sequence of frames; and means for scaling the portion of the second frame based on the size of the object in the first frame.

In some aspects, the method, apparatuses, and computer-readable medium described above further comprise: receiving user input corresponding to a selection of the object in the first frame; and determining the region of interest in the first frame based on the received user input. In some aspects, the user input includes a touch input provided using a touch interface of a device.

In some aspects, the method, apparatuses, and computer-readable medium described above further comprise: determining a point of an object region determined for the object in the second frame; and cropping and scaling the portion of the second frame with the point of the object region in a center of the cropped and scaled portion.

In some aspects, the point of the object region is a center point of the object region. In some cases, the object region is a bounding box (or other bounding region). The center point can be a center point of the bounding box (or other region region), a center point of the object (e.g., the object's center of mass or center point).

In some aspects, scaling the portion of the second frame based on the size of the object in the first frame causes the object in the second frame to have a same size as the object in the first frame.

In some aspects, the method, apparatuses, and computer-readable medium described above further comprise: determining a first length associated with the object in the first frame; determining a second length associated with the object in the second frame; determining a scaling factor based on a comparison between the first length and the second length; and scaling the portion of the second frame based on the scaling factor.

In some aspects, the first length is a length of a first object region determined for the object in the first frame, and wherein the second length is a length of a second object region determined for the object in the second frame. In some aspects, the first object region is a first bounding box and the first length is a diagonal length of the first bounding box, and wherein the second object region is a second bounding box and the second length is a diagonal length of the second bounding box.

In some aspects, scaling the portion of the second frame based on the scaling factor causes the second object region in the cropped and scaled portion to have a same size as the first object region in the first frame.

In some aspects, the method, apparatuses, and computer-readable medium described above further comprise: determining a point of a first object region generated for the object in the first frame; determining a point of a second object region generated for the object in the second frame; determining a movement factor for the object based on a smoothing function using the point of the first object region and the point of the second object region, wherein the smoothing function controls a change in position of the object in a plurality of frames of the sequence of frames; and cropping the portion of the second frame based on the movement factor.

In some aspects, the point of the first object region is a center point of the first object region, and wherein the point of the second object region is a center point of the second object region.

In some aspects, the smoothing function includes a moving function, the moving function being used to determine a location of the point of a respective object region in each of the plurality of frames of the sequence of frames based on a statistical measure of object movement.

In some aspects, the method, apparatuses, and computer-readable medium described above further comprise: determining a first length associated with the object in the first frame; determining a second length associated with the object in the second frame; determining a scaling factor for the object based on a comparison between the first length and the second length and based on a smoothing function using the first length and the second length, wherein the smoothing function controls a change in size of the object in a plurality of frames of the sequence of frames; and scaling the portion of the second frame based on the scaling factor.

In some aspects, the smoothing function includes a moving function, the moving function being used to determine a length associated with the object in each of the plurality of frames of the sequence of frames based on a statistical measure of object size.

In some aspects, the first length is a length of a first bounding box generated for the object in the first frame, and wherein the second length is a length of a second bounding box generated for the object in the second frame.

In some aspects, the first length is a diagonal length of the first bounding box, and wherein the second length is a diagonal length of the second bounding box.

In some aspects, scaling the portion of the second frame based on the scaling factor causes the second bounding box in the cropped and scaled portion to have a same size as the first bounding box in the first frame.

In some aspects, the cropping and scaling of the portion of the second frame maintains the object in a center of the second frame.

In some aspects, the method, apparatuses, and computer-readable medium described above further comprise: detecting and tracking the object in one or more frames of the sequence of frames.

In some aspects, the apparatus comprises a camera (e.g., an IP camera), a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, or other device. In some aspects, the apparatus includes a camera or multiple cameras for capturing one or more images. In some aspects, the apparatus further includes a display for displaying one or more images, notifications, and/or other displayable data.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 6C is a diagram illustrating an example of a backbone architecture for a machine learning based tracking system, in accordance with some examples;

FIG. 18 is a flow diagram illustrating an example of a process for processing one or more frames, in accordance with some examples;

FIG. 27-FIG. 36 are diagrams illustrating examples of using camera lens switching techniques described herein, in accordance with some examples;

DETAILED DESCRIPTION

Figure 1:
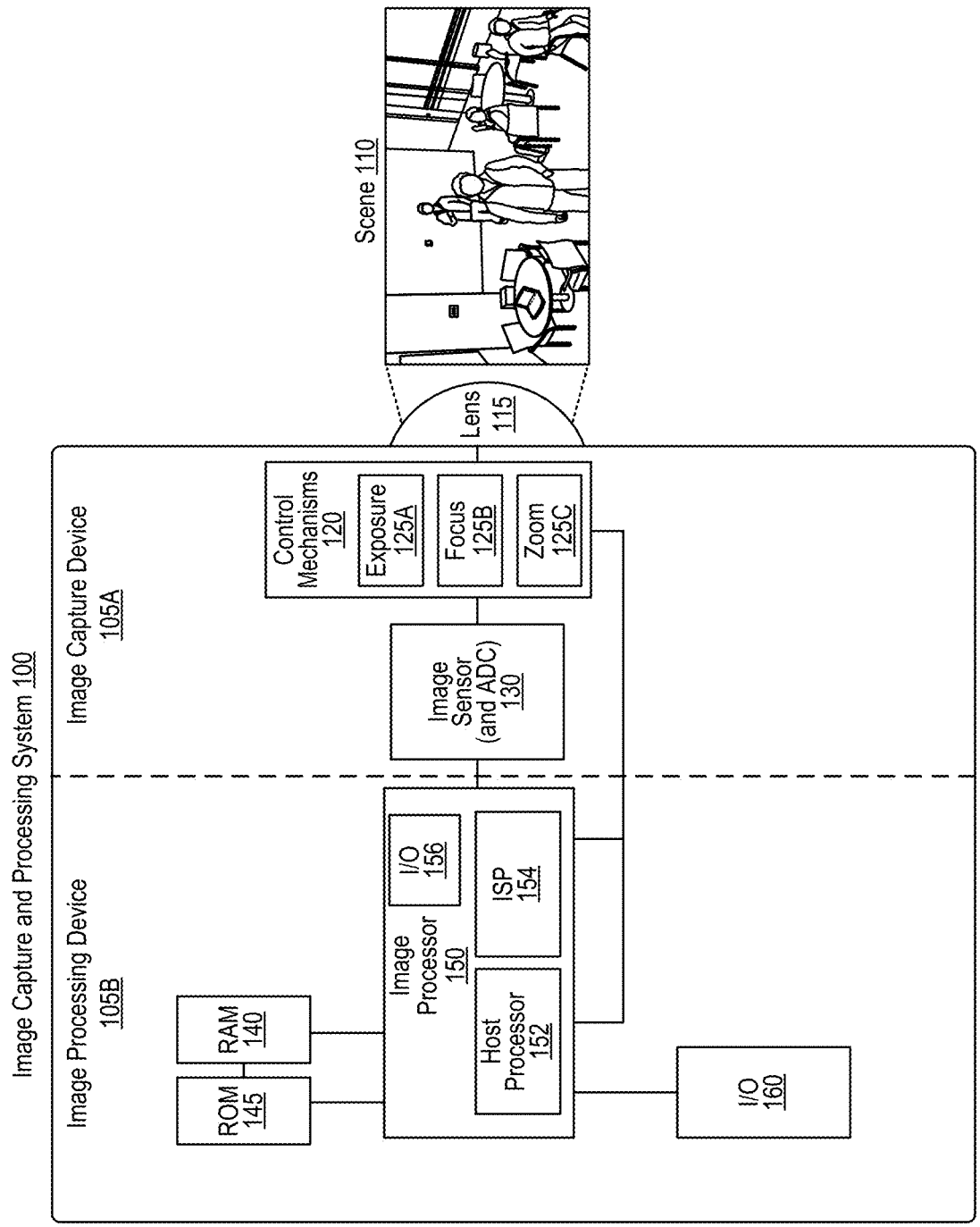
FIG. 1 is a block diagram illustrating an example architecture of an image capture and processing system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

An image capture device (e.g., a camera or a device including a camera) is a device that receives light and captures image frames, such as still images or video frames, using an image sensor. The terms "image," "image frame," and "frame" are used interchangeably herein. Cameras of image capture devices can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

Cameras may include or be in communication with processors, such as ISPs, that can receive one or more image frames from an image sensor and process the one or more image frames. For instance, a raw image frame captured by a camera sensor can be processed by an ISP to generate a final image. In some examples, an ISP can process an image frame using a plurality of filters or processing blocks that are applied to the captured image frame, such as demosaicing, gain adjustment, white balance adjustment, color balancing or correction, gamma compression, tone mapping or adjustment, denoising or noise filtering, edge enhancement, contrast adjustment, intensity adjustment (such as darkening or lightening), among others. In some examples, an ISP can include a machine learning system (e.g., one or more neural networks and/or other machine learning components) that can process an image frame and output a processed image frame.

In various scenarios (e.g., mobile imaging, video analytics, among other use cases), it can be desirable to maintain a size of a region of interest and/or object of interest (or target object) from frame-to-frame in sequence of frames (e.g., a video), even as the region of interest and/or object moves relative to one or more cameras capturing the sequence of frames. For example, when imaging a person playing soccer in a video capture scenario, it can be desirable to maintain a constant size of the person throughout the video even as the person moves relative to the camera (e.g., towards and away from the camera, laterally with respect to the camera, etc.). In another example, with respect to video analytics, it can be desirable to maintain a size of a tracked object (e.g., a delivery person) throughout a video clip captured by one or more Internet Protocol (IP) camera systems.

Image capture devices have increasing ranges of effective zoom. For example, multi-camera systems can be designed to allow for a range of zoom that is greater than the digital zoom range of a single camera. However, when a user is attempting to record a video of an object that is moving (e.g., a person playing soccer) and has already tuned the camera zoom so that the object has a desired size in the frame, the size ratio of the object (the size of the object relative to the frame, referred to as an object size-to-frame ratio) will dynamically change as the object moves. It can be difficult to maintain a desired object size (e.g., the size of an object in an original frame when a video capture is first initiated) in a sequence of frames as the object moves relative to the one or more cameras capturing the sequence of frames. For instance, it can be tedious for a user to manually change the object size-to-frame ratio during capture of the video. It can also be difficult to track (e.g., automatically track) a subject during a video recording.

Systems, apparatuses, processes (also referred to as methods), and computer-readable media (collectively referred to as "systems and techniques") are described herein for maintaining a fixed size for a target object in a sequence of frames (referred to as a "target fix size feature"). The sequence of frames can be a video, a group of consecutively captured images, or other sequence of frames. For example, the systems and techniques described herein can determine a region of interest in a first frame (or initial frame). In some cases, a user can select the first frame. For instance, in some examples, a user can select any frame from a video as a starting point. In some examples, the systems and techniques can determine the region of interest based on a selection by a user of the region of interest or an object in the region of interest. In some cases, the selection by the user can be based on user input provided using a user interface (e.g., a touchscreen of a device, an electronic drawing tool, a gesture-based user interface, a voice input based user interface, or other user interface). In some examples, the systems and techniques can determine the region of interest automatically based on object detection and/or recognition techniques. For instance, the systems and techniques can detect and/or recognize a person in a frame, and can define a region of interest around the person.

In some cases, the systems and techniques can determine a size of the object and/or the region of interest in the first (or initial) frame when the region of interest is determined (e.g., when the user input is provided identifying the object or the region of interest including the object). In some cases, a user can provide input (e.g., zoom by providing a pinch input) to define a desired size of the object or region of interest, or can keep the size of the object as it is in the first/initial frame. In some cases, a user can provide input that causes a device to adjust the size of the region of interest and/or the object in order to define a preferred size for the object in the sequence of frames. The systems and techniques can crop and scale (e.g., upsample) one or more subsequent frames (occurring after the first or initial frame) in a sequence of frames in order to maintain the size of the object in each subsequent frame to match the size of the object in the first frame when the region of interest was determined (e.g., at the time of selection of the object by the user). In some cases, the systems and techniques can perform the cropping and scaling so that the selected object is maintained with the same size as that of the object in the first frame and also so that the object is maintained at a particular location in each frame (e.g., at the center of each frame, at a position in the frame where the object was located in the first frame, or other location). In some examples, the systems and techniques can utilize object detection and tracking techniques in order to keep an object position and/or size unchanged in a sequence of frames.

In some examples, the systems and techniques can apply one or more smoothing functions to the object or to a bounding box (or other type of bounding region) associated with the region of interest including object. The one or more smoothing functions can cause the cropping and scaling to be performed gradually in order to minimize the frame-to-frame movement and re-sizing of the object in the sequence of frames. Application of the smoothing function(s) can prevent an object from appearing to move in an unnatural (e.g., jumpy) manner in the sequence of frames due to the cropping and scaling that is performed to maintain the object with a particular size and/or in a particular location in each frame. In some implementations, a smoothing function can account for displacement (movement within the frames) and/or bounding box size changes (object size changes regardless of center point). In some cases, the displacement can be with respect to a point (e.g., a center point) on the object or a point (e.g., a center point) within a bounding box associated with the region of interest including object. In some cases, the bounding box size changes can include a change relative to a distance associated with the object (e.g., a distance between a first part of the object and a second part of the object) or a distance associated with the bounding box (e.g., a diagonal distance of the bounding box) corresponding to the region of interest including object.

The systems and techniques can be applied for video playback in some examples. The systems and techniques can be applied for other use cases in other examples. For instance, the systems and techniques can generate a video result with a consistent (e.g., fixed or nearly fixed so that the size change is imperceptible to the user viewing the video) target object size at a particular point (e.g., at the center point) in the frames of the video sequence. Multiple video resources can be supported.

In some examples, a device can implement one or more dual camera mode features. For example, the dual camera mode features can be implemented by simultaneously using two camera lenses of a device, such as a primary camera lens (e.g., a telephoto lens) and a secondary camera lens (e.g., a zoom lens, such as a wide angle lens) of the device. An example of a dual camera mode feature is a "dual camera video recording" feature, where the two camera lenses simultaneously record two videos. The two videos can then be displayed, stored, transmitted to another device, and/or otherwise used. Using a dual camera mode feature (e.g., dual camera video recording), a device can display two perspectives of a scene at one time (e.g., split-screen videos) on a display. Advantages of the dual camera mode features can include allowing a device to capture a wide view of a scene (e.g., with more of the background and surrounding objects in the scene), allowing the device to capture large scale events or the full view of a scene, among other advantages.

For a video (or for another sequence of frames or images) captured using a single camera, various problems can occur with respect to maintaining a fixed size for a target object in a sequence of frames. For example, when a target object moves towards the camera of a device, a device may not be able to perform a zoom out effect because of the limitation of the field of view from the original video frame. In another example, when a target object moves away from the camera of the device, a zoomed-in image generated based on the original video frame may be blurry, may include one or more visual artifacts, and/or may lack sharpness. Devices that implement dual camera mode features do not incorporate any artificial intelligent technologies. Such systems require end users to use video editing tools or software applications to manually edit the images.

Systems and techniques are also described herein for switching between lenses or cameras of devices that can implement the one or more dual camera mode features noted above. For example, the systems and techniques can use a camera lens switching algorithm in dual camera systems for maintaining a fixed size for a target object in a sequence of frames of videos from the dual camera systems. In some cases, the systems and techniques can perform dual camera zooming. In some cases, the systems and techniques can provide a more detailed object zooming effect. In some examples, the systems and techniques can be applied to systems or devices having more than two cameras that are used to capture videos or other sequences of frames.

Using such systems and techniques, a video can be generated or recorded with a consistent (e.g., fixed or nearly fixed so that the size change is imperceptible to the user viewing the video) target object size at a particular point (e.g., at the center point) in the frames of the video sequence. The zooming based systems and techniques can be applied for real-time video recording, for capturing still images (e.g., a photograph), and/or for other use cases. In some cases, a user can select an object of interest, or the system can automatically determine a salient object (object of interest). Multi-camera system support is also provided, as described above.

The techniques described herein can be applied by any type of image capture device, such as a mobile device including one or more cameras, an IP camera, a camera device such as a digital camera, and/or other image capture device. The systems and techniques can be applied to any type of content that includes a sequence of frames or images, such as pre-recorded video content, live video content (e.g., video that is not pre-recorded), or other content.

Various aspects of the systems and techniques described herein will be discussed below with respect to the figures. FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward an image sensor 130. The light received by the lens 115 passes through an aperture controlled by one or more control mechanisms 120 and is received by an image sensor 130.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters of a color filter array, and may thus measure light matching the color of the color filter covering the photodiode. Various color filter arrays can be used, including a Bayer color filter array, a quad color filter array (also referred to as a quad Bayer filter), and/or other color filter array. For instance, Bayer color filter arrays include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filter arrays may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 4710 discussed with respect to the computing system 4700. The host processor 152 can be a digital signal processor (DSP) and/or other type of processor. The image processor 150 may store image frames and/or processed images in random access memory (RAM) 140/4720, read-only memory (ROM) 145/4725, a cache 4712, a system memory 4715, another storage device 4730, or some combination thereof.

In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The host processor 152 of the image processor 150 can configure the image sensor 130 with parameter settings (e.g., via an external control interface such as I2C, I3C, SPI, GPIO, and/or other interface). In one illustrative example, the host processor 152 can update exposure settings used by the image sensor 130 based on internal processing results of an exposure control algorithm from past image frames. The host processor 152 can also dynamically configure the parameter settings of the internal pipelines or modules of the ISP 154 to match the settings of one or more input image frames from the image sensor 130 so that the image data is correctly processed by the ISP 154. Processing (or pipeline) blocks or modules of the ISP 154 can include modules for lens/sensor noise correction, de-mosaicing, color conversion, correction or enhancement/suppression of image attributes, denoising filters, sharpening filters, among others. For example, the processing blocks or modules of the ISP 154 can perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The settings of different modules of the ISP 154 can be configured by the host processor 152.

The image processing device 105B can include various input/output (I/O) devices 160 connected to the image processor 150. The I/O devices 160 can include a display screen, a keyboard, a keypad, a touchscreen, a trackpad, a touch-sensitive surface, a printer, any other output devices 4735, any other input devices 4745, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the system 100 and one or more peripheral devices, over which the system 100 may receive data from the one or more peripheral device and/or transmit data to the one or more peripheral devices. The I/O 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include or be part of an electronic device, such as a mobile or stationary telephone handset (e.g., smartphone, cellular telephone, or the like), an Internet Protocol (IP) camera, a desktop computer, a laptop or notebook computer, a tablet computer, a set-top box, a television, a camera, a display device, a digital media player, a video gaming console, a video streaming device, or any other suitable electronic device. In some examples, the image capture and processing system 100 can include one or more wireless transceivers for wireless communications, such as cellular network communications, 802.11 Wi-Fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

In some examples, the image capture and processing system 100 can be implemented as part of a system that can be used for performing object detection and/or tracking of objects from frames of a video. One example of such a system is a video analytics system. Object detection and tracking is an important component in a wide range of applications in computer vision, such as surveillance cameras, human-computer interaction, among others. Given an initialized state (e.g., position and size) of a target object (or object of interest) in a frame of a video, a goal of tracking is to estimate the states of the target in the subsequent frames. Object detection and tracking systems (e.g., video analytics systems) have the ability to output patches (e.g., bounding boxes) as detection and tracking results for each frame of a video. Based on those patches, a blob or object classification technique (e.g., neural network-based classification) can be applied to determine whether the object should be classified as a certain type of object (e.g., as a car or a person). One task of object detection, recognition, and tracking is to analyze movement and behavior of an object in the video. The advantage of such a task is that the video analytics system can access a high resolution (e.g., 1080p, 4K, or 8K) video frame to potentially have access to more details for the tracked object.

In general, a video analytics system can obtain a sequence of video frames from a video source and can process the video sequence to perform a variety of tasks. One example of a video source can include an IP camera or other video capture device. An IP camera is a type of digital video camera that can be used for surveillance, home security, and/or other suitable application. Unlike analog closed circuit television (CCTV) cameras, an IP camera can send and receive data via a computer network and the Internet. In some instances, one or more IP cameras can be located in a scene or an environment, and can remain static while capturing video sequences of the scene or environment.

In some cases, IP camera systems can be used for two-way communications. For example, data (e.g., audio, video, metadata, or the like) can be transmitted by an IP camera using one or more network cables or using a wireless network, allowing users to communicate with what they are seeing. In one illustrative example, a gas station clerk can assist a customer with how to use a pay pump using video data provided from an IP camera (e.g., by viewing the customer's actions at the pay pump). Commands can also be transmitted for pan, tilt, zoom (PTZ) cameras via a single network or multiple networks. Furthermore, IP camera systems provide flexibility and wireless capabilities. For example, IP cameras provide for easy connection to a network, adjustable camera location, and remote accessibility to the service over Internet. IP camera systems also provide for distributed intelligence. For example, with IP cameras, video analytics can be placed in the camera itself. Encryption and authentication is also easily provided with IP cameras. For instance, IP cameras offer secure data transmission through already defined encryption and authentication methods for IP based applications. Even further, labor cost efficiency is increased with IP cameras. For example, video analytics can produce alarms for certain events, which reduces the labor cost in monitoring all cameras (based on the alarms) in a system.

Video analytics provides a variety of tasks ranging from immediate detection of events of interest, to analysis of pre-recorded video for the purpose of extracting events in a long period of time, as well as many other tasks. Various research studies and real-life experiences indicate that in a surveillance system, for example, a human operator typically cannot remain alert and attentive for more than 20 minutes, even when monitoring the pictures from one camera. When there are two or more cameras to monitor or as time goes beyond a certain period of time (e.g., 20 minutes), the operator's ability to monitor the video and effectively respond to events is significantly compromised. Video analytics can automatically analyze the video sequences from the cameras and send alarms for events of interest. This way, the human operator can monitor one or more scenes in a passive mode. Furthermore, video analytics can analyze a huge volume of recorded video and can extract specific video segments containing an event of interest.

Video analytics also provides various other features. For example, video analytics can operate as an Intelligent Video Motion Detector by detecting moving objects and by tracking moving objects. In some cases, the video analytics can generate and display a bounding box around a valid object. Video analytics can also act as an intrusion detector, a video counter (e.g., by counting people, objects, vehicles, or the like), a camera tamper detector, an object left detector, an object/asset removal detector, an asset protector, a loitering detector, and/or as a slip and fall detector. Video analytics can further be used to perform various types of recognition functions, such as face detection and recognition, license plate recognition, object recognition (e.g., bags, logos, body marks, or the like), or other recognition functions. In some cases, video analytics can be trained to recognize certain objects. Another function that can be performed by video analytics includes providing demographics for customer metrics (e.g., customer counts, gender, age, amount of time spent, and other suitable metrics). Video analytics can also perform video search (e.g., extracting basic activity for a given region) and video summary (e.g., extraction of the key movements). In some instances, event detection can be performed by video analytics, including detection of fire, smoke, fighting, crowd formation, or any other suitable even the video analytics is programmed to or learns to detect. A detector can trigger the detection of an event of interest and can send an alert or alarm to a central control room to alert a user of the event of interest.

In some cases, as described in more detail herein, a video analytics system can generate and detect foreground blobs that can be used to perform various operations, such as object tracking (also called blob tracking) and/or the other operations described above. An object tracker (also referred to as a blob tracker in some cases) can be used to track one or more objects (or blobs representing objects) in a video sequence using one or more bounding regions. A bounding region can include a bounding box, a bounding circle, a bounding ellipse, or any other suitably-shaped region representing an object and/or a region of interest. Details of an example video analytics system with blob detection and object tracking are described below with respect to FIG. 2-FIG. 5.

Figure 2:
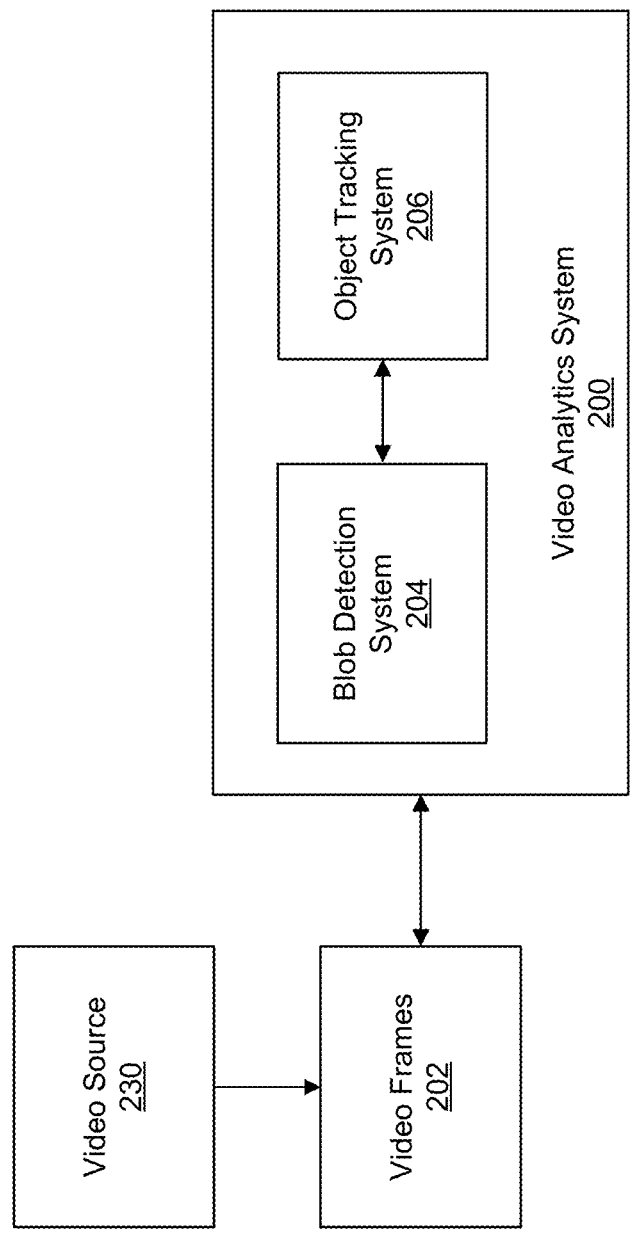
FIG. 2 is a block diagram illustrating an example of a system including a video source and a video analytics system, in accordance with some examples.

FIG. 2 is a block diagram illustrating an example of a video analytics system 200. The video analytics system 200 receives video frames 202 from a video source 230. The video frames 202 can also be referred to herein as a sequence of frames. Each frame can also be referred to as a video picture or a picture. The video frames 202 can be part of one or more video sequences. The video source 230 can include an image capture device (e.g., the image capture and processing system 100, a video camera, a camera phone, a video phone, or other suitable capture device), a video storage device, a video archive containing stored video, a video server or content provider providing video data, a video feed interface receiving video from a video server or content provider, a computer graphics system for generating computer graphics video data, a combination of such sources, or other source of video content. In one example, the video source 230 can include an IP camera or multiple IP cameras. In an illustrative example, multiple IP cameras can be located throughout an environment, and can provide the video frames 202 to the video analytics system 200. For instance, the IP cameras can be placed at various fields of view within the environment so that surveillance can be performed based on the captured video frames 202 of the environment.

In some embodiments, the video analytics system 200 and the video source 230 can be part of the same computing device. In some embodiments, the video analytics system 200 and the video source 230 can be part of separate computing devices. In some examples, the computing device (or devices) can include one or more wireless transceivers for wireless communications. The computing device (or devices) can include an electronic device, such as a camera (e.g., an IP camera or other video camera, a camera phone, a video phone, or other suitable capture device), a mobile or stationary telephone handset (e.g., smartphone, cellular telephone, or the like), a desktop computer, a laptop or notebook computer, a tablet computer, a set-top box, a television, a display device, a digital media player, a video gaming console, a video streaming device, or any other suitable electronic device.

The video analytics system 200 includes a blob detection system 204 and an object tracking system 206. Object detection and tracking allows the video analytics system 200 to provide various end-to-end features, such as the video analytics features described above. For example, intelligent motion detection and tracking, intrusion detection, and other features can directly use the results from object detection and tracking to generate end-to-end events. Other features, such as people, vehicle, or other object counting and classification can be greatly simplified based on the results of object detection and tracking. The blob detection system 204 can detect one or more blobs in video frames (e.g., video frames 202) of a video sequence, and the object tracking system 206 can track the one or more blobs across the frames of the video sequence. The object tracking system 206 can be based on any type of object tracking algorithm, such as cost-based tracking, machine learning based tracking, among others.

As used herein, a blob refers to foreground pixels of at least a portion of an object (e.g., a portion of an object or an entire object) in a video frame. For example, a blob can include a contiguous group of pixels making up at least a portion of a foreground object in a video frame. In another example, a blob can refer to a contiguous group of pixels making up at least a portion of a background object in a frame of image data. A blob can also be referred to as an object, a portion of an object, a blotch of pixels, a pixel patch, a cluster of pixels, a blot of pixels, a spot of pixels, a mass of pixels, or any other term referring to a group of pixels of an object or portion thereof. In some examples, a bounding region can be associated with a blob. In some examples, a tracker can also be represented by a tracker bounding region. A bounding region of a blob or tracker can include a bounding box, a bounding circle, a bounding ellipse, or any other suitably-shaped region representing a tracker and/or a blob. While examples are described herein using bounding boxes for illustrative purposes, the techniques and systems described herein can also apply using other suitably shaped bounding regions. A bounding box associated with a tracker and/or a blob can have a rectangular shape, a square shape, or other suitable shape. In the tracking layer, in case there is no need to know how the blob is formulated within a bounding box, the term blob and bounding box may be used interchangeably.

As described in more detail below, blobs can be tracked using blob trackers. A blob tracker can be associated with a tracker bounding box and can be assigned a tracker identifier (ID). In some examples, a bounding box for a blob tracker in a current frame can be the bounding box of a previous blob in a previous frame for which the blob tracker was associated. For instance, when the blob tracker is updated in the previous frame (after being associated with the previous blob in the previous frame), updated information for the blob tracker can include the tracking information for the previous frame and also prediction of a location of the blob tracker in the next frame (which is the current frame in this example). The prediction of the location of the blob tracker in the current frame can be based on the location of the blob in the previous frame. A history or motion model can be maintained for a blob tracker, including a history of various states, a history of the velocity, and a history of location, of continuous frames, for the blob tracker, as described in more detail below.

In some examples, a motion model for a blob tracker can determine and maintain two locations of the blob tracker for each frame. For example, a first location for a blob tracker for a current frame can include a predicted location in the current frame. The first location is referred to herein as the predicted location. The predicted location of the blob tracker in the current frame includes a location in a previous frame of a blob with which the blob tracker was associated. Hence, the location of the blob associated with the blob tracker in the previous frame can be used as the predicted location of the blob tracker in the current frame. A second location for the blob tracker for the current frame can include a location in the current frame of a blob with which the tracker is associated in the current frame. The second location is referred to herein as the actual location. Accordingly, the location in the current frame of a blob associated with the blob tracker is used as the actual location of the blob tracker in the current frame. The actual location of the blob tracker in the current frame can be used as the predicted location of the blob tracker in a next frame. The location of the blobs can include the locations of the bounding boxes of the blobs.

The velocity of a blob tracker can include the displacement of a blob tracker between consecutive frames. For example, the displacement can be determined between the centers (or centroids) of two bounding boxes for the blob tracker in two consecutive frames. In one illustrative example, the velocity of a blob tracker can be defined as $V_t = C_t - C_{t-1}$, where $C_t - C_{t-1} = (C_{tx} - C_{t-1x}, C_{ty} - C_{t-1y})$. The term $C_t$ ($C_{tx}$, $C_{ty}$) denotes the center position of a bounding box of the tracker in a current frame, with $C_{tx}$ being the x-coordinate of the bounding box, and $C_{ty}$ being the y-coordinate of the bounding box. The term $C_{t-1}(C_{t-1x}, C_{t-1y})$ denotes the center position (x and y) of a bounding box of the tracker in a previous frame. In some implementations, it is also possible to use four parameters to estimate x, y, width, height at the same time. In some cases, because the timing for video frame data is constant or at least not dramatically different overtime (according to the frame rate, such as 30 frames per second, 60 frames per second, 120 frames per second, or other suitable frame rate), a time variable may not be needed in the velocity calculation. In some cases, a time constant can be used (according to the instant frame rate) and/or a timestamp can be used.

Using the blob detection system 204 and the object tracking system 206, the video analytics system 200 can perform blob generation and detection for each frame or picture of a video sequence. For example, the blob detection system 204 can perform background subtraction for a frame, and can then detect foreground pixels in the frame. Foreground blobs are generated from the foreground pixels using morphology operations and spatial analysis. Further, blob trackers from previous frames need to be associated with the foreground blobs in a current frame, and also need to be updated. Both the data association of trackers with blobs and tracker updates can rely on a cost function calculation. For example, when blobs are detected from a current input video frame, the blob trackers from the previous frame can be associated with the detected blobs according to a cost calculation. Trackers are then updated according to the data association, including updating the state and location of the trackers so that tracking of objects in the current frame can be fulfilled. Further details related to the blob detection system 204 and the object tracking system 206 are described with respect to FIG. 4 and FIG. 5.

Figure 3:
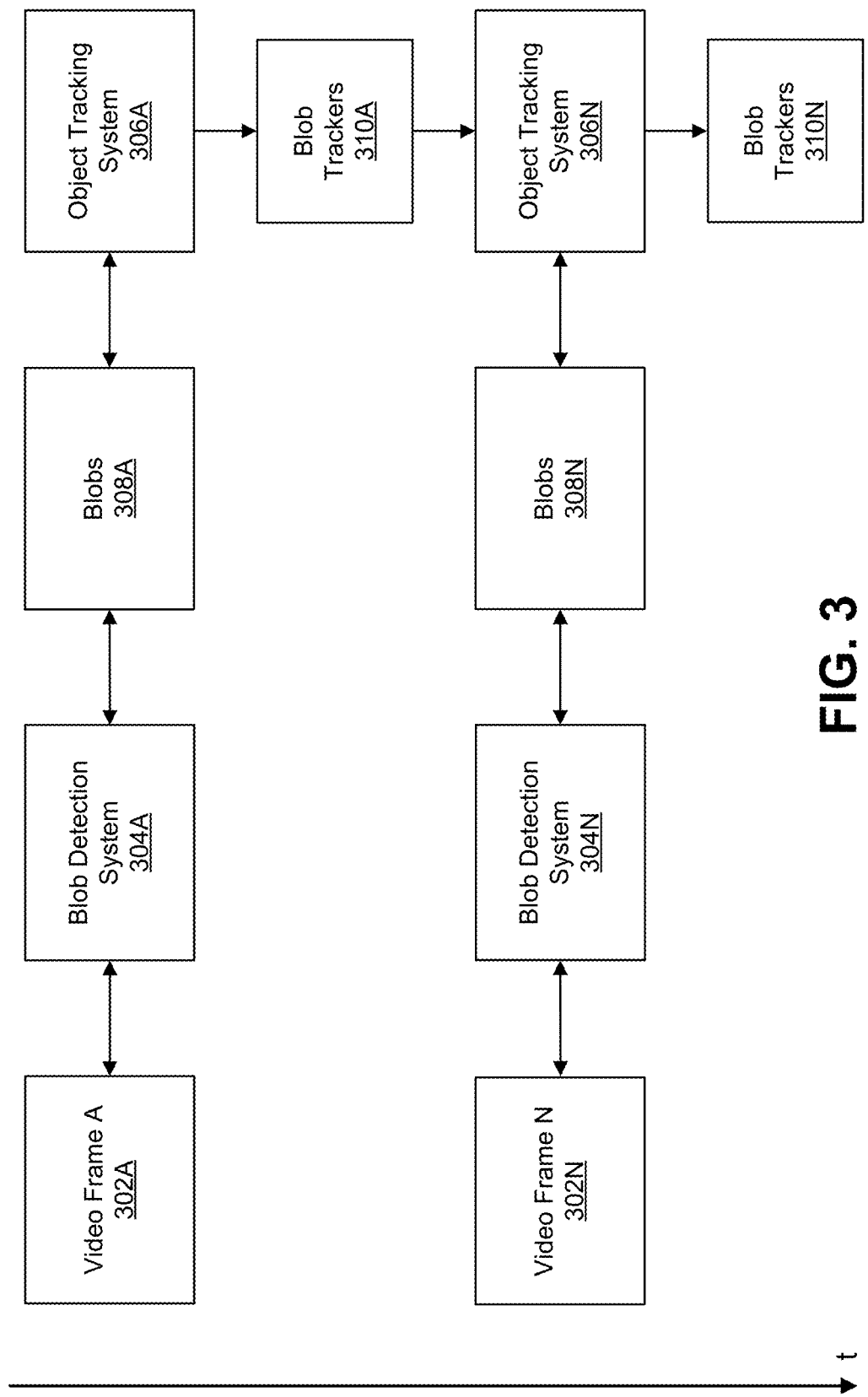
FIG. 3 is an example of a video analytics system processing video frames, in accordance with some examples.

FIG. 3 is an example of the video analytics system (e.g., video analytics system 200) processing video frames across time t. As shown in FIG. 3, a video frame A 302A is received by a blob detection system 304A. The blob detection system 304A generates foreground blobs 308A for the current frame A 302A. After blob detection is performed, the foreground blobs 308A can be used for temporal tracking by the object tracking system 306A. Costs (e.g., a cost including a distance, a weighted distance, or other cost) between blob trackers and blobs can be calculated by the object tracking system 306A. The object tracking system 306A can perform data association to associate or match the blob trackers (e.g., blob trackers generated or updated based on a previous frame or newly generated blob trackers) and blobs 308A using the calculated costs (e.g., using a cost matrix or other suitable association technique). The blob trackers can be updated, including in terms of positions of the trackers, according to the data association to generate updated blob trackers 310A. For example, a blob tracker's state and location for the video frame A 302A can be calculated and updated. The blob tracker's location in a next video frame N 302N can also be predicted from the current video frame A 302A. For example, the predicted location of a blob tracker for the next video frame N 302N can include the location of the blob tracker (and its associated blob) in the current video frame A 302A. Tracking of blobs of the current frame A 302A can be performed once the updated blob trackers 310A are generated.

When a next video frame N 302N is received, the blob detection system 304N generates foreground blobs 308N for the frame N 302N. The object tracking system 306N can then perform temporal tracking of the blobs 308N. For example, the object tracking system 306N obtains the blob trackers 310A that were updated based on the prior video frame A 302A. The object tracking system 306N can then calculate a cost and can associate the blob trackers 310A and the blobs 308N using the newly calculated cost. The blob trackers 310A can be updated according to the data association to generate updated blob trackers 310N.

Figure 4:
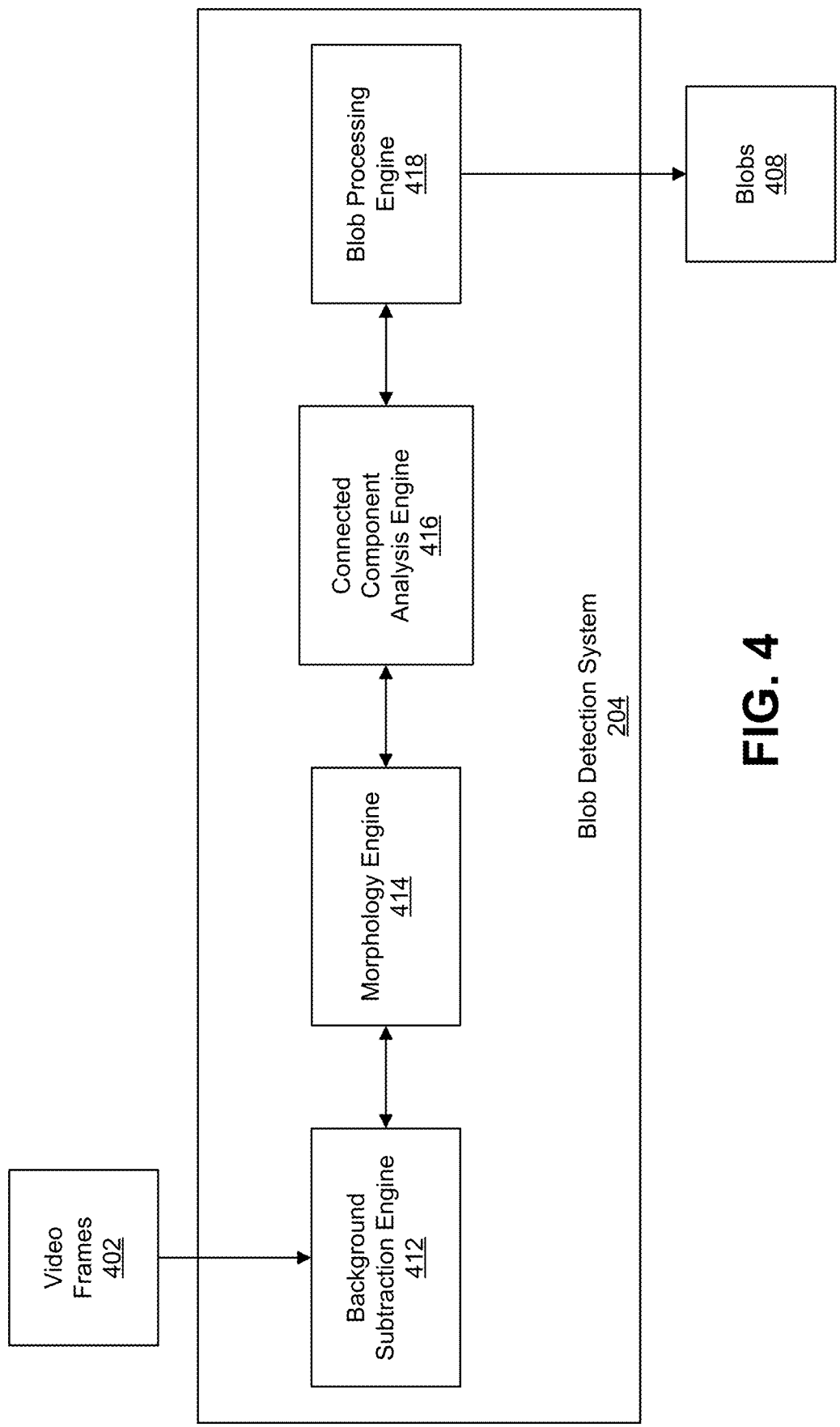
FIG. 4 is a block diagram illustrating an example of a blob detection system, in accordance with some examples.

FIG. 4 is a block diagram illustrating an example of a blob detection system 204. Blob detection is used to segment moving objects from the global background in a scene. The blob detection system 204 includes a background subtraction engine 412 that receives video frames 402. The background subtraction engine 412 can perform background subtraction to detect foreground pixels in one or more of the video frames 402. For example, the background subtraction can be used to segment moving objects from the global background in a video sequence and to generate a foreground-background binary mask (referred to herein as a foreground mask). In some examples, the background subtraction can perform a subtraction between a current frame or picture and a background model including the background part of a scene (e.g., the static or mostly static part of the scene). Based on the results of background subtraction, the morphology engine 414 and connected component analysis engine 416 can perform foreground pixel processing to group the foreground pixels into foreground blobs for tracking purpose. For example, after background subtraction, morphology operations can be applied to remove noisy pixels as well as to smooth the foreground mask. Connected component analysis can then be applied to generate the blobs. Blob processing can then be performed, which may include further filtering out some blobs and merging together some blobs to provide bounding boxes as input for tracking.

The background subtraction engine 412 can model the background of a scene (e.g., captured in the video sequence) using any suitable background subtraction technique (also referred to as background extraction). One example of a background subtraction method used by the background subtraction engine 412 includes modeling the background of the scene as a statistical model based on the relatively static pixels in previous frames which are not considered to belong to any moving region. For example, the background subtraction engine 412 can use a Gaussian distribution model for each pixel location, with parameters of mean and variance to model each pixel location in frames of a video sequence. All the values of previous pixels at a particular pixel location are used to calculate the mean and variance of the target Gaussian model for the pixel location. When a pixel at a given location in a new video frame is processed, its value will be evaluated by the current Gaussian distribution of this pixel location. A classification of the pixel to either a foreground pixel or a background pixel is done by comparing the difference between the pixel value and the mean of the designated Gaussian model. In one illustrative example, if the distance of the pixel value and the Gaussian Mean is less than three (3) times of the variance, the pixel is classified as a background pixel. Otherwise, in this illustrative example, the pixel is classified as a foreground pixel. At the same time, the Gaussian model for a pixel location will be updated by taking into consideration the current pixel value.

The background subtraction engine 412 can also perform background subtraction using a mixture of Gaussians (also referred to as a Gaussian mixture model (GMM)). A GMM models each pixel as a mixture of Gaussians and uses an online learning algorithm to update the model. Each Gaussian model is represented with mean, standard deviation (or covariance matrix if the pixel has multiple channels), and weight. Weight represents the probability that the Gaussian occurs in the past history.

$$P(X_t) = \sum_{i=1}^{K} \omega_{i,t} N(X_t | \mu_{i,t}, \sum i, t)$$ Equation (1)

An equation of the GMM model is shown in equation (1), wherein there are K Gaussian models. Each Guassian model has a distribution with a mean of μ and variance of Σ, and has a weight ω. Here, i is the index to the Gaussian model and t is the time instance. As shown by the equation, the parameters of the GMM change over time after one frame (at time t) is processed. In GMM or any other learning based background subtraction, the current pixel impacts the whole model of the pixel location based on a learning rate, which could be constant or typically at least the same for each pixel location. A background subtraction method based on GMM (or other learning based background subtraction) adapts to local changes for each pixel. Thus, once a moving object stops, for each pixel location of the object, the same pixel value keeps on contributing to its associated background model heavily, and the region associated with the object becomes background.

The background subtraction techniques mentioned above are based on the assumption that the camera is mounted still, and if anytime the camera is moved or orientation of the camera is changed, a new background model will need to be calculated. There are also background subtraction methods that can handle foreground subtraction based on a moving background, including techniques such as tracking key points, optical flow, saliency, and other motion estimation based approaches.

The background subtraction engine 412 can generate a foreground mask with foreground pixels based on the result of background subtraction. For example, the foreground mask can include a binary image containing the pixels making up the foreground objects (e.g., moving objects) in a scene and the pixels of the background. In some examples, the background of the foreground mask (background pixels) can be a solid color, such as a solid white background, a solid black background, or other solid color. In such examples, the foreground pixels of the foreground mask can be a different color than that used for the background pixels, such as a solid black color, a solid white color, or other solid color. In one illustrative example, the background pixels can be black (e.g., pixel color value 0 in 8-bit grayscale or other suitable value) and the foreground pixels can be white (e.g., pixel color value 255 in 8-bit grayscale or other suitable value). In another illustrative example, the background pixels can be white and the foreground pixels can be black.

Using the foreground mask generated from background subtraction, a morphology engine 414 can perform morphology functions to filter the foreground pixels. The morphology functions can include erosion and dilation functions. In one example, an erosion function can be applied, followed by a series of one or more dilation functions. An erosion function can be applied to remove pixels on object boundaries. For example, the morphology engine 414 can apply an erosion function (e.g., FilterErode3×3) to a 3×3 filter window of a center pixel, which is currently being processed. The 3×3 window can be applied to each foreground pixel (as the center pixel) in the foreground mask. One of ordinary skill in the art will appreciate that other window sizes can be used other than a 3×3 window. The erosion function can include an erosion operation that sets a current foreground pixel in the foreground mask (acting as the center pixel) to a background pixel if one or more of its neighboring pixels within the 3×3 window are background pixels. Such an erosion operation can be referred to as a strong erosion operation or a single-neighbor erosion operation. Here, the neighboring pixels of the current center pixel include the eight pixels in the 3×3 window, with the ninth pixel being the current center pixel.

A dilation operation can be used to enhance the boundary of a foreground object. For example, the morphology engine 414 can apply a dilation function (e.g., FilterDilate3×3) to a 3×3 filter window of a center pixel. The 3×3 dilation window can be applied to each background pixel (as the center pixel) in the foreground mask. One of ordinary skill in the art will appreciate that other window sizes can be used other than a 3×3 window. The dilation function can include a dilation operation that sets a current background pixel in the foreground mask (acting as the center pixel) as a foreground pixel if one or more of its neighboring pixels in the 3×3 window are foreground pixels. The neighboring pixels of the current center pixel include the eight pixels in the 3×3 window, with the ninth pixel being the current center pixel.

In some examples, multiple dilation functions can be applied after an erosion function is applied. In one illustrative example, three function calls of dilation of 3×3 window size can be applied to the foreground mask before it is sent to the connected component analysis engine 416. In some examples, an erosion function can be applied first to remove noise pixels, and a series of dilation functions can then be applied to refine the foreground pixels. In one illustrative example, one erosion function with 3×3 window size is called first, and three function calls of dilation of 3×3 window size are applied to the foreground mask before it is sent to the connected component analysis engine 416. Details regarding content-adaptive morphology operations are described below.

After the morphology operations are performed, the connected component analysis engine 416 can apply connected component analysis to connect neighboring foreground pixels to formulate connected components and blobs. In some implementation of connected component analysis, a set of bounding boxes are returned in a way that each bounding box contains one component of connected pixels. One example of the connected component analysis performed by the connected component analysis engine 416 is implemented as follows:

```
for each pixel of the foreground mask {
  "\* MERGEFORMAT \* MERGEFORMAT    -if it is a foreground
pixel and has not been processed, the following steps apply:
    -Apply FloodFill function to connect this pixel to other foreground
    and generate a connected component
    -Insert the connected component in a list of connected components.
    -Mark the pixels in the connected component as being processed }
```

The Floodfill (seed fill) function is an algorithm that determines the area connected to a seed node in a multi-dimensional array (e.g., a 2-D image in this case). This Floodfill function first obtains the color or intensity value at the seed position (e.g., a foreground pixel) of the source foreground mask, and then finds all the neighbor pixels that have the same (or similar) value based on 4 or 8 connectivity. For example, in a 4 connectivity case, a current pixel's neighbors are defined as those with a coordination being (x+d, y) or (x, y+d), wherein d is equal to 1 or −1 and (x, y) is the current pixel. One of ordinary skill in the art will appreciate that other amounts of connectivity can be used. Some objects are separated into different connected components and some objects are grouped into the same connected components (e.g., neighbor pixels with the same or similar values). Additional processing may be applied to further process the connected components for grouping. Finally, the blobs 408 are generated that include neighboring foreground pixels according to the connected components. In one example, a blob can be made up of one connected component. In another example, a blob can include multiple connected components (e.g., when two or more blobs are merged together).

The blob processing engine 418 can perform additional processing to further process the blobs generated by the connected component analysis engine 416. In some examples, the blob processing engine 418 can generate the bounding boxes to represent the detected blobs and blob trackers. In some cases, the blob bounding boxes can be output from the blob detection system 204. In some examples, there may be a filtering process for the connected components (bounding boxes). For instance, the blob processing engine 418 can perform content-based filtering of certain blobs. In some cases, a machine learning method can determine that a current blob contains noise (e.g., foliage in a scene). Using the machine learning information, the blob processing engine 418 can determine the current blob is a noisy blob and can remove it from the resulting blobs that are provided to the object tracking system 206. In some cases, the blob processing engine 418 can filter out one or more small blobs that are below a certain size threshold (e.g., an area of a bounding box surrounding a blob is below an area threshold). In some examples, there may be a merging process to merge some connected components (represented as bounding boxes) into bigger bounding boxes. For instance, the blob processing engine 418 can merge close blobs into one big blob to remove the risk of having too many small blobs that could belong to one object. In some cases, two or more bounding boxes may be merged together based on certain rules even when the foreground pixels of the two bounding boxes are totally disconnected. In some embodiments, the blob detection system 204 does not include the blob processing engine 418, or does not use the blob processing engine 418 in some instances. For example, the blobs generated by the connected component analysis engine 416, without further processing, can be input to the object tracking system 206 to perform blob and/or object tracking.

In some implementations, density based blob area trimming may be performed by the blob processing engine 418. For example, when all blobs have been formulated after post-filtering and before the blobs are input into the tracking layer, the density based blob area trimming can be applied. A similar process is applied vertically and horizontally. For example, the density based blob area trimming can first be performed vertically and then horizontally, or vice versa. The purpose of density based blob area trimming is to filter out the columns (in the vertical process) and/or the rows (in the horizontal process) of a bounding box if the columns or rows only contain a small number of foreground pixels.

The vertical process includes calculating the number of foreground pixels of each column of a bounding box, and denoting the number of foreground pixels as the column density. Then, from the left-most column, columns are processed one by one. The column density of each current column (the column currently being processed) is compared with the maximum column density (the column density of all columns). If the column density of the current column is smaller than a threshold (e.g., a percentage of the maximum column density, such as 10%, 20%, 30%, 50%, or other suitable percentage), the column is removed from the bounding box and the next column is processed. However, once a current column has a column density that is not smaller than the threshold, such a process terminates and the remaining columns are not processed anymore. A similar process can then be applied from the right-most column. One of ordinary skill will appreciate that the vertical process can process the columns beginning with a different column than the left-most column, such as the right-most column or other suitable column in the bounding box.

The horizontal density based blob area trimming process is similar to the vertical process, except the rows of a bounding box are processed instead of columns. For example, the number of foreground pixels of each row of a bounding box is calculated, and is denoted as row density. From the top-most row, the rows are then processed one by one. For each current row (the row currently being processed), the row density is compared with the maximum row density (the row density of all the rows). If the row density of the current row is smaller than a threshold (e.g., a percentage of the maximum row density, such as 10%, 20%, 30%, 50%, or other suitable percentage), the row is removed from the bounding box and the next row is processed. However, once a current row has a row density that is not smaller than the threshold, such a process terminates and the remaining rows are not processed anymore. A similar process can then be applied from the bottom-most row. One of ordinary skill will appreciate that the horizontal process can process the rows beginning with a different row than the top-most row, such as the bottom-most row or other suitable row in the bounding box.

One purpose of the density based blob area trimming is for shadow removal. For example, the density based blob area trimming can be applied when one person is detected together with his or her long and thin shadow in one blob (bounding box). Such a shadow area can be removed after applying density based blob area trimming, since the column density in the shadow area is relatively small. Unlike morphology, which changes the thickness of a blob (besides filtering some isolated foreground pixels from formulating blobs) but roughly preserves the shape of a bounding box, such a density based blob area trimming method can dramatically change the shape of a bounding box.

Once the blobs are detected and processed, object tracking (also referred to as blob tracking) can be performed to track the detected blobs. In some examples, tracking can be performed using a cost-based technique, as described with respect to FIG. 5. In some examples, tracking can be performed using one or more machine learning systems (e.g., using one or more neural network based systems), as described further below.

Figure 5:
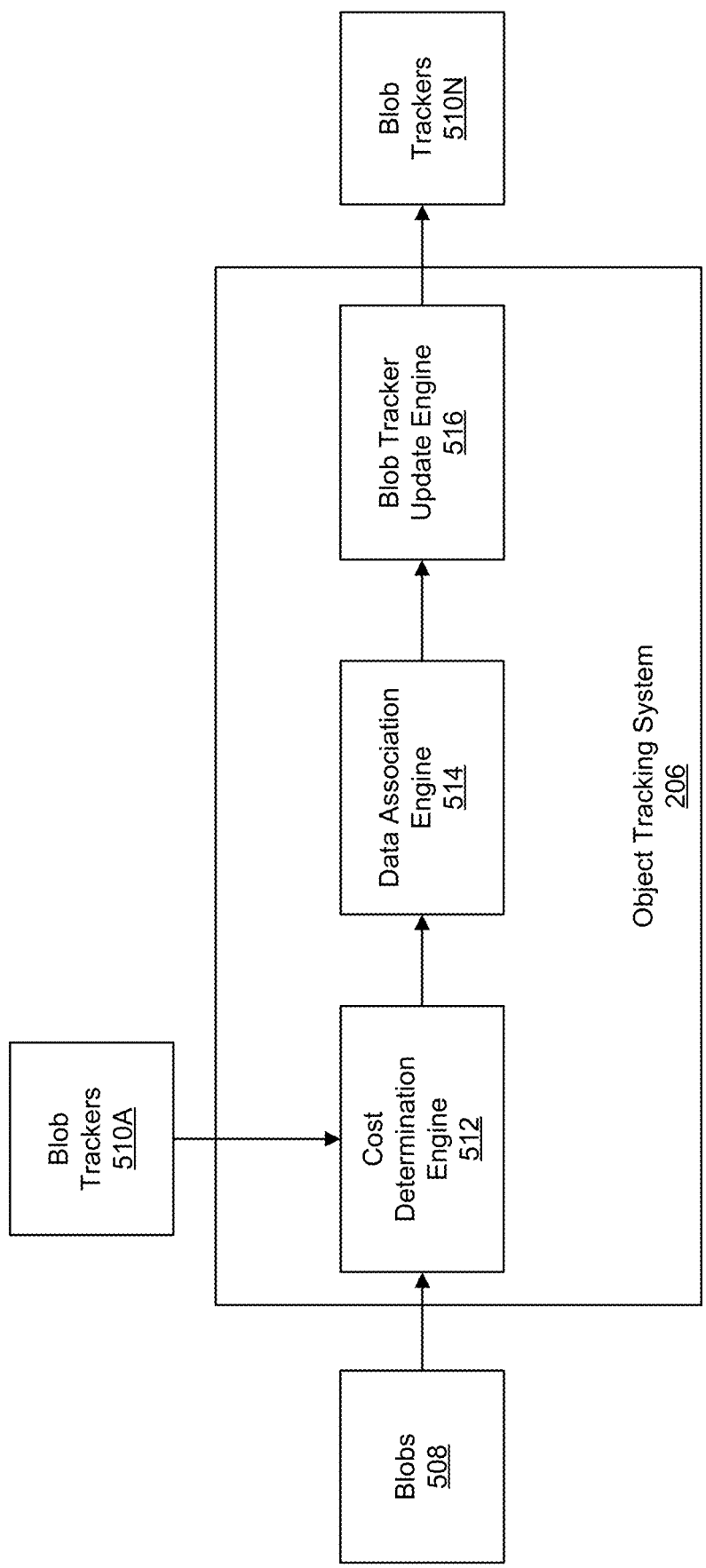
FIG. 5 is a block diagram illustrating an example of an object tracking system, in accordance with some examples.

FIG. 5 is a block diagram illustrating an example of an object tracking system 206. The input to the blob/object tracking is a list of the blobs 508 (e.g., the bounding boxes of the blobs) generated by the blob detection system 204. In some cases, a tracker is assigned with a unique ID, and a history of bounding boxes is kept. Object tracking in a video sequence can be used for many applications, including surveillance applications, among many others. For example, the ability to detect and track multiple objects in the same scene is of great interest in many security applications. When blobs (making up at least portions of objects) are detected from an input video frame, blob trackers from the previous video frame need to be associated to the blobs in the input video frame according to a cost calculation. The blob trackers can be updated based on the associated foreground blobs. In some instances, the steps in object tracking can be conducted in a series manner.

A cost determination engine 512 of the object tracking system 206 can obtain the blobs 508 of a current video frame from the blob detection system 204. The cost determination engine 512 can also obtain the blob trackers 510A updated from the previous video frame (e.g., video frame A 302A). A cost function can then be used to calculate costs between the blob trackers 510A and the blobs 508. Any suitable cost function can be used to calculate the costs. In some examples, the cost determination engine 512 can measure the cost between a blob tracker and a blob by calculating the Euclidean distance between the centroid of the tracker (e.g., the bounding box for the tracker) and the centroid of the bounding box of the foreground blob. In one illustrative example using a 2-D video sequence, this type of cost function is calculated as below:

$$Cost_{tb} = \sqrt{(t_x-b_x)^2+(t_y-f_y)^2}$$

The terms $(t_x, t_y)$ and $(b_x, b_y)$ are the center locations of the blob tracker and blob bounding boxes, respectively. As noted herein, in some examples, the bounding box of the blob tracker can be the bounding box of a blob associated with the blob tracker in a previous frame. In some examples, other cost function approaches can be performed that use a minimum distance in an x-direction or y-direction to calculate the cost. Such techniques can be good for certain controlled scenarios, such as well-aligned lane conveying. In some examples, a cost function can be based on a distance of a blob tracker and a blob, where instead of using the center position of the bounding boxes of blob and tracker to calculate distance, the boundaries of the bounding boxes are considered so that a negative distance is introduced when two bounding boxes are overlapped geometrically. In addition, the value of such a distance is further adjusted according to the size ratio of the two associated bounding boxes. For example, a cost can be weighted based on a ratio between the area of the blob tracker bounding box and the area of the blob bounding box (e.g., by multiplying the determined distance by the ratio).

In some embodiments, a cost is determined for each tracker-blob pair between each tracker and each blob. For example, if there are three trackers, including tracker A, tracker B, and tracker C, and three blobs, including blob A, blob B, and blob C, a separate cost between tracker A and each of the blobs A, B, and C can be determined, as well as separate costs between trackers B and C and each of the blobs A, B, and C. In some examples, the costs can be arranged in a cost matrix, which can be used for data association. For example, the cost matrix can be a 2-dimensional matrix, with one dimension being the blob trackers 510A and the second dimension being the blobs 508. Every tracker-blob pair or combination between the trackers 510A and the blobs 508 includes a cost that is included in the cost matrix. Best matches between the trackers 510A and blobs 508 can be determined by identifying the lowest cost tracker-blob pairs in the matrix. For example, the lowest cost between tracker A and the blobs A, B, and C is used to determine the blob with which to associate the tracker A.

Data association between trackers 510A and blobs 508, as well as updating of the trackers 510A, may be based on the determined costs. The data association engine 514 matches or assigns a tracker (or tracker bounding box) with a corresponding blob (or blob bounding box) and vice versa. For example, as described previously, the lowest cost tracker-blob pairs may be used by the data association engine 514 to associate the blob trackers 510A with the blobs 508. Another technique for associating blob trackers with blobs includes the Hungarian method, which is a combinatorial optimization algorithm that solves such an assignment problem in polynomial time and that anticipated later primal-dual methods. For example, the Hungarian method can optimize a global cost across all blob trackers 510A with the blobs 508 in order to minimize the global cost. The blob tracker-blob combinations in the cost matrix that minimize the global cost can be determined and used as the association.

In addition to the Hungarian method, other robust methods can be used to perform data association between blobs and blob trackers. For example, the association problem can be solved with additional constraints to make the solution more robust to noise while matching as many trackers and blobs as possible. Regardless of the association technique that is used, the data association engine 514 can rely on the distance between the blobs and trackers.

Once the association between the blob trackers 510A and blobs 508 has been completed, the blob tracker update engine 516 can use the information of the associated blobs, as well as the trackers' temporal statuses, to update the status (or states) of the trackers 510A for the current frame. Upon updating the trackers 510A, the blob tracker update engine 516 can perform object tracking using the updated trackers 510N, and can also provide the updated trackers 510N for use in processing a next frame.

The status or state of a blob tracker can include the tracker's identified location (or actual location) in a current frame and its predicted location in the next frame. The location of the foreground blobs are identified by the blob detection system 204. However, as described in more detail below, the location of a blob tracker in a current frame may need to be predicted based on information from a previous frame (e.g., using a location of a blob associated with the blob tracker in the previous frame). After the data association is performed for the current frame, the tracker location in the current frame can be identified as the location of its associated blob(s) in the current frame. The tracker's location can be further used to update the tracker's motion model and predict its location in the next frame. Further, in some cases, there may be trackers that are temporarily lost (e.g., when a blob the tracker was tracking is no longer detected), in which case the locations of such trackers also need to be predicted (e.g., by a Kalman filter). Such trackers are temporarily not shown to the system. Prediction of the bounding box location helps not only to maintain certain level of tracking for lost and/or merged bounding boxes, but also to give more accurate estimation of the initial position of the trackers so that the association of the bounding boxes and trackers can be made more precise.

As noted above, the location of a blob tracker in a current frame may be predicted based on information from a previous frame. One method for performing a tracker location update is using a Kalman filter. The Kalman filter is a framework that includes two operations. The first operation is to predict a tracker's state, and the second operation is to use measurements to correct or update the state. In this case, the tracker from the last frame predicts (using the blob tracker update engine 516) its location in the current frame, and when the current frame is received, the tracker first uses the measurement of the blob(s) (e.g., the blob(s) bounding box(es)) to correct its location states and then predicts its location in the next frame. For example, a blob tracker can employ a Kalman filter to measure its trajectory as well as predict its future location(s). The Kalman filter relies on the measurement of the associated blob(s) to correct the motion model for the blob tracker and to predict the location of the object tracker in the next frame. In some examples, if a blob tracker is associated with a blob in a current frame, the location of the blob is directly used to correct the blob tracker's motion model in the Kalman filter. In some examples, if a blob tracker is not associated with any blob in a current frame, the blob tracker's location in the current frame is identified as its predicted location from the previous frame, meaning that the motion model for the blob tracker is not corrected and the prediction propagates with the blob tracker's last model (from the previous frame).

Other than the location of a tracker, the state or status of a tracker can also, or alternatively, include a tracker's temporal state or status. The temporal state of a tracker can include whether the tracker is a new tracker that was not present before the current frame, a normal state for a tracker that has been alive for a certain duration and that is to be output as an identified tracker-blob pair to the video analytics system, a lost state for a tracker that is not associated or matched with any foreground blob in the current frame, a dead state for a tracker that fails to associate with any blobs for a certain number of consecutive frames (e.g., two or more frames, a threshold duration, or the like), and/or other suitable temporal status. Another temporal state that can be maintained for a blob tracker is a duration of the tracker. The duration of a blob tracker includes the number of frames (or other temporal measurement, such as time) the tracker has been associated with one or more blobs.

There may be other state or status information needed for updating the tracker, which may require a state machine for object tracking. Given the information of the associated blob(s) and the tracker's own status history table, the status also needs to be updated. The state machine collects all the necessary information and updates the status accordingly. Various statuses of trackers can be updated. For example, other than a tracker's life status (e.g., new, lost, dead, or other suitable life status), the tracker's association confidence and relationship with other trackers can also be updated. Taking one example of the tracker relationship, when two objects (e.g., persons, vehicles, or other objects of interest) intersect, the two trackers associated with the two objects will be merged together for certain frames, and the merge or occlusion status needs to be recorded for high level video analytics.

Regardless of the tracking method being used, a new tracker starts to be associated with a blob in one frame and, moving forward, the new tracker may be connected with possibly moving blobs across multiple frames. When a tracker has been continuously associated with blobs and a duration (a threshold duration) has passed, the tracker may be promoted to be a normal tracker. For example, the threshold duration is a duration that a new blob tracker must be continuously associated with one or more blobs before it is converted to a normal tracker (transitioned to a normal state). A normal tracker is output as an identified tracker-blob pair. For example, a tracker-blob pair is output at the system level as an event (e.g., presented as a tracked object on a display, output as an alert, and/or other suitable event) when the tracker is promoted to be a normal tracker. In some implementations, a normal tracker (e.g., including certain status data of the normal tracker, the motion model for the normal tracker, or other information related to the normal tracker) can be output as part of object metadata. The metadata, including the normal tracker, can be output from the video analytics system (e.g., an IP camera running the video analytics system) to a server or other system storage. The metadata can then be analyzed for event detection (e.g., by a rule interpreter). A tracker that is not promoted as a normal tracker can be removed (or killed), after which the tracker can be considered as dead.

As noted above, in some implementations, blob or object tracking can be performed using one or more machine learning systems (e.g., using one or more neural networks). In some cases, the use of machine learning system for blob/object tracking can allow online operability and fast speeds.

Figure 6A:
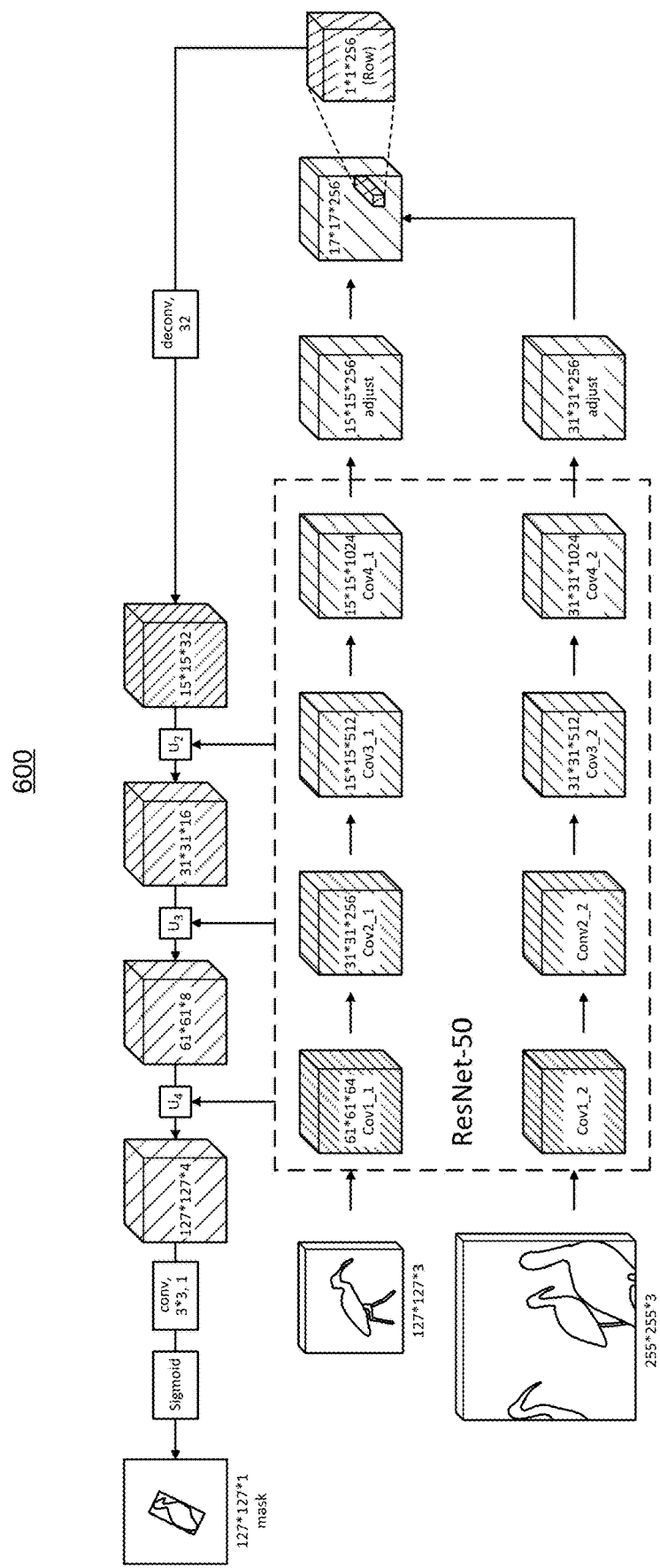
FIG. 6A is another diagram illustrating an example of machine learning based object detection and tracking system, in accordance with some examples.

FIG. 6A is a diagram illustrating an example of a machine learning based object detection and tracking system 600 that includes a fully convolutional deep neural network. The system 600 can perform object detection, object tracking, and object segmentation. As shown in FIG. 6A, an input to the object detection and tracking system 600 includes one or more reference object images (referred to as an "exemplar," and shown in FIG. 6A as a 255*255*3 image, referring to a 255×255 image with three color channels, such as red, green, and blue) and one or more query image frames (referred to as a "search patch," shown in FIG. 6A as a 127*127*3 image). For example, an exemplar and multiple search patches from the exemplar can be input to the system 600 in order to detect, track, and segment one or more objects in the exemplar.

The object detection and tracking system 600 includes a ResNet-50 neural network (until the final convolutional layer of the fourth stage) as the backbone of the neural network of the system 600. In order to obtain a high spatial resolution in deeper layers, the output stride is reduced to 8 by using convolutions with a stride of 1. The receptive field is increased by using dilated convolutions. For example, the stride can be set to 1 and the dilation rate can be set to 2 in the 3×3 convolutional layer of conv4_1 (the top conv4 layer in FIG. 6A). As shown in FIG. 6A, the top conv4_1 layer has a feature map size of 15*15*1024, and the bottom conv4_2 layer has a feature map size of 31*31*1024. Different from the original ResNet-50 architecture, there is no downsampling in the conv4_1 or conv4_2 layers.

One or more adjust layers (labeled "adjust" in FIG. 6A) are added to the backbone. In some cases, each of the adjust layers can include a 1×1 convolutional layer with 256 output channels. The two adjust layers can perform a depth-wise cross-correlation, to generate feature maps of a particular size (a size of 17*17 is shown in FIG. 6A). For instance, the output features of the adjust layers are depth-wise cross-correlated, resulting in a feature map of size 17×17 (with 256 channels). A purpose of the adjust layer is to locate the target object from the lower layer network (e.g., in the image size of 17*17). For example, the adjust layer can be used to extract feature maps from the reference object image (the examplar) and the query image frame (search patches). RoW in the last layer of the second row of the system 600 represents the response of a candidate window, which is the target object region from the query image frame input to the system 600. Exemplars and search patches share the network's parameters from conv_1 to conv4_x, while the parameters of the adjust layer are not shared.

Figure 6B:
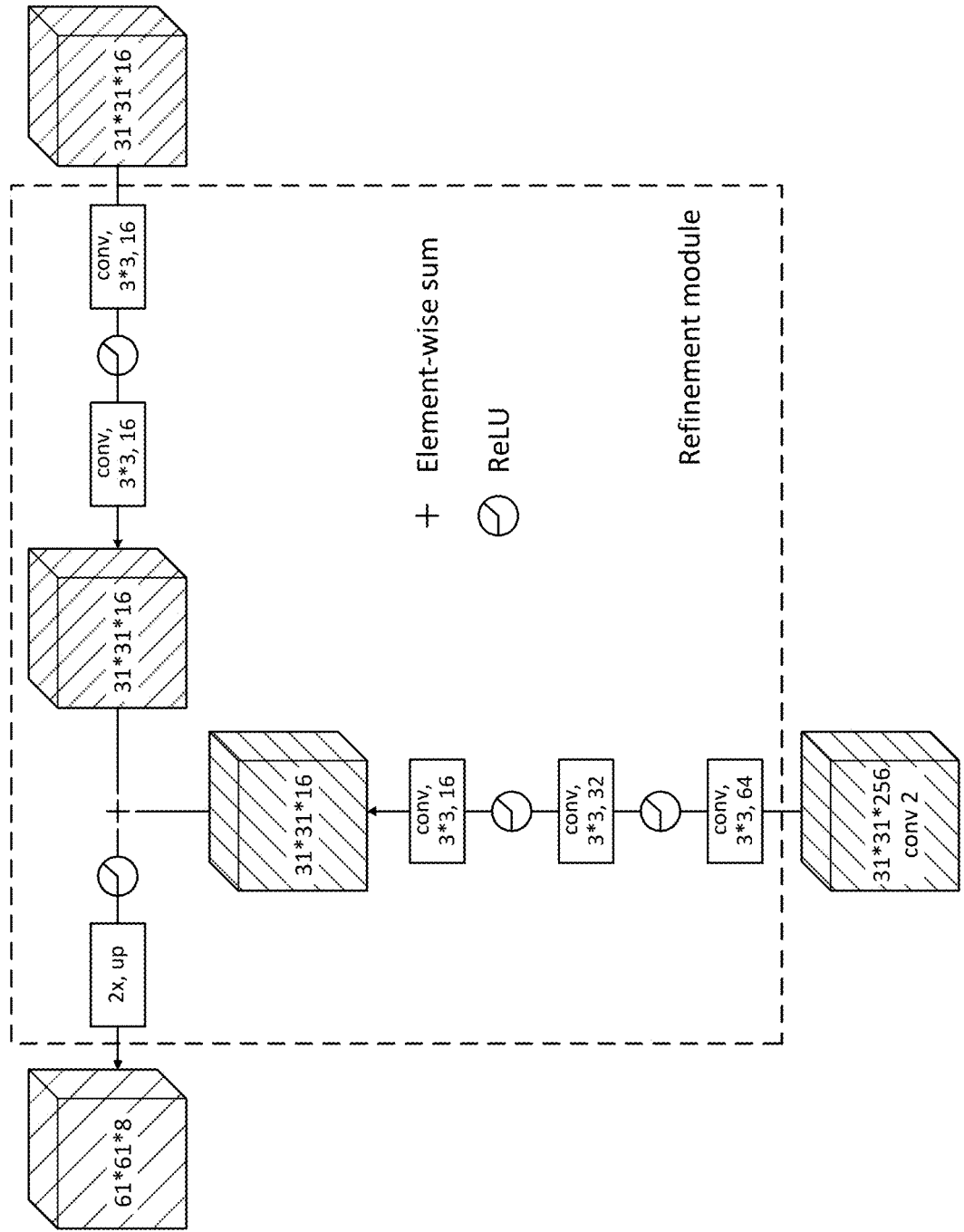
FIG. 6B is a diagram illustrating an example of an upsample component of a machine learning based object detection and tracking system, in accordance with some examples.

A refine module u-shape structure can be used that combines the feature map of the backbone, and performs upsampling to obtain finer results. For example, the layers in the top row of the system 600 perform deconvolution followed by upsampling (shown as upsampling components $U_2$, $U_3$, and $U_4$), which aims to restore the target object location at a higher level (e.g., to the image size of 127*127). An example of the $U_3$ component is shown in FIG. 6B. The $U_2$ and $U_4$ components have a similar structure and operation as the $U_3$ component. The last convolutional layer (labeled as "conv. 3*3, 1") before the sigmoid operation is used to reduce the dimension of the feature map from 127*127*4 to 127*127*1. The sigmoid function is used to binarize the output of the object mask, which is an object segmentation result. The object mask can include a binary mask with a 0 value or 1 value for each pixel. A purpose of generating the object mask is to have an accurate object bounding box. The bounding box can include a rectangle in any direction. In some cases, the object bounding box is close to (e.g., centered relative to) the center point or center of mass of the object. In some cases, a scoring branch can be included in the system 600 to generate a scoring matrix based on the object mask. In such cases, the scoring matrix can be used for precise object localization. As noted above, the first four stages of the ResNet-50 network share parameters, and the output is connected to the 1×1 convolution of the shared parameters to adjust the channel, *d, for depth-wise cross-correlation. Other details regarding the backbone architecture of FIG. 6A are shown in FIG. 6C.

In some implementations, classification systems can be used to classify objects that have been detected and tracked in one or more video frames of a video sequence. Different types of object classification applications can be used. In a first example classification application, a relatively low resolution input image is used to provide a classification for the whole input image, with a class and a confidence level. In such applications, the classification is performed for the whole image. In a second example classification system, a relatively high resolution input image is used, and multiple objects within the image are output, with each object having its own bounding box (or ROI) and a classified object type. The first example classification application is referred to herein as "image based classification" and the second example classification application is referred to herein as "blob based classification." The classification accuracy of both applications can be high when neural network (e.g., deep learning) based solutions are utilized.

Figure 7:
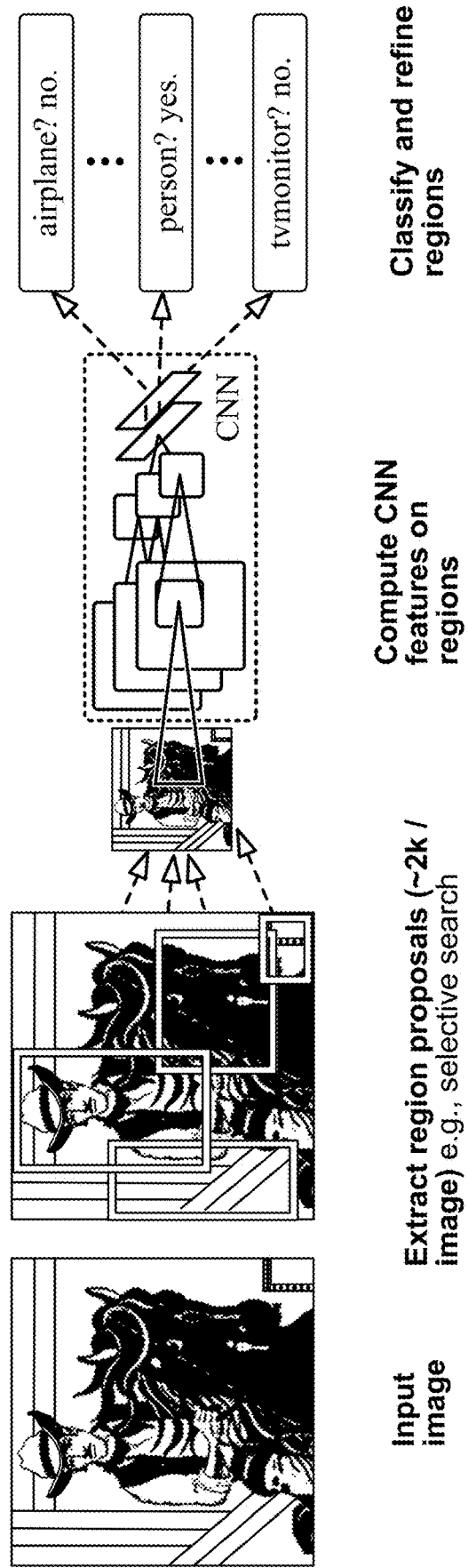
FIG. 7 is a diagram illustrating an example of machine learning based object classification system, in accordance with some examples.

FIG. 7 is a diagram 700 illustrating an example of a machine learning based classification system. As shown, the machine learning based classification (which can also be referred to as region-based classification) first extracts region proposals (e.g., blobs) from the image. The extracted region proposals, which can include blobs, are fed to a deep learning network for classification. A deep learning classification network generally starts with an input layer (image or blob) followed by a sequence of convolutional layers and pooling layers (among other layers), and ends with fully connected layers. The convolutional layers can be followed by one layer of rectified linear unit (ReLU) activation functions. The convolutional, pooling, and ReLU layers act as learnable feature extractors, while fully connected layers act as a classifier.

In some cases, when a blob is fed to a deep learning classification network, one or more shallow layers in the network might learn simple geometrical objects, such as lines and/or other objects, that signify the object to be classified. The deeper layers will learn much more abstract, detailed features about the objects, such as sets of lines that define shapes or other detailed features, and then eventually sets of the shapes from the earlier layers that make up the shape of the object that is being classified (e.g., a person, a car, an animal, or any other object). Further details of the structure and function of neural networks are described below with respect to FIG. 42-FIG. 46C.

As blob based classification requires much less computational complexity as well as less memory bandwidth (e.g., memory required to maintain the network structure), it may be directly used.

Figure 21:
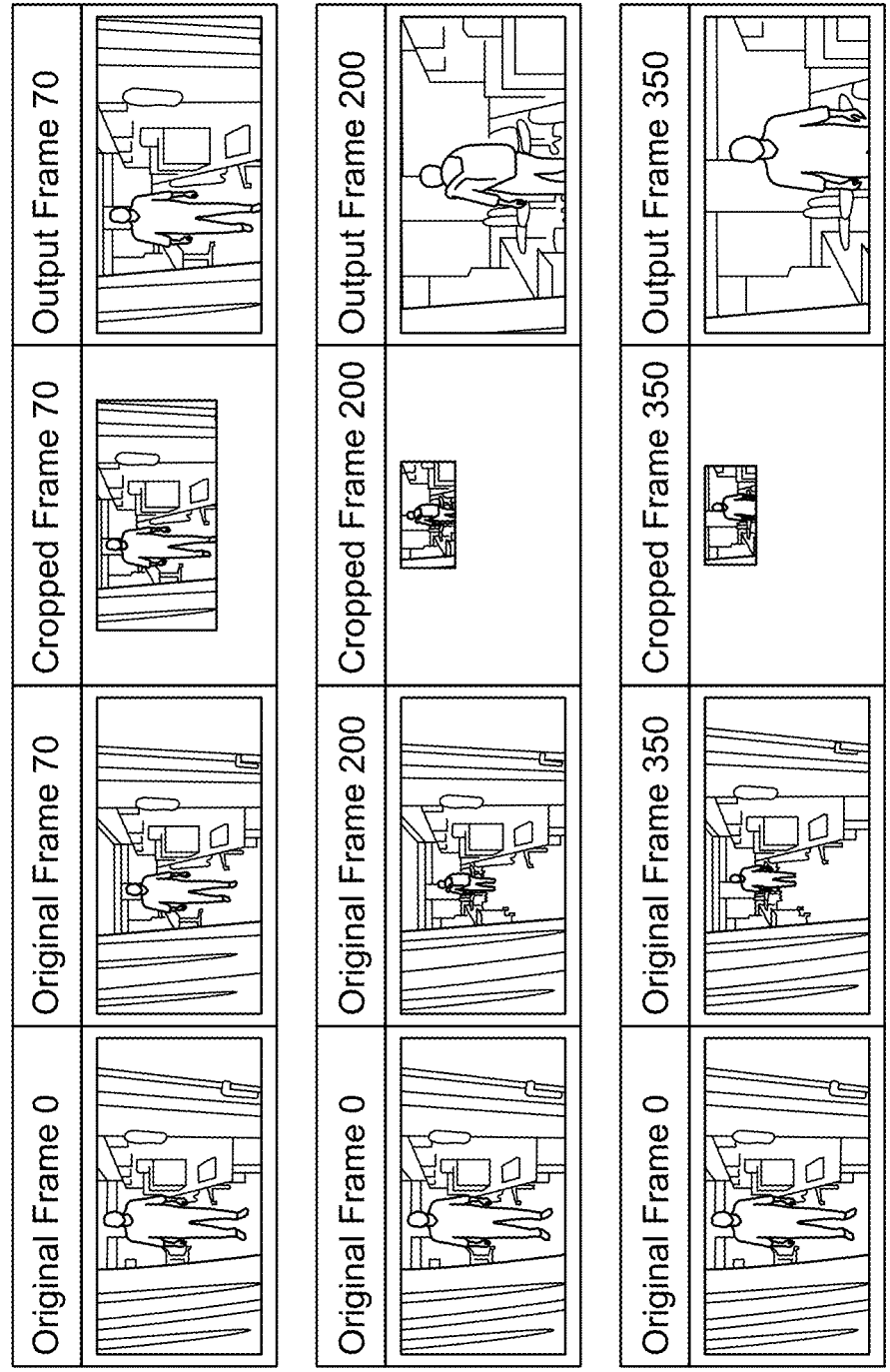
Figure 22:
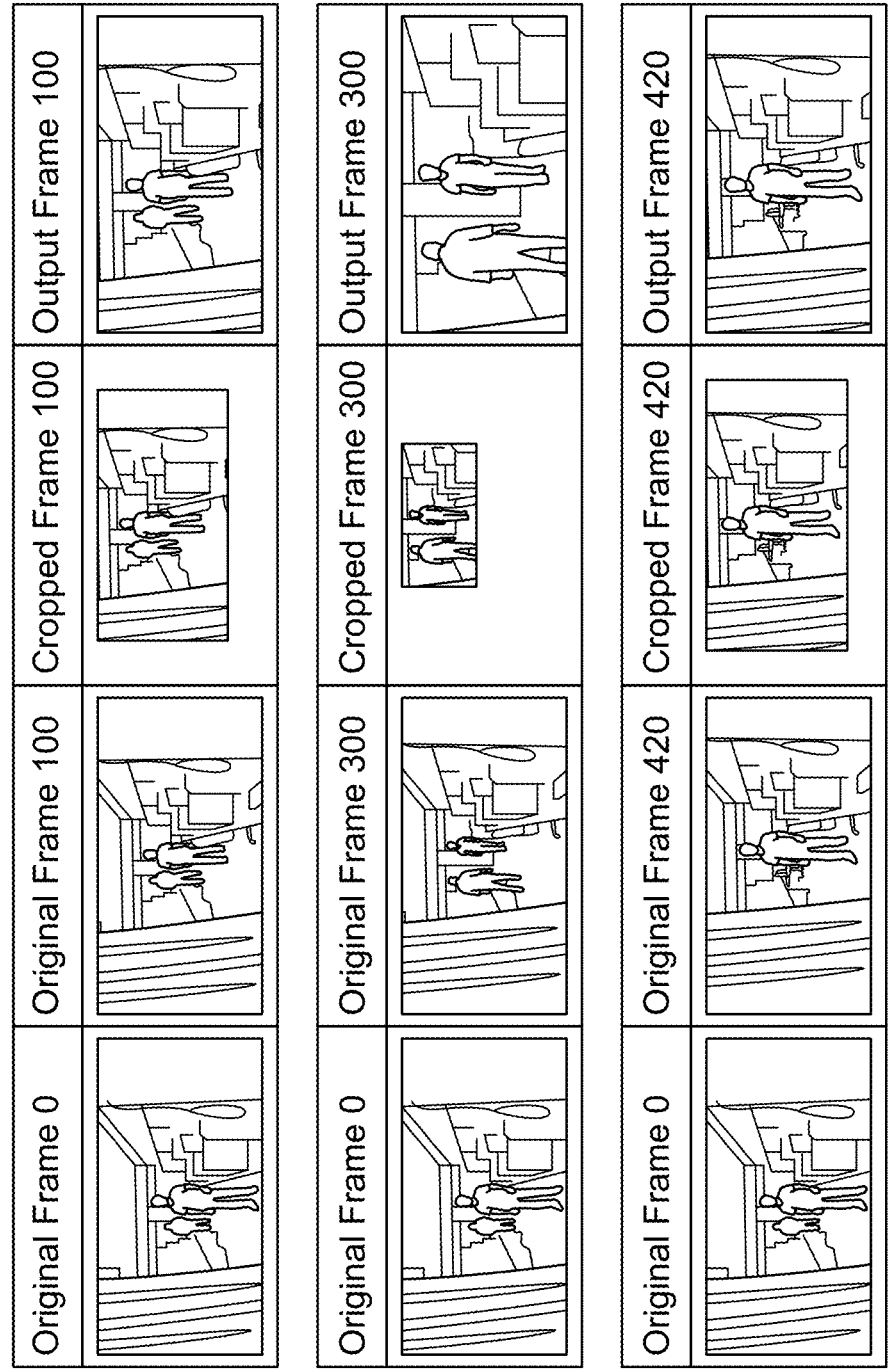
Figure 23:
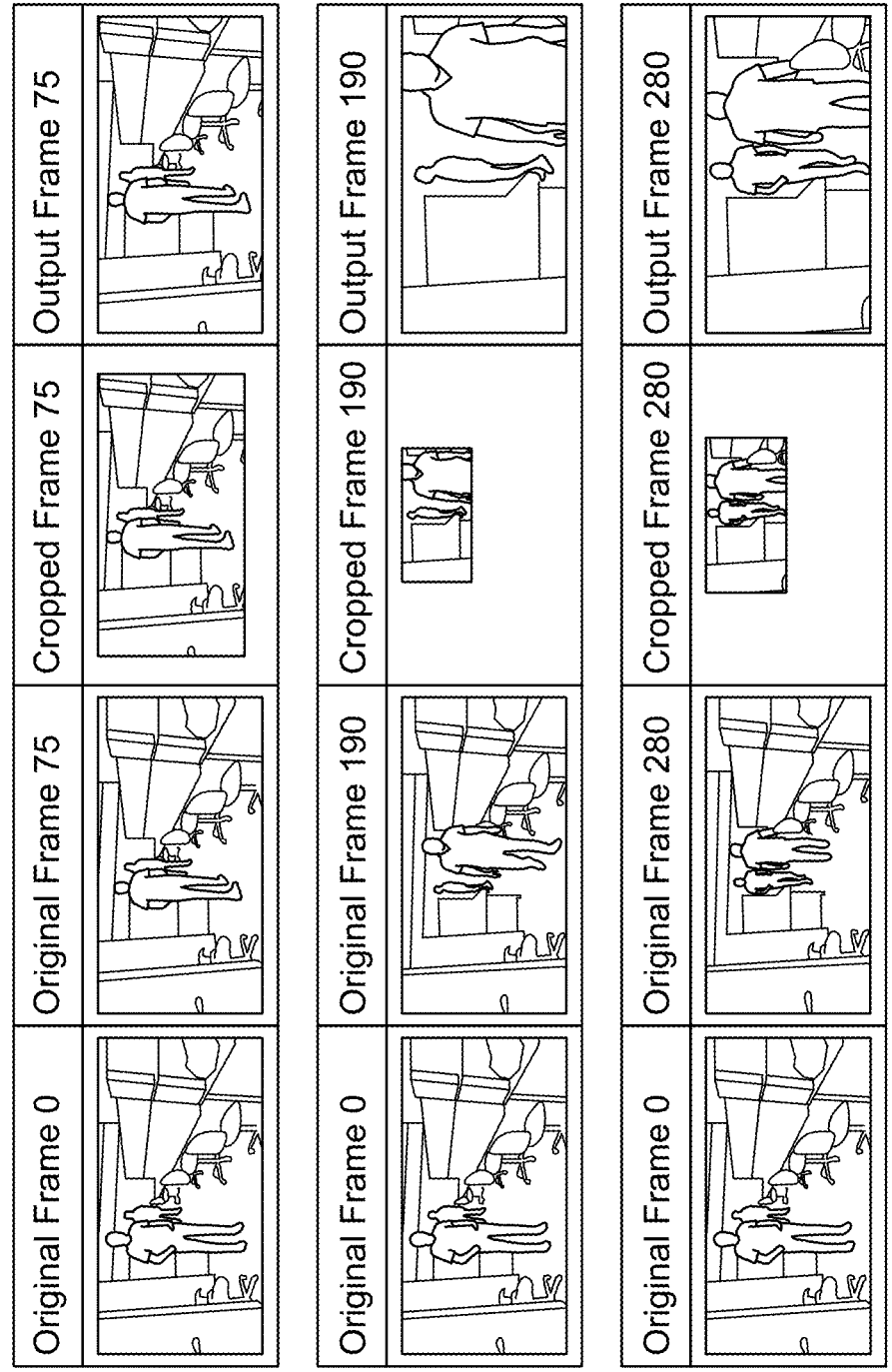

Various deep learning-based detectors can be used to classify or detect objects in video frames. For example, a Cifar-10 network based detector can be used to perform blob based classification to classify blobs. In some cases, the Cifar-10 detector can be trained to classify persons and cars only. The Cifar-10 network based detector can take a blob as input, and can classify the blob as one of a number of predefined classes with a confidence score. Further details of the Cifar-10 detector are described below with respect to FIG. 21.

Another deep learning based detector is single-shot detector (SSD), which is a fast single-shot object detector that can be applied for multiple object categories. A feature of the SSD model is the use of multi-scale convolutional bounding box outputs attached to multiple feature maps at the top of the neural network. Such a representation allows the SSD to efficiently model diverse box shapes. It has been demonstrated that, given the same VGG-16 base architecture, SSD compares favorably to its state-of-the-art object detector counterparts in terms of both accuracy and speed. An SSD deep learning detector is described in more detail in K. Simonyan and A. Zisserman, "Very deep convolutional networks for large-scale image recognition," CoRR, abs/1409.1556, 2014, which is hereby incorporated by reference in its entirety for all purposes. Further details of the SSD detector are described below with respect to FIG. 25A-FIG. 25C.

Another example of a deep learning-based detector that can be used to detect or classify objects in video frames includes the You Only Look Once (YOLO) detector. The YOLO detector, when run on a Titan X, processes images at 40-90 frames per second (fps) with a mAP of 78.6% (based on VOC 2007). The SSD300 model runs at 59 fps on the Nvidia Titan X, and can typically execute faster than the current YOLO 1. YOLO 1 has also been recently replaced by its successor YOLO 2. A YOLO deep learning detector is described in more detail in J. Redmon, S. Divvala, R. Girshick, and A. Farhadi, "You only look once: Unified, real-time object detection," arXiv preprint arXiv: 1506.02640, 2015, which is hereby incorporated by reference in its entirety for all purposes. Further details of the YOLO detector are described below with respect to FIG. 46A-FIG. 46C. While the SSD and YOLO detectors are described to provide illustrative examples of deep learning-based object detectors, one of ordinary skill will appreciate that any other suitable neural network can be used to perform object classification.

As noted above, it can be desirable in many scenarios to maintain a size of a region of interest and/or object of interest from frame-to-frame in sequence of frames as the region of interest and/or object moves relative to one or more cameras capturing the sequence of frames. An example of such a scenario can include when a user provides input to a device causing the device to capture a video of an event that includes an object of interest. For example, the device can record a video of a person performing a dance routine, where the person moves relative to the camera (in a depth direction and in a lateral direction) as the video is being captured. The user may want to maintain the person with a constant size (and in some cases a consistent position in the captured frames) throughout the video as the person is moving relative to the camera. Another example of such a scenario is in video analytics when an IP camera is capturing video of a scene. For instance, an IP camera can capture video of a user's living room, where it can be desired to maintain the size (and in some cases a consistent position in the captured frames) of one or more people in the room even as the one or more people move far away from the camera (in a depth direction).

As a device is capturing a sequence of frames of an object (e.g., a video of a person performing a dance routine), the object can move relative to one or more cameras capturing the sequence of frames. As a result, it can be difficult for the device to maintain a desired object size (e.g., the size of an object in an original frame when a video capture is first initiated) as the object is moving during capture of the sequence of frames. For instance, a user may have tuned the camera zoom so that the object has a desired size in the frame. However, the size ratio of the object (the size of the object relative to the frame, referred to as an object size-to-frame ratio) will dynamically change as the object moves. It can be tedious for a user to manually change the object size-to-frame ratio during capture of the video. It can also be difficult to automatically track a subject during video recording.

As noted above, systems and techniques are described herein for maintaining a fixed size for a target object in a sequence of frames. In one illustrative example, an initial frame of a video or other sequence of frames can be captured and displayed. In some cases, a user can provide user input indicating an object of interest (e.g., by drawing a bounding box around the object, selecting the object, zooming in on the object, etc.) in the initial frame. In some cases, the object can be automatically detected without user input. In some cases, a size of the object in the initial frame can be determined and used as a reference size for the object in subsequent frames of the video after the initial frame. In some cases, a bounding box can be set for the object in the initial frame. In some examples, a center point coordinate (or other point associated with the bounding box or object) and a diagonal length of the bounding box (or other length associated with the bounding box or object) can be determined and used as a reference for subsequent frames of the video.

Object detection and tracking can be initialized and performed to detect and track the object in the subsequent frames of the video. For each of the subsequent video frames, an object bounding box center point coordinate (or other point associated with the bounding box or object) and the diagonal length of the bounding box (or other length associated with the bounding box or object) can be determined or recorded. Once the sets of bounding box center point (or other point) coordinates and diagonal lengths (or other lengths) are obtained for the frames of the video, a smoothing function can be applied to smooth the amount of change of the bounding box diagonal length (and thus the size) in each frame of the video. In some cases, the smoothing function can also be applied to smooth the movement trajectory of the bounding box center point in the frames of the video. As described herein, a scaling factor can be calculated for each frame by comparing the bounding box diagonal lengths in the initial video frame (referred to as a reference frame) and the current frame being processed. The scaling factor can be used to scale or re-size each frame. Cropping and scaling can be conducted on each video frame based on the center point coordinate and scaling factor. In some cases, video stabilization can be applied after the cropping and scaling. An output video can then be provided with the object maintained with the reference size and in some cases maintained at a common location in the video frames (e.g., at a center of each frame).

Figure 8A:
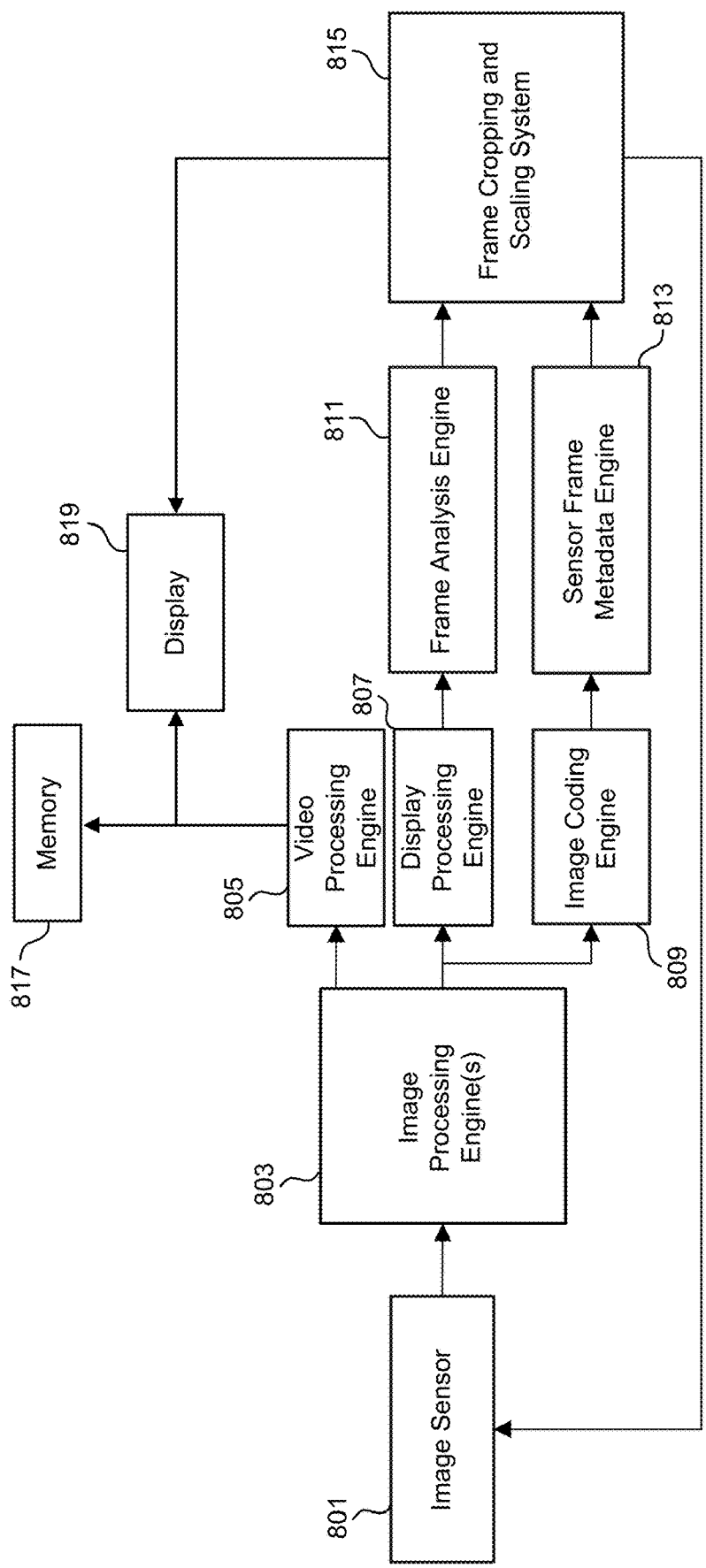
FIG. 8A is a diagram illustrating an example of a system including a frame cropping and scaling system, in accordance with some examples.

FIG. 8A is a diagram illustrating an example of a system for capturing and processing frames or images. The system of FIG. 8A includes an image sensor 801, one or more image processing engines 803, a video processing engine 805, a display processing engine 807, an encoding engine 809, an image analysis engine 811, a sensor image metadata engine 813, and a frame cropping and scaling system 815. An example frame cropping and scaling system 800 is described below with respect to FIG. 8B.

The system of FIG. 8A can include or be part of an electronic device, such as a mobile or stationary telephone handset (e.g., smartphone, cellular telephone, or the like), an IP camera, a desktop computer, a laptop or notebook computer, a tablet computer, a set-top box, a television, a camera, a display device, a digital media player, a video gaming console, a video streaming device, or any other suitable electronic device. In some examples, the system can include one or more wireless transceivers for wireless communications, such as cellular network communications, 802.11 Wi-Fi communications, wireless local area network (WLAN) communications, or some combination thereof. In some implementations, the frame cropping and scaling system 800 can be implemented as part of the image capture and processing system 100 shown in FIG. 1.

While the system of FIG. 8A is shown to include certain components, one of ordinary skill will appreciate that the system can include more components than those shown in FIG. 8A. The components of the system can include software, hardware, or one or more combinations of software and hardware. For example, in some implementations, the components can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the system of FIG. 8A.

The image sensor 801 can perform similar operations as the image sensor 130 described above with respect to FIG. 1. For example, the image sensor 801 can include one or more arrays of photodiodes or other photosensitive elements. Each photodiode can measure an amount of light that corresponds to a particular pixel in an image generated by the image sensor 130. In some examples, the one or more image processing engines 803 can include a camera serial interface decoder module, an image front-end, a Bayer processing segment (e.g., which can be used for snapshot or preview images), an image processing engine, any combination thereof, and/or other component.

The video processing engine 805 can perform video encoding and/or video decoding operations. In some cases, the video processing engine 805 includes a combined video encoder-decoder (also referred to as a "CODEC"). The video processing engine 805 can perform any type of video coding technique to encode video data and/or decode encoded video data. Examples of video coding techniques or standards include versatile video coding (VVC), high-efficiency video coding (HEVC), advanced video coding (AVC), moving picture experts group (MPEG)-2 Part 2 coding, VP9, Alliance of Open Media (AOMedia) Video 1 (AV1), among others. Using a video coding technique, the video processing engine 805 can perform one or more prediction methods (e.g., inter-prediction, intra-prediction, or the like) that take advantage of redundancy present in video images or sequences. A goal of the video encoding is to compress video data into a form that uses a lower bit rate, while avoiding or minimizing degradations to video quality. A goal of the video decoding is to decompress the video data and to obtain any other information in an encoded video bitstream that can be used to decode and/or play the video data. The video output by the video processing engine 805 can be stored in memory 817 (e.g., a decoded picture buffer (DPB), a random access memory (RAM), one or more cache memories, any combination thereof, and/or other memory) and/or can be output for display. For example, decoded video data can be stored in the memory 817 for use in decoding other video frames and/or can be displayed on the display 819.

The display processing engine 807 can be used for preview images. For example, display processing engine 807 can process, operate, and/or output a preview image that has a same (or similar in some cases) aspect ratio of camera output image, but with a lower image resolution. The preview image can be displayed (as a "preview") on a display of the system or device including the system before an actual output image is generated.

The image coding engine 809 can perform image encoding (compression) and/or image decoding (decompression) operations. In some cases, the image coding engine 809 includes a combined image encoder-decoder (or CODEC). The image coding 809 can perform any type of image coding technique to encode image data and/or decode compressed image data. Examples of image coding techniques or standards include Joint Photographic Experts Group (JPEG), Tagged Image File Format (TIFF), among others. Using an image coding technique, the image coding engine 809 can take advantage of visual perception and statistical properties of an image data in order to compress that image with a minor loss in fidelity or quality.

The frame analysis engine 811 can perform frame or image analysis on preview frames obtained or received from the display processing engine 807. For example, the frame analysis engine 811 can obtain or receive a copy of a preview image (with a lower image resolution as compared to a camera output image) from the display processing engine 807. The frame analysis engine 811 can perform object detection and/or tracking operations on the preview image to detect and/or track one or more objects (e.g., a target object) in the image. The frame analysis engine 811 can determine and output size information, location information, and center point (or other point) information for a bounding box of one or more tracked objects (e.g., a tracked target object). The information for the bounding box of the one or more tracked objects can be output to the frame cropping and scaling system 815.

The sensor frame metadata engine 813 generates and outputs a final output image. The sensor frame (or image) meta data represents the output image information, and has the same image resolution as the output image.

Figure 8B:
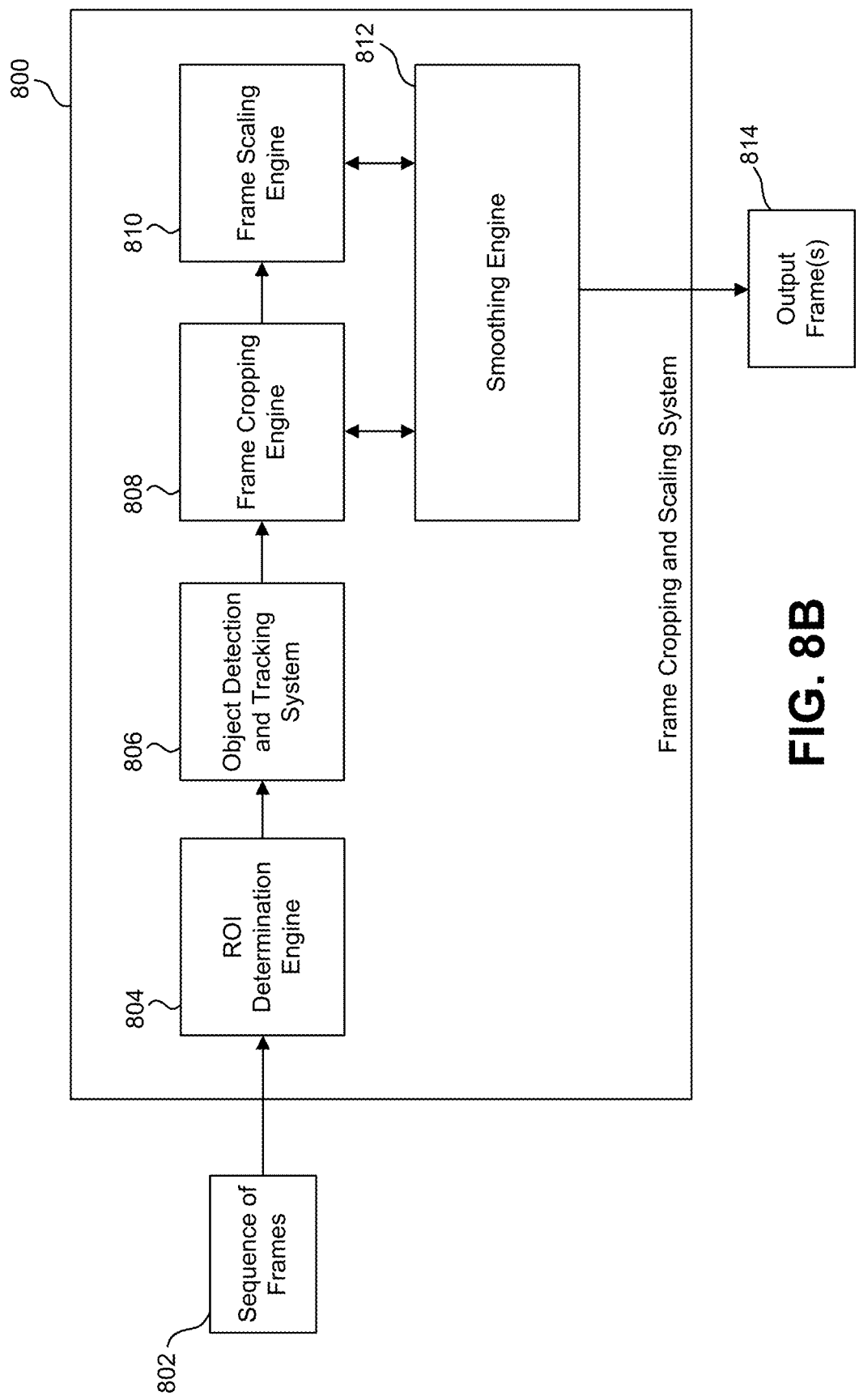
FIG. 8B is a diagram illustrating an example of the frame cropping and scaling system, in accordance with some examples.

FIG. 8B is a diagram illustrating an example of a frame cropping and scaling system 800 that can process one or more frames to maintain a fixed size (and in some cases a fixed position) of an object in the one or more frames. In some cases, the frame cropping and scaling system 800 is an example of the frame cropping and scaling system 815 of the system shown in FIG. 8A. In some cases, the frame cropping and scaling system 800 can be separate from the system shown in FIG. 8A. The frame cropping and scaling system 800 includes a region of interest (ROI) determination engine 804, an object detection and tracking system 806, a frame cropping engine 808, a frame scaling engine 810, and a smoothing engine 812. Examples of operations of the cropping and scaling system 800 will be described below with respect to FIG. 8C-FIG. 41. In some examples, the process 820 of FIG. 8C, the process 930 of FIG. 9A, the process 935 of FIG. 9B, and/or other process(es) described herein can be performed based on an operation being selected by a user. For example, a device can receive user input from a user (e.g., touch input via a touchscreen of a device, voice input via a microphone of the device, a gesture input using one or more cameras of the device, among others) instructing the device to capture a video and to maintain an object in the video with a fixed size. Based on the user input, the device can perform the process 820, the process 930 of FIG. 9, and/or other process(es) described herein.

The frame cropping and scaling system 800 can include or be part of an electronic device, such as a mobile or stationary telephone handset (e.g., smartphone, cellular telephone, or the like), an IP camera, a desktop computer, a laptop or notebook computer, a tablet computer, a set-top box, a television, a camera, a display device, a digital media player, a video gaming console, a video streaming device, or any other suitable electronic device. In some cases, the frame cropping and scaling system 800 can be part of the same device as the system of FIG. 8A. In some examples, the frame cropping and scaling system 800 can include one or more wireless transceivers for wireless communications, such as cellular network communications, 802.11 Wi-Fi communications, wireless local area network (WLAN) communications, or some combination thereof. In some implementations, the frame cropping and scaling system 800 can be implemented as part of the image capture and processing system 100 shown in FIG. 1.

While the frame cropping and scaling system 800 is shown to include certain components, one of ordinary skill will appreciate that the frame cropping and scaling system 800 can include more components than those shown in FIG. 8B. The components of the frame cropping and scaling system 800 can include software, hardware, or one or more combinations of software and hardware. For example, in some implementations, the components of the frame cropping and scaling system 800 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the frame cropping and scaling system 800.

A sequence of frames 802 is input to the frame cropping and scaling system 800. The frame 802 can be part of a sequence of frames. The sequence of frames can be a video, a group of consecutively captured images, or other sequence of frames. The ROI determination engine 804 can determine an initial region of interest (ROI) in particular frame based on user input and/or automatically. For instance, at block 822 of FIG. 8C, the process 820 can perform object selection in the initial frame of the sequence of frames (e.g., in a video). The ROI can be represented by a bounding box or other bounding region. In some implementations, the bounding region is visible in the frame when output to a display device. In some implementations, the bounding region may not be visible (e.g. by a viewer, such as the user) when the frame is output to the display device. The frame at which the initial ROI is determined is referred to as the initial frame (or reference frame) of the sequence of frames.

In some examples, the ROI determination engine 804 (or other component of the frame cropping and scaling system 800) can determine a video frame from the sequence of frames 802 to use as the initial frame. In some cases, a first frame of the sequence of frames 802 can be selected as the initial frame. In one illustrative example, such as in a real-time video recording, the initial frame can be the first frame of the video based on an end user providing an input indicating the desired size of the object with in the frame (e.g., a pinch gesture to zoom into the ideal camera zooming ratio), after which the video recording can begin. In another illustrative example, such as in a video playback (e.g., of a previously recorded video) or any posting processing based auto zoom function, an end user can choose any frame of the video and can provide an input (e.g., a pinch input to zoom) with respect to the frame to indicate the desired size of the object, which will result in setting that frame as the initial frame.

In some examples, the ROI can be determined based on a user selection of a portion of the initial frame, such as an object depicted in the initial frame. The user input can be received using any input interface of a device including the frame cropping and scaling system 800 or other device. For instance, the input interface can include a touchscreen, an electronic drawing tool, a gesture-based user interface (e.g., one or more image sensors used to detect gesture input), a voice input based user interface (e.g., a speaker and voice recognition tool used to identify voice inputs), and/or other user interface. In some examples, the object selection can include a tap (e.g., a single tap, a double tap, or the like) on an object displayed in the initial frame, the user drawing a bounding box around the object, the user providing an input (e.g., a pinch including bringing two fingers together or apart) on a touchscreen interface causing the interface to zoom in on the object, or other type of object selection. In some cases, guidance can be provided for the end user on how to utilize the feature of keeping a target object size unchanged throughout a video or other sequence of frames. For instance, a prompt can be displayed to the user indicating how to select an object to keep fixed throughout the video. For a video, the user can select an object of interest by tapping (e.g., on a touchscreen) on the object or drawing a bounding box around the object in the initial frame of the video. Based on the selected portion of the initial frame, the ROI determination engine 804 can define a ROI around the selected portion (e.g., around a selected object). The ROI indicates a size (e.g., an ideal size) for which to keep the object throughout the video or other sequence of frames. For example, a user can zoom in on the object to indicate the size of the object the user desires to maintain throughout the video or other sequence of frames, and the ROI determination engine 804 can define the ROI around the object with the indicated size.

In some examples, an object in the initial frame can be automatically detected (e.g., using object detection and/or recognition) in the initial frame, and the ROI determination engine 804 can define a ROI around the detected object. The object can be detected using object detection and/or recognition technique (e.g., a facial detection and/or recognition algorithm, a feature detection and/or recognition algorithm, an edge detection algorithm, a boundary tracing function, any combination thereof, and/or other object detection and/or recognition technique). Any of the detection and tracking techniques described above can be used to automatically detect an object in the initial frame. In some cases, feature detection can be used to detect (or locate) features of objects from the initial frame. Based on the features, object detection and/or recognition can detect an object and in some cases can recognize and classify the detected object into a category or type of object. For instance, feature recognition may identify a number of edges and corners in an area of the scene. Object detection may detect that the detected edges and corners in the area all belong to a single object. In the event face detection is performed, the face detection may identify that the object is a human face. Object recognition and/or face recognition may further identify the identity of the person corresponding to that face.

In some implementations, the object detection and/or recognition algorithm can be based on a machine learning model trained using a machine learning algorithm on images of the same types of objects and/or features that may extract features of the image and detect and/or classify the object comprising those features based on the training of the model by the algorithm. For instance, the machine learning algorithm may be a neural network (NN), such as a convolutional neural network (CNN), a time delay neural network (TDNN), a deep feed forward neural network (DFFNN), a recurrent neural network (RNN), an auto encoder (AE), a variation AE (VAE), a denoising AE (DAE), a sparse AE (SAE), a markov chain (MC), a perceptron, or some combination thereof. The machine learning algorithm may be a supervised learning algorithm, an unsupervised learning algorithm, a semi-supervised learning algorithm, a generative adversarial network (GAN) based learning algorithm, any combination thereof, or other learning techniques.

In some implementations, a computer vision-based feature detection and/or recognition technique can be used. Different types of computer vision-based object detection algorithms can be used. In one illustrative example, a template matching-based technique can be used to detect one or more hands in an image. Various types of template matching algorithms can be used. One example of a template matching algorithm can perform Haar or Haar-like feature extraction, integral image generation, Adaboost training, and cascaded classifiers. Such an object detection technique performs detection by applying a sliding window (e.g., having a rectangular, circular, triangular, or other shape) across an image. An integral image may be computed to be an image representation evaluating particular regional features, for example rectangular or circular features, from an image. For each current window, the Haar features of the current window can be computed from the integral image noted above, which can be computed before computing the Haar features.

The Harr features can be computed by calculating sums of image pixels within particular feature regions of the object image, such as those of the integral image. In faces, for example, a region with an eye is typically darker than a region with a nose bridge or cheeks. The Haar features can be selected by a learning algorithm (e.g., an Adaboost learning algorithm) that selects the best features and/or trains classifiers that use them, and can be used to classify a window as a face (or other object) window or a non-face window effectively with a cascaded classifier. A cascaded classifier includes multiple classifiers combined in a cascade, which allows background regions of the image to be quickly discarded while performing more computation on object-like regions. Using a face as an example of a body part of an external observer, the cascaded classifier can classify a current window into a face category or a non-face category. If one classifier classifies a window as a non-face category, the window is discarded. Otherwise, if one classifier classifies a window as a face category, a next classifier in the cascaded arrangement will be used to test again. Until all the classifiers determine the current window is a face (or other object), the window will be labeled as a candidate for being a hand (or other object). After all the windows are detected, a non-max suppression algorithm can be used to group the windows around each face to generate the final result of one or more detected faces.

Returning to FIG. 8B, the ROI determination engine 804 can define the ROI based on the selected portion of the initial image (e.g., a selected object) or based on a detected object in the initial image. As noted above, the ROI can be represented by a bounding box or other type of bounding region. In some cases, the ROI determination engine 804 can generate a bounding box for the ROI that fits to the boundaries of the object in the ROI. For example, a maximum x-coordinate (in the horizontal direction), a minimum x-coordinate, a maximum y-coordinate (in the vertical direction), and a minimum y-coordinate can be determined for the object, and the ROI can be defined having the maximum x-coordinate, the minimum x-coordinate, the maximum y-coordinate, and the minimum y-coordinate. In some cases, the bounding box for the ROI can be defined around the object and not limited to the boundaries of the object in the ROI.

The ROI determination engine 804 can determine a size of the object and/or the region of interest including the object in the initial frame. The size of the object can be used as a reference size to determine how much to crop and scale subsequent frames of the sequence of frames 802. In some cases, a user can adjust the size of the region of interest and/or the object in order to define a preferred size for the object in the sequence of frames. For example, the first frame can be displayed (e.g., as a preview image) and a user can adjust a zoom amount of the image to make the object larger (by zooming in) or smaller (by zooming out). In such an example, once the user finishes zooming and the final object size is determined for the initial frame, the size of the object and/or the region of interest including the object is determined and used as the reference size. The reference size can then be used to determine how much to crop and scale subsequent frames of the sequence of frames 802.

Subsequent frames (captured after the initial frame) of the sequence of frames 802 can then be input to the frame cropping and scaling system 800. The operations of the object detection and tracking system 806, the frame cropping engine 808, the frame scaling engine 810, and the smoothing engine 812 will be described with respect to a particular subsequent frame after the initial frame (e.g., the first subsequent frame occurring after the initial frame). However, the same or similar operations can be performed for some or all subsequent frames occurring after the initial frame in the sequence of frames 802.

The object detection and tracking system 806 can detect and track the object in subsequent frames of the sequence of frames. For instance, at block 824 of FIG. 8C, the process 820 can perform object detection and tracking to detect and track the object in the sequence of frames. In some examples, the object can be detected and tracked using the techniques performed by the video analytics system 200 described above with respect to FIG. 2-FIG. 7.

The frame cropping engine 808 can crop the subsequent frame, and the frame scaling engine 810 can scale the subsequent frame so that the size of the object is maintained in the subsequent frame with the same size that was determined in the initial frame. For instance, at block 826 of FIG. 8C, the process 820 can perform video frame cropping and scaling of the subsequent frame. In some cases, the cropping and scaling can be performed to maintain the object with the same size as that determined in the initial frame and also to maintain the object in a particular location in each frame. For instance, the cropping and scaling can be performed to maintain the object at the center of each subsequent frame, at a position in each subsequent frame where the object was initially located in the initial frame, a location defined by the user, or other location within the subsequent frames. As described in more detail below, the frame scaling engine 810 can calculate a scaling factor for each subsequent frame of the sequence of frames 802. In one illustrative example using a diagonal length of the bounding boxes for purposes of explanation, the scaling factor can be determined by comparing the diagonal length of the bounding box in the initial frame and the diagonal length of the bounding box in the current frame being processed. The ratio between the diagonal lengths can be used as the scaling factor. The scaling factor can be used to scale each of the subsequent frames so that the object in a current frame is the same size as the object in the initial frame. Details of the cropping and scaling will be described below.

The smoothing engine 812 can apply one or more smoothing functions so that the cropping and scaling of the subsequent frame are performed gradually, which can minimize the frame-to-frame movement and re-sizing of the object in the sequence of frames. For example, an initial cropping and scaling output from the frame cropping engine 808 and frame scaling engine 810 can indicate that the subsequent frame will be cropped and scaled by a certain amount. The smoothing engine 812 can determine a modified cropping and scaling amount in order to reduce the amount by which the subsequent frame will be modified. The smoothing function(s) can prevent the object from appearing to move in an unnatural (e.g., jumpy) manner in the sequence of frames 802 due to the cropping and scaling amounts determined by the frame cropping engine 808 and frame scaling engine 810.

In some cases, the cropping, scaling, and smoothing can be based on a point (e.g., a center point) on the object or a point (e.g., a center point) within the bounding box associated with the ROI including object, and/or can be based a distance associated with the object (e.g., a distance between a first part of the object and a second part of the object) or a distance associated with the bounding box (e.g., a diagonal distance of the bounding box) representing the ROI including object. For instance, an amount of cropping to perform in order to move or displace the object in the subsequent frame can be performed with respect to a point on the object or a point within the bounding box. In another example, the amount of scaling to perform to make the object larger or smaller can be based on a distance associated with the object (e.g., between different parts of the object) or a distance associated with the bounding box (e.g., a diagonal distance of the bounding box).

The frame cropping and scaling can proceed along with the actual changes of the target object size. The smoothing engine 812 can output final output frames 814 (e.g., an output video) that will have the effect of the object having a fixed size (based on the reference size determined for the object in the initial frame) and in some cases being maintained in a same location throughout the sequence of frames. For example, at block 828 of FIG. 8C, the process 820 can generate an output video including the fixed size and position effect for the object based on the target fix size feature described above.

Figure 9A:
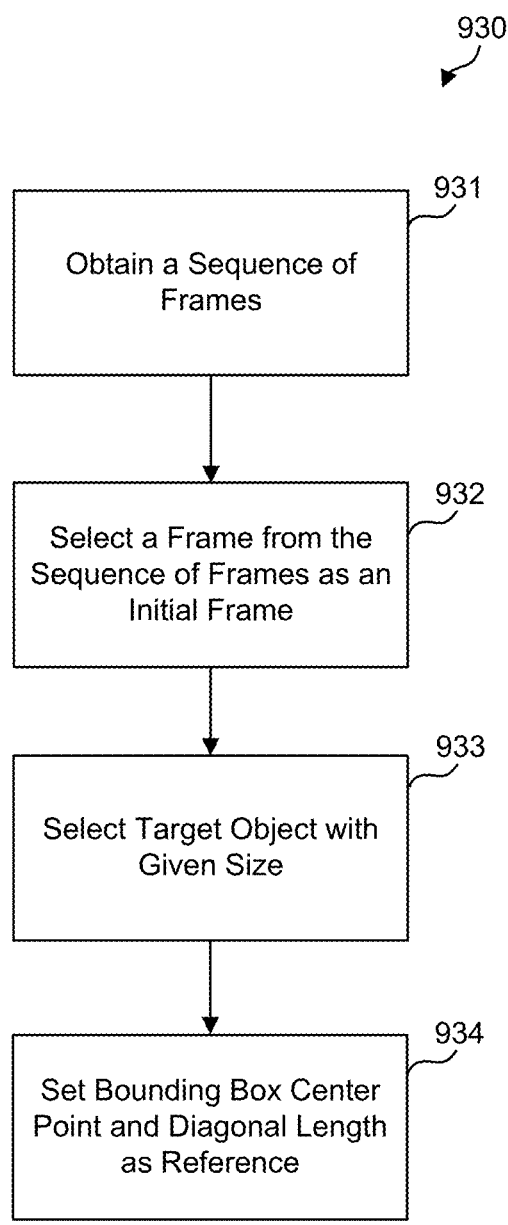
FIG. 9A is a flow diagram illustrating another example of a frame cropping and scaling process, in accordance with some examples.
Figure 9B:
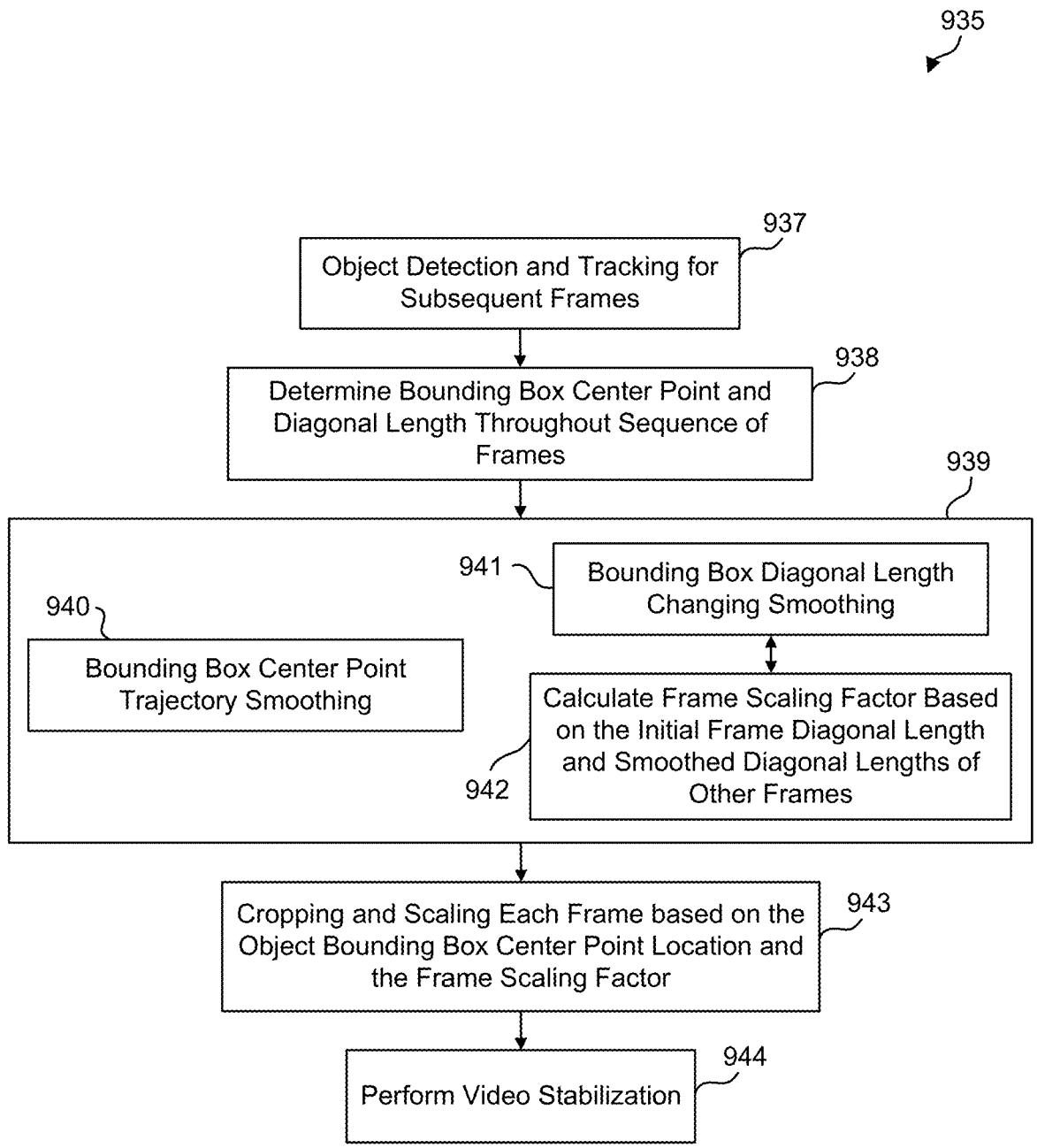
FIG. 9B is a flow diagram illustrating another example of a frame cropping and scaling process, in accordance with some examples.

FIG. 9A and FIG. 9B are flow diagrams illustrating other examples of processes 930 and 935 that can be performed by the frame cropping and scaling system 800 for a video. In some examples, the processes 930 and/or 935 can be performed based on an operation being selected by a user. For example, a device can receive user input from a user (e.g., touch input via a touchscreen of a device, voice input via a microphone of the device, a gesture input using one or more cameras of the device, among others) instructing the device to capture a video and to maintain an object in the video with a fixed size. Based on the user input, the device can perform the processes 930 and/or 935.

The processes 930 and 935 are described as being performed for a pre-recorded video (in which case all frames of the video are available for processing). However, the processes 930 and 935 can be modified in some cases for processing live video. In some examples, the process 930 can be performed prior to performing the process 935. For example, the process 930 can be performed to select an initial video frame from a sequence of frames and to set an object bounding box center point (or other point) and an object bounding box diagonal length (or other length) as a reference point. The process 935 can be performed to crop and scale subsequent video frames to maintain the size and/or position of the object throughout the sequence of frames.

As shown in FIG. 9A, at block 931, the process 930 includes obtaining a sequence of frames. The sequence of frames can be a video, a group of consecutively captured images, or other sequence of frames. At block 932, the process 930 includes selecting or determining a video frame from the sequence of frames to use as an initial frame (or reference frame). In one example, a first frame of the sequence of frames 802 can be selected as the initial frame. As noted above, the initial frame can be used as the frame for determining an initial ROI.

At block 933, the process 930 includes selecting a target object with a given size (e.g., an ideal size). As described above, the target object (or ROI) can be selected based on user input or can be automatically detected. For instance, the object or ROI can be determined based on a user input indicating a selection of a portion of the initial frame, such as an object depicted in the initial frame. In one illustrative example, the user can pinch-to-zoom (e.g., using a pinch gesture on a touchscreen interface) or provide another input to cause the display to zoom in on the target object. In some cases, the process 930 can include generating a bounding box for the target object or ROI in the initial frame in the sequence of frames (e.g., video). For instance, an ROI can be determined for the object, and the bounding box can be generated to represent the ROI.

At block 934, the process 930 includes setting a bounding box center point and a diagonal length as a reference to use for subsequent frames of the sequence of frames (e.g., for performing the process 935 on the subsequent frames). While a bounding box center point and a diagonal length of the bounding box are used herein for illustrative purposes, other points and lengths can be used to perform the cropping, scaling, smoothing, and/or other operations described herein. In some examples, instead of a center point of the bounding box, a different point on the bounding box can be used as a reference point, such as the top-left point of the bounding box. In another example, a point on the object in the bounding box can be used as a reference point, such as a center point of the object. In some examples, instead of the diagonal length of the bounding box, a length between two points of the object in the bounding box can be used to determine the size of the object in the current subsequent frame. For instance, if the object is a person, a length between the top of the head of the person and the bottom of the feet of the person can be used as the length.

As shown in FIG. 9B, at block 937, the process 935 includes performing object detection and tracking for each subsequent frame (or a subset of the subsequent frames) of the sequence of frames that follow the initial frame, similar to block 824 of the process 820. The object and tracking can be performed to track the object across each frame of the video. In some examples, the process 935 can perform a coordinate transformation to match each subsequent frame to the initial frame. For example, the coordinate transformation can be performed to make each subsequent frame the same size as the initial frame. In one illustrative example, the coordinate transformation can be an upscaling process. In another illustrative example, the coordinate transformation can be an downscaling process.

At block 938, the process 935 includes determining a bounding box center point and a diagonal length of the bounding box throughout the sequence of frames of the video. For instance, based on the object detection and tracking performed by the object detection and tracking system 806, bounding box information can be obtained for each frame from the video. The center point location and diagonal length of each bounding box in each video frame can be determined and used as an indicator of the object movement trajectory and the change in object size throughout the video.

For example, all frames of the sequence of frames of the video can be processed to determine the center point and the diagonal length of each bounding box in each frame. The center point and diagonal length of the bounding box in each frame can be used by the frame cropping engine 808, the frame scaling engine 810, and/or the smoothing engine 812 to perform cropping, scaling, and smoothing (respectively) of the subsequent frames of the video. For instance, the center point of the bounding can be used as a reference to determine the location of the object within a frame, and the diagonal length can be used to determine the size of the object in a current subsequent frame relative to the size of the object in the initial frame. While a bounding box center point and a diagonal length of the bounding box are used herein for illustrative purposes, other points and lengths can be used to perform the cropping, scaling, and smoothing in some implementations. In some examples, instead of a center point of the bounding box, a different point on the bounding box can be used as a reference point, such as the top-left point of the bounding box. In another example, a point on the object in the bounding box can be used as a reference point, such as a center point of the object. In some examples, instead of the diagonal length of the bounding box, a length between two points of the object in the bounding box can be used to determine the size of the object in the current subsequent frame. For instance, if the object is a person, a length between the top of the head of the person and the bottom of the feet of the person can be used as the length.

Block 939 represents the smoothing operations that can be performed by the smoothing engine 812. At block 940, the process 935 includes performing bounding box center point trajectory smoothing. The smoothing engine 812 can perform the bounding box center point trajectory smoothing based on any suitable smoothing algorithm. One example of a smoothing algorithm that be based on a moving average algorithm. The moving average technique can be applied to smooth the change in the bounding box center point location and diagonal length across the subsequent frames. In general, the moving average is used to analyze the time-series data (such as video) by calculating averages of different subsets of the complete dataset (e.g., different frames of the video). Based on the moving average, the data can be smoothed so that less drastic changes take place between consecutive portions of the data.

The moving average can be based on a sliding window that is used to take the average over a set number of time periods (e.g., a number of video frames). For instance, the number of time periods can be based on the time between consecutive frames of video (e.g., 33 ms in 30 frame per second video). The moving average can be an equally weighted mean of the previous n data. For instance, defining a sequence of n values as:

$$x_1, x_2, \ldots, x_n$$

then the equally weighted rolling average for the n data points will be essentially the mean of the previous M data-points, where M is the size of the sliding window:

$$\bar{v}_{SM} = \frac{x_n + x_{n-1} + \cdots + x_{M-(n-1)}}{M}$$

$$\bar{v}_{SM} = \frac{1}{M} \sum_{i=0}^{n-1} x_{m-1}$$

For calculating succeeding rolling average values, a new value can be added into the sum, and the previous time period value can be dropped out. The previous time period can be dropped because the average of previous time periods are available, in which case a full summation each time is not required. Calculation of the succeeding rolling average values can be formulated as follows:

$$\bar{v}_{SM} = \bar{v}_{SM_{prev}} + \frac{1}{n}(x_M - x_{M-n})$$

For a current frame of the video being processed by the system 800 according to the process 935, the (x, y) coordinate locations of the bounding box center points of a certain number of M video frames of the video can be processed using the moving average formulation. For instance, at block 940, a rolling average $\bar{v}_{SM}$ of the bounding box center point coordinates of the M video frames can be determined. The rolling average $\bar{v}_{SM}$ can then be used as the center point location for the bounding box in the current video frame.

At block 941, the process 935 includes performing smoothing of the size change of the bounding box diagonal length. The smoothing engine 812 can smooth the change in size of the bounding box diagonal length based on any suitable smoothing algorithm. In some cases, the smoothing engine 812 can use the moving average algorithm described above. For instance, for a current frame of the video being processed, the smoothing engine 812 can process the diagonal lengths of the bounding boxes from a certain number of M video frames of the video using the moving average formulation. For instance, at block 942, the process 935 can determine a rolling average $\bar{v}_{SM}$ of the bounding box diagonal lengths of the M video frames. The process 935 can use the rolling average $\bar{v}_{SM}$ as the diagonal length for the bounding box in the current video frame.

In some cases, for a current frame of the video being processed, the object detection and tracking may not be accurate. For example, the (x,y) coordinate locations of the detected object bounding box center point (or other point of the bounding box or object) may be wrong. A calculated moving (or rolling) average $\bar{v}_{SM}$ of the bounding box center point coordinates of the current frame can minimize a false alarm (by minimizing a wrongly detected/tracked object bounding box locations), and can largely keep the object on the correct moving or tracking trajectory. For instance, a calculated moving (or rolling) average $\bar{v}_{SM}$ of the bounding box center point (or other point of the bounding box or object) can be more accurate than the actual detected center point. The moving average can also minimize false alarms with respect to the object size (e.g., by minimizing a wrongly detected/tracked object bounding box diagonal length or wrongly detected/tracked length between parts or portions of the object). For instance, a calculated moving (or rolling) average $\bar{v}_{SM}$ of the bounding box diagonal length can be more accurate than the actual detected diagonal length in a given frame.

At block 942, the process 935 includes calculating frame scaling factors based on the initial frame diagonal length and the smoothed diagonal of other frames in the video. For example, instead of using the actual diagonal length of a bounding box in a current frame, a scaling factor can be determined for a current frame of the video (other than the initial frame) using the smoothed diagonal length (e.g., the average diagonal length) determined by the smoothing engine 812 for the current frame. The scaling factor can be a scaling ratio in some cases. The frame scaling engine 810 can compare the smoothed diagonal length of the bounding box in the current frame to the diagonal length of the bounding box in the initial frame to determine the scaling factor for the current frame.

In some examples, the process 935 can include determining whether a video resource change has occurred. For example, the frame cropping and scaling system 815 can support multiple video resources, where an end user can import multiple videos for performing the automatic zoom (cropping and scaling) operation. To determine whether a video resource change has occurred, the process 935 can determine whether a current video is still being played. If the current video is being played, the process 935 can continue to block 943. If it is determined that another video source has been started, a no update operation can be performed, in which case the system can re-start from the first beginning of the process (e.g., beginning at block 931 of process 930).

At block 943, the process 935 includes cropping and scaling of each frame in the video based on the smoothed object bounding box center point location (e.g., the average center point location determined for each frame) and the frame scaling factor determined for each frame at block 939. Based on the cropping and scaling, a cropped and scaled subsequent frame is generated with an object having a same size and a same relative location in the subsequent frame as a size and location of the object in the initial frame.

Figure 10A:
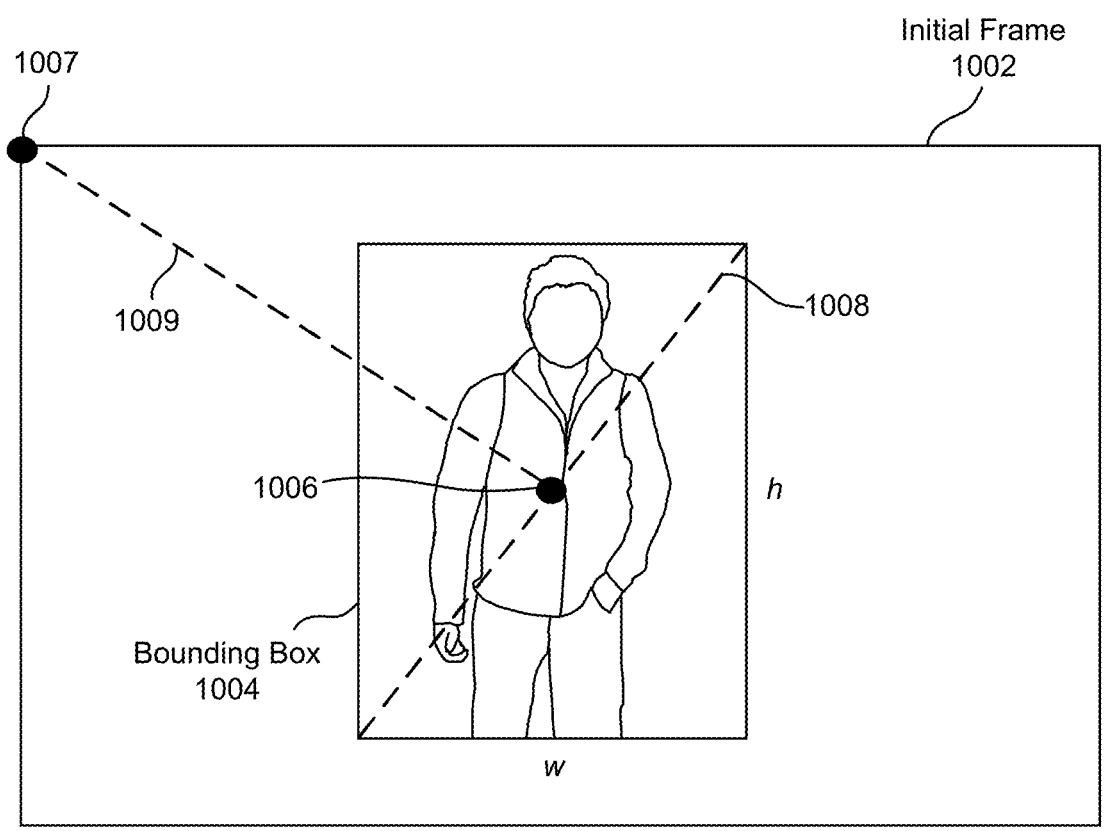
FIG. 10A is a diagram illustrating an example of an initial frame of a video, in accordance with some examples.
Figure 10B:
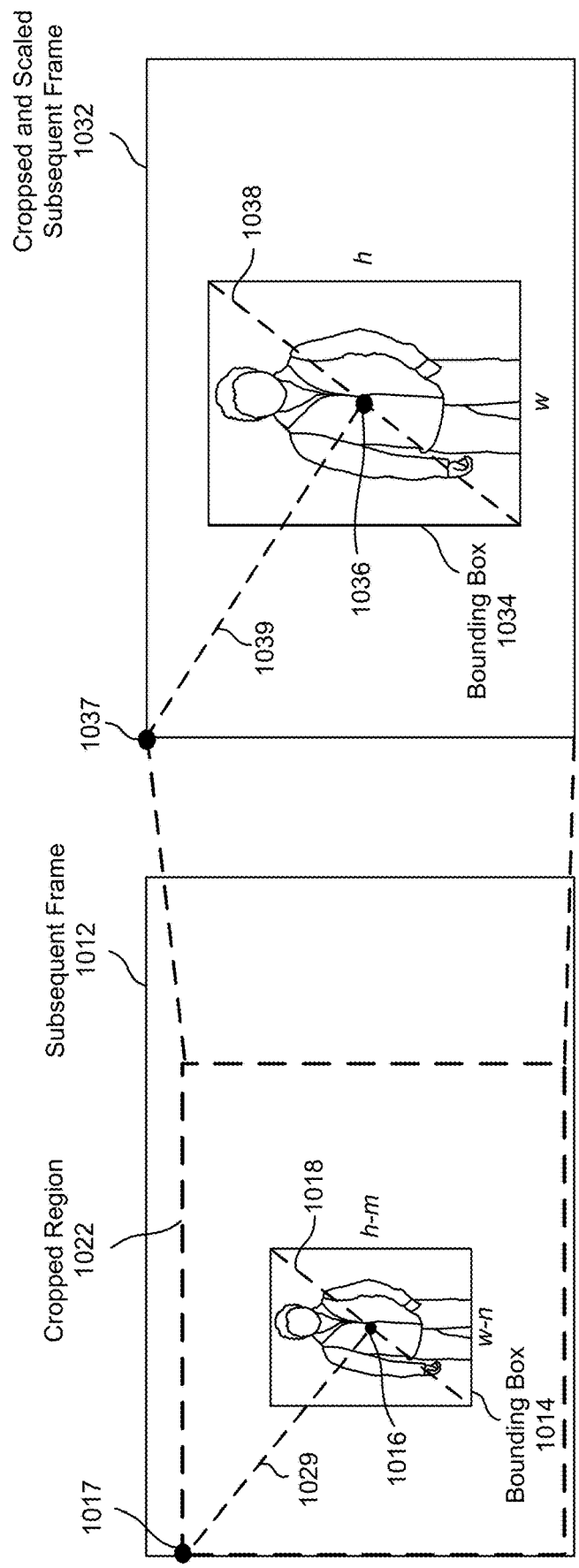
FIG. 10B is a diagram illustrating an example of a subsequent frame of a video occurring after the initial frame of FIG. 10A, in accordance with some examples.

An example is described with respect to FIG. 10A and FIG. 10B. FIG. 10A is a diagram illustrating an example of an initial frame 1002 of a video. A user has selected a person as an object of interest. A bounding box 1004 is generated to represent a region of interest for the person. The bounding box 1004 is shown with a height of h and a width of w. A location (e.g., an (x, y) coordinate location) of the center point 1006 of the bounding box 1004 and a diagonal length 1008 of the bounding box 1004 are determined and used as references from which to crop and scale subsequent frames of the video in order to maintain the person with a constant size and location in the subsequent frames.

FIG. 10B is a diagram illustrating an example of a subsequent frame 1012 occurring after the initial frame 1002 in the video. Based on object detection and tracking, a bounding box 1014 is generated around the person in the subsequent frame 1012. The bounding box 1014 has a width of w-n and a height of h-m. The width w-n of the bounding box 10014 is smaller than the width w of the bounding box 1004 in the initial frame 1002, and the height of h-m of the bounding box 1014 is smaller than the height h of the bounding box 1004 in the initial frame 1002. A location (e.g., an (x, y) coordinate location) of the center point 1016 and a diagonal length 1008 of the bounding box 1004 are determined.

In some examples, the frame cropping engine 808 can crop the subsequent frame 1012 so that the person depicted in the subsequent frame 1012 is maintained in the middle of the frame 1012. For instance, the frame cropping engine 808 can crop the subsequent frame 1012 to generate a cropped region 1022 so that the center point 1016 of the bounding box 1014 is in the center of the cropped region 1022. In some examples, the frame cropping engine 808 can crop the subsequent frame 1012 so that the person depicted in the frame 1012 is maintained at the same relative position as the position the person was located in the initial frame 1002. For instance, the frame cropping engine 808 can determine the location of the center point 1006 of the bounding box 1004 relative to a point in the initial frame 1002 that is common in all frames of the video. For example, the common point in all of the frames can be the top-left point in the video frames (e.g., the top-left point 1007 in the initial frame 1002). A relative distance 1009 is shown in FIG. 10A from the center point 1006 of the bounding box 1004 in the initial frame 1002 to the top-left point 1007. The frame cropping engine 808 can crop the subsequent frame 1012 to generate a cropped region 1022 so that the center point 1016 is at a same relative location and distance 1029 relative to a top-left point 1017 of the cropped region 1022 as the center point 1006 relative to the top-left point 1007 in the initial frame 1002.

The frame scaling engine 810 can determine a scaling factor (e.g., a scaling ratio) for scaling the cropped region 1022 by comparing the smoothed diagonal length of the bounding box 1014 in the subsequent frame 1012 to the diagonal length 1008 of the bounding box 1004 in the initial frame 1002. The smoothed diagonal length of the bounding box 1014 can be determined by the smoothing engine 812 as described above. For example, if the actual diagonal length 1018 of the bounding box 1014 is a value of 1.5, the smoothed diagonal length for the bounding box 1014 can be a determined as a value of 1.2 (based on a rolling average determined as described above). The diagonal length 1008 of the bounding box 1004 in the initial frame 1002 can be a value of 3. The scaling factor can be determined as scaling ratio $$(SR) = \frac{\text{Length}_{init.frame}}{\text{Length}_{subseq.frame}}.$$

Using such a formulation based on the diagonal length 1008 versus the diagonal length 1018, a scaling ratio of $$SR = \frac{3}{1.2} = 2.5$$

can be determined. Based on the scaling ratio of 2.5, the cropped region 1022 can be increased by a factor of 2.5 (made 2.5 times larger).

As a result of the cropping a scaling, a cropped and scaled subsequent frame 1032 is generated. The diagonal length 1038 of the bounding box 1034 is the same as the diagonal length 1008 of the bounding box 1004, and thus the person depicted in the cropped and scaled subsequent frame 1032 is the same size as the person depicted in the initial frame 1002. In some examples, the center point 1036 of the bounding box 1034 is in the center of the cropped and scaled subsequent frame 1032. In some examples, the location and distance 1039 of the center point 1036 relative to the top-left point 1037 of the frame 1032 is the same as the location and distance 1009 of the center point 1006 relative to the top-left point 1007 in the initial frame 1002, resulting in the person being maintained in the cropped and scaled subsequent frame 1032 at the same position as the person was located in the initial frame 1032. The person depicted in the cropped and scaled subsequent frame 1032 is thus the same size as the person depicted in the initial frame 1002 and is maintained in a consistent location as other frames throughout the video.

Returning to FIG. 9B, the process 935 at block 944 includes performing video stabilization. Any suitable video stabilization technique can be used to stabilize the video frames. In general, video stabilization technology is used to avoid visual quality loss by reducing unwanted shakes and jitters of devices (e.g., mobile devices, hand-held cameras, head-mounted displays, etc.) during video capture. The video stabilization reduces shake and jitter without influencing moving objects or intentional camera panning. Video stabilization can be useful for handheld imaging devices (e.g., a mobile phone), which can be highly affected by shakes due to the smaller size of such devices. Unstable images are typically caused by undesired hand jiggling and intentional camera panning, where unwanted position fluctuations of the camera result in unstable image sequences. Using video stabilization techniques can ensure that high visual quality and stable video footage is obtained even in non-optimal conditions.

Figure 11:
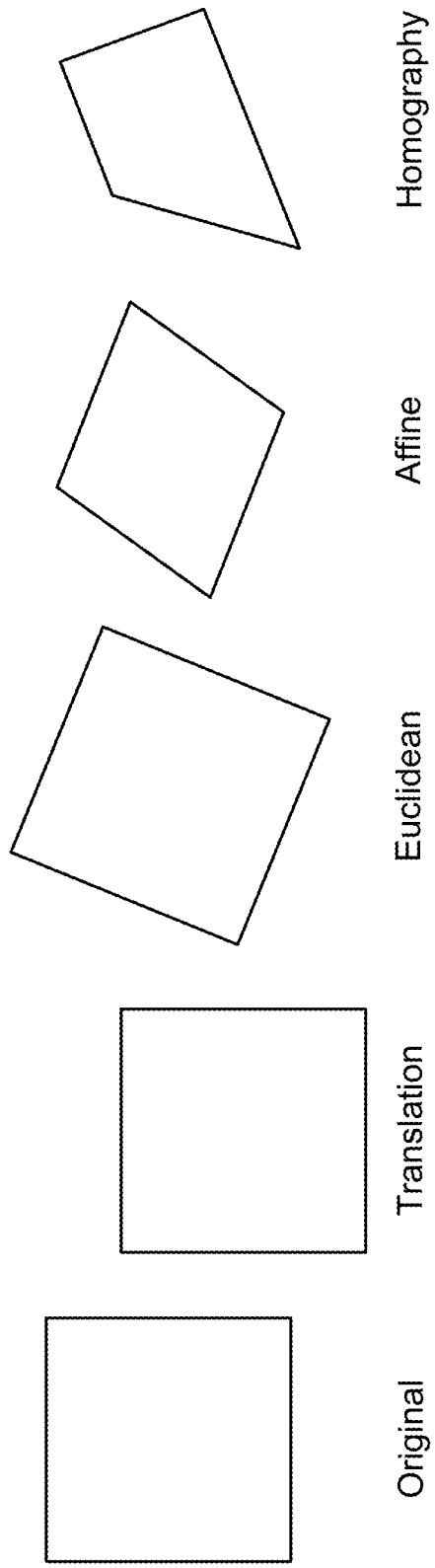
FIG. 11 is a diagram illustrating examples of various motion models, in accordance with some examples.

One example of a video stabilization technique that can be performed is a fast and robust two-dimensional motion model of Euclidean transformation, which can be used by motion models to solve the video stabilization problem. In the Euclidean motion model, a square in an image can be transformed to any other square with a different location, size, and/or rotation for motion stabilization (because the camera movement between successive frames of a video is usually small). FIG. 11 is a diagram illustrating examples of applied motion models, including an original square and various transforms applied relative to the original square. The transforms include translation, Euclidean, Affine, and Homography.

Figure 12:
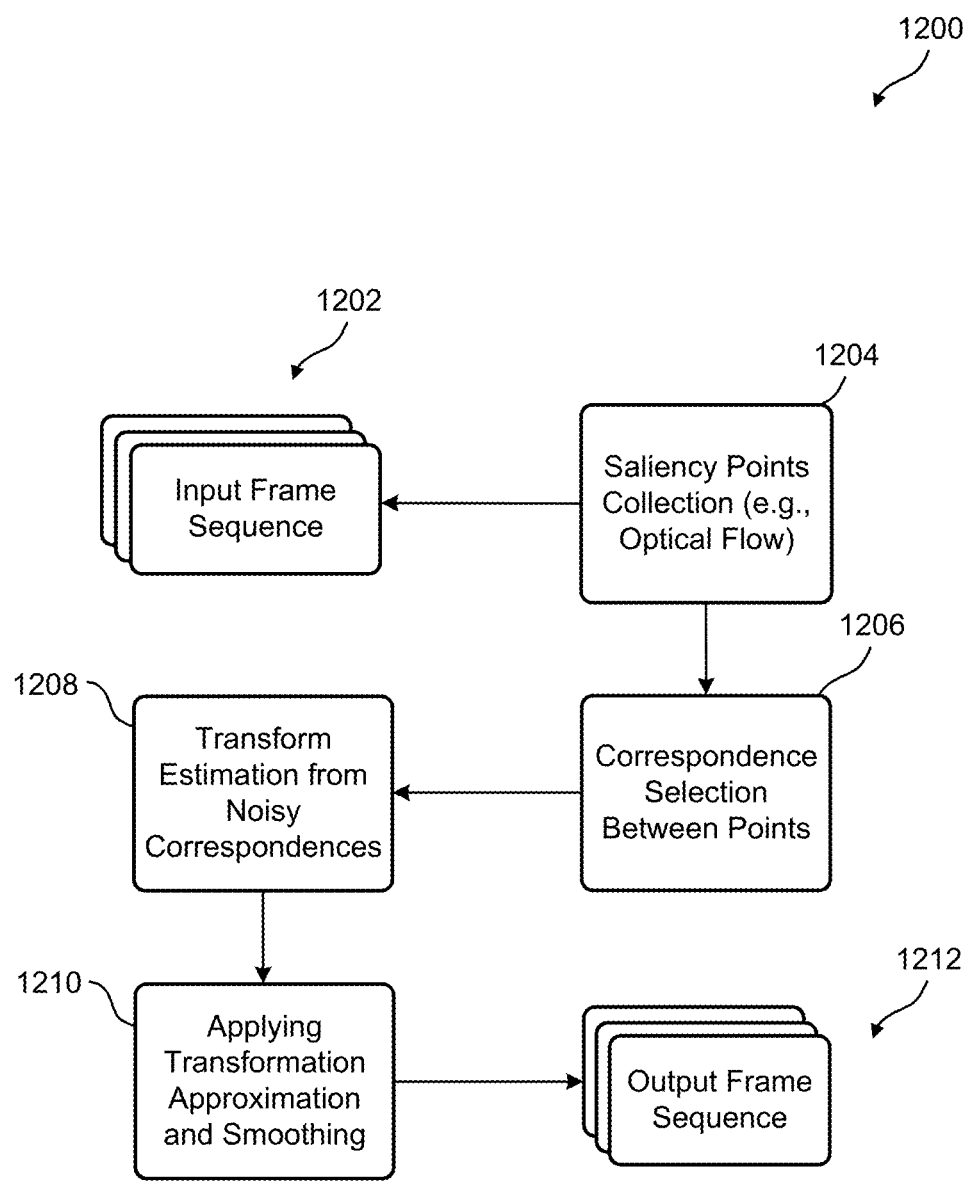
FIG. 12 is a flow diagram illustrating an example of a process for performing image stabilization, in accordance with some examples.

FIG. 12 is a flow diagram illustrating an example of a process 1200 for performing image stabilization. The image stabilization process includes tracking one or more feature points between two consecutive frames. The tracked features allow the system to estimate the motion between frames and compensate for the motion. An input frame sequence 1202 including a sequence of frames is provided as input to the process 1200. The input frame sequence 1202 can include the output frames 814. At block 1204, the process 1200 includes performing saliency points detection using optical flow. The saliency detection is performed to determine feature points in a current frame. Any suitable type of optical flow technique or algorithm can be used at block 1204. The optical flow motion estimation can be performed on a pixel-by-pixel basis in some cases. For instance, for each pixel in a current frame y, the motion estimation f defines the location of the corresponding pixel in the previous frame x. The motion estimation f for each pixel can include an optical flow vector that indicates a movement of the pixel between the frames. In some cases, the optical flow vector for a pixel can be a displacement vector (e.g., indicating horizontal and vertical displacements, such as x- and y-displacements) showing the movement of a pixel from a first frame to a second frame.

In some examples, optical flow maps (also referred to as motion vector maps) can be generated based on the computation of the optical flow vectors between frames. Each optical flow map can include a 2D vector field, with each vector being a displacement vector showing the movement of points from a first frame to a second frame (e.g., indicating horizontal and vertical displacements, such as x- and y-displacements). The optical flow maps can include an optical flow vector for each pixel in a frame, where each vector indicates a movement of a pixel between the frames. For instance, a dense optical flow can be computed between adjacent frames to generate optical flow vectors for each pixel in a frame, which can be included in a dense optical flow map. In some cases, the optical flow map can include vectors for less than all pixels in a frame, such as for pixels only belonging to one or more parts of an external observer being tracked (e.g., eyes of an external observer, one or more hands of an external observer, and/or other parts). In some examples, Lucas-Kanade optical flow can be computed between adjacent frames to generate optical flow vectors for some or all pixels in a frame, which can be included in an optical flow map.

As noted above, optical flow vectors or an optical flow map can be computed between adjacent frames of a sequence of frames (e.g., between sets of adjacent frames $x_t$ and $x_{t-1}$). Two adjacent frames can include two directly adjacent frames that are consecutively captured frames or two frames that are a certain distance apart (e.g., within two frames of one another, within three frames of one another, or other suitable distance) in a sequence of frames. Optical flow from frame $x_{t-1}$ to frame $x_t$ can be given by $Ox_{t-1}$, $x_t$=dof $(x_{t-1}, x_t)$, where dof is the dense optical flow. Any suitable optical flow process can be used to generate the optical flow maps. In one illustrative example, a pixel I(x, y, t) in the frame $x_{t-1}$ can move by a distance ($\Delta x$, $\Delta y$) in the next frame $x_t$. Assuming the pixels are the same and the intensity does not change between the frame $x_{t-1}$ and the next frame $x_t$, the following equation can be assumed:

$$I(x,y,t)=I(x+x,y+\Delta y,t+\Delta t).$$

By taking the Taylor series approximation of the right-hand side of the above equation, and then removing common terms and dividing by $\Delta t$, an optical flow equation can be derived:

$$f_x u + f_y v + f_t = 0,$$

where:

$$f_x = \frac{df}{dx};$$

$$f_y = \frac{df}{dy};$$

$$f_t = \frac{df}{dt};$$

$$u = \frac{\Delta x}{\Delta t}; \text{ and}$$

$$v = \frac{\Delta y}{\Delta t}.$$

Using the optical flow equation above, the image gradients $f_x$ and $f_y$ can be found along with the gradient along time (denoted as $f_t$). The terms u and v are the x and y components of the velocity or optical flow of I(x, y, t), and are unknown. An estimation technique may be needed in some cases when the optical flow equation cannot be solved with two unknown variables. Any suitable estimation technique can be used to estimate the optical flow. Examples of such estimation techniques include differential methods (e.g., Lucas-Kanade estimation, Horn-Schunck estimation, Buxton-Buxton estimation, or other suitable differential method), phase correlation, block-based methods, or other suitable estimation technique. For instance, Lucas-Kanade assumes that the optical flow (displacement of the image pixel) is small and approximately constant in a local neighborhood of the pixel I, and solves the basic optical flow equations for all the pixels in that neighborhood using the least squares method.

At block 1206, the process 1200 includes selecting correspondences between the saliency points in consecutive images. At block 1208, the process 1200 performs transform estimation from noisy correspondences. At block 1210, the process 1200 includes applying transformation approximation and smoothing in order to generate the output frame sequence 1212 including a sequence of output frames. For example, key feature points can be detected from the previous and current image frames, and then the feature points with a one-to-one correspondence will be used. Based on the location of the feature points that are used, a region based transformation can be applied to map the image content on the current image frame from previous frame.

In some examples, video frame extraction and merging are applied before and after the whole process 935 of FIG. 9B. For example, in some cases, the input and output of the system 800 can include image frames (and not video), in which case video frame extraction and merging are needed before and after the whole process.

In some examples, a native zooming ratio and camera lens switching function of a device (e.g., a mobile phone or smartphone) can be used to perform one or more of the techniques described herein. For example, the system can output one video with the target object fixed size effect described herein. Such a solution can be used as a real time feature (for live video) in some cases, and can automatically adjust the camera zooming ratio during the video recording.

Figure 13A:
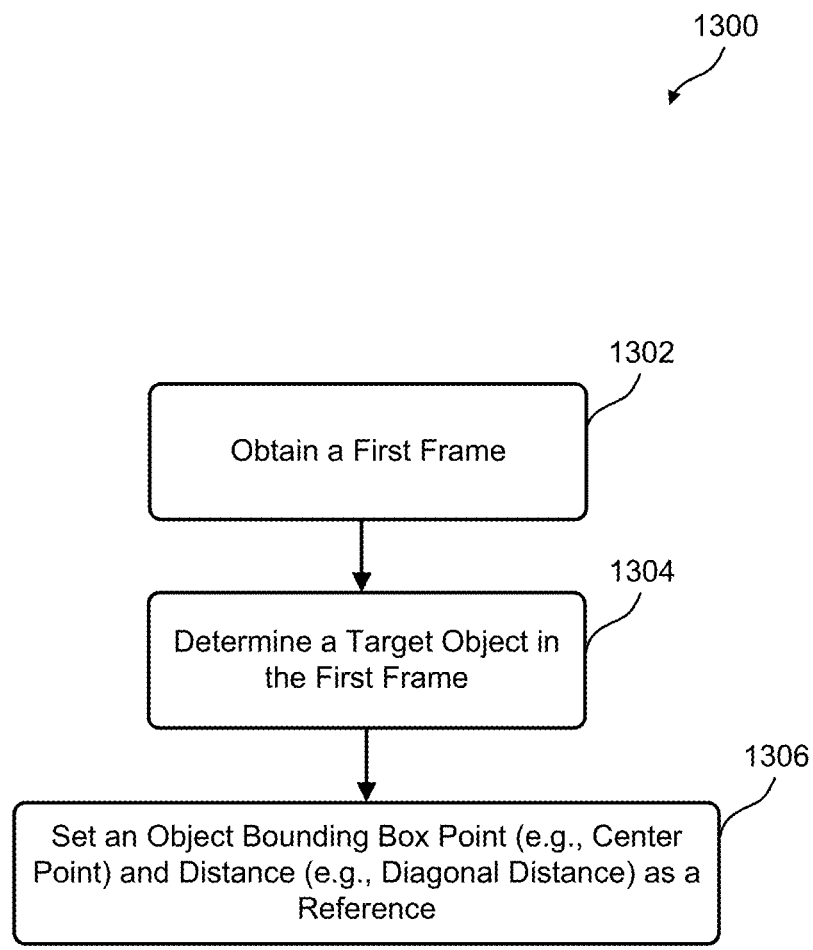
FIG. 13A is a diagram illustrating an example of a process for performing aspects of an automatic zoom function, in accordance with some examples.

In some examples, an automatic zoom operation can be performed using one or more of the techniques described above and/or using other techniques. FIG. 13A is a diagram illustrating an example of a process 1300 for performing aspects of the automatic zoom. For instance, the process 1300 can determine or set as reference a point (e.g., a center point) and distance (e.g., a diagonal length) of a bounding box of an object and/or region of interest in a first frame (or initial frame). In some examples, the process 1300 can begin based on an automatic zoom operation being selected by a user. For example, a device can receive user input from a user (e.g., touch input via a touchscreen of a device, voice input via a microphone of the device, a gesture input using one or more cameras of the device, among others) instructing the device to enter an automatic zoom mode. Based on the user input, the device can perform the process 1300. In some examples, once the automatic zoom operation is selected, the device can begin using the object detection and tracking system (e.g., object detection and tracking system 806 of FIG. 8B) in order to perform object detection and tracking of any regions or objects of interest.

At block 1302, the process 1300 includes obtaining a first frame (or initial frame) of a sequence of frames (e.g., a first video frame of a video for which a user identifies an object and/or region of interest). At block 1304, the process 1300 includes determining a target object of interest in the first frame. For example, as described above, the region of interest (ROI) determination engine 804 of FIG. 8B can determine an ROI in the first frame based on user input and/or automatically. The ROI can correspond to a target object (or object of interest). The ROI and/or target object can be represented by a bounding box or other bounding region. In some examples, the bounding box is visible in the frame when output to a display device. In some examples, the bounding box may not be visible when the frame is output to the display device. The frame at which the initial ROI is determined is referred to as the initial frame (or reference frame) of the sequence of frames.

As described above, in some examples the ROI can be determined based on a user selection of a portion of the initial frame, such as an object depicted in the initial frame. For example, a user can select the target object that will be used in the autozoom process to maintain the object with a fixed size (e.g., the size of the object in the initial frame) across multiple frames of the sequence of frames. The user input can be received using any input interface of the device, such as a touchscreen, an electronic drawing tool, a gesture-based user interface (e.g., one or more image sensors used to detect gesture input), a voice input based user interface (e.g., a speaker and voice recognition tool used to identify voice inputs), and/or other user interface. Any of the inputs described above with respect to FIG. 8C and FIG. 9 and/or other inputs can be provided by a user. For instance, the object selection can be performed based on a tap (e.g., a single tap, a double tap, or the like) on an object displayed in the initial frame, the user drawing a bounding box around the object, or other type of object selection. In some cases, guidance can be provided for the end user on how to utilize the feature of keeping a target object size unchanged throughout a video or other sequence of frames. For instance, a prompt can be displayed to the user indicating how to select an object to keep fixed throughout the video. For a video, the user can select an object of interest by tapping (e.g., on a touchscreen) on the object or drawing a bounding box around the object in the initial frame of the video. Based on the selected portion of the initial frame, the ROI determination engine 804 can define a ROI around the selected portion (e.g., around a selected object).

In some examples, an object in the initial frame can be automatically detected (e.g., using object detection and/or recognition) in the initial frame, and the ROI determination engine 804 can define a ROI around the detected object. The object can be detected using object detection and/or recognition technique (e.g., a facial detection and/or recognition algorithm, a feature detection and/or recognition algorithm, an edge detection algorithm, a boundary tracing function, any combination thereof, and/or other object detection and/or recognition technique).

At block 1306, the process 1300 includes determining or setting an object bounding box point and a distance as a reference. In one illustrative example, the point can include a center point of the bounding box. Other points of the bounding box can also be used in some cases, such as to top-left most point or corner of the bounding box. In another example, a point on the object in the bounding box can be used as a reference point, such as a center point of the object. In another illustrative example, the distance can be a diagonal length of the bounding box (e.g., a length from a bottom-left point of the bounding box to a top-right point of the bounding box or a length from a bottom-right point of the bounding box to a top-left point of the bounding box). In some examples, the distance can include a length between two points of the object in the bounding box. For instance, if the object is a person, a length between the top of the head of the person and the bottom of the feet of the person can be used as the length.

By setting the object center point (or other point) and diagonal length (or other distance) of the bounding box, the process 1300 can initialize the target object information including the object center point coordinates, the object bounding box diagonal length, and the current zooming ratio for the object.

Figure 13B:
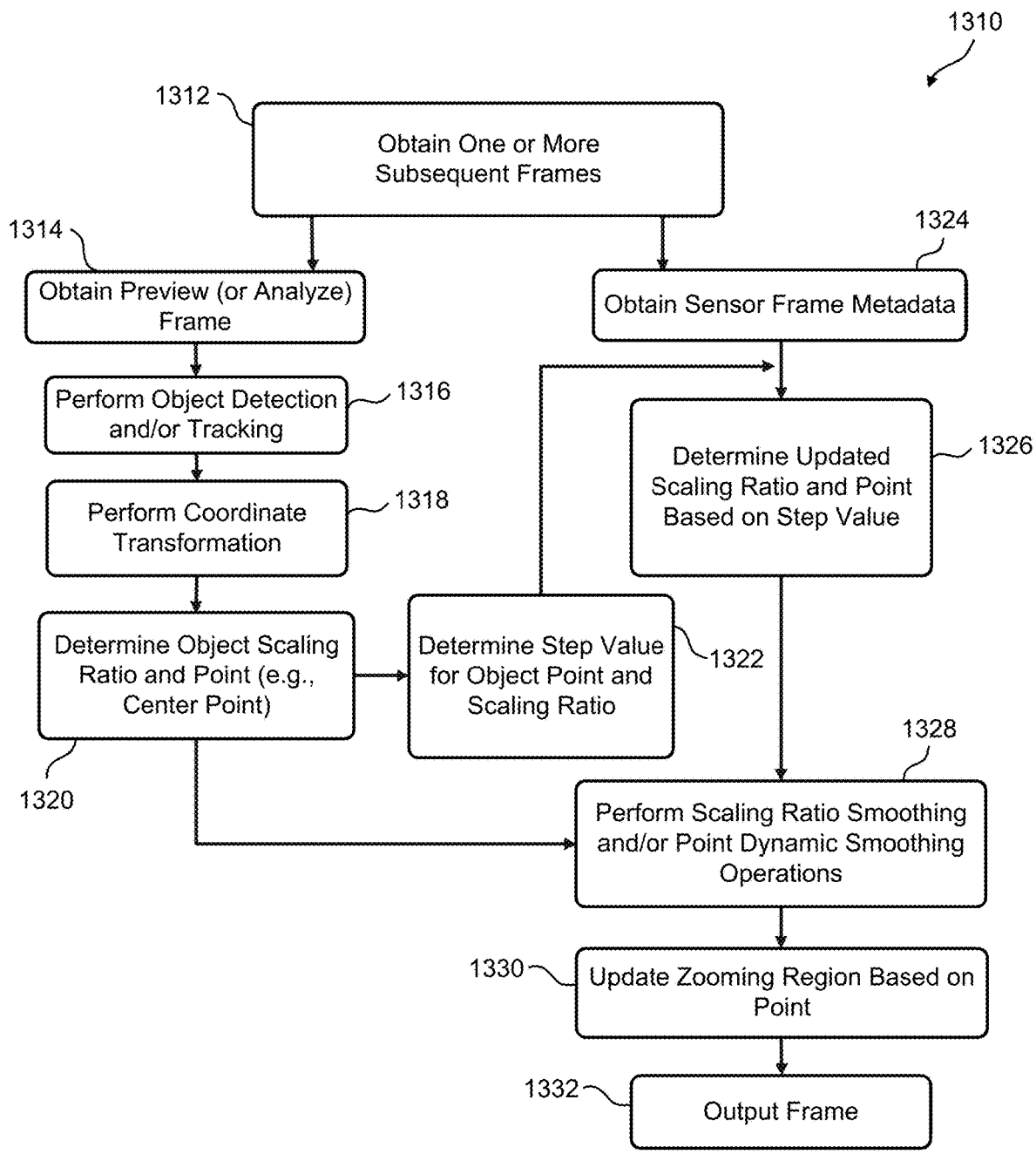
FIG. 13B is a diagram illustrating an example of a process for performing additional aspects of an automatic zoom function, in accordance with some examples.

FIG. 13B is a diagram illustrating an example of a process 1310 for performing additional aspects of the automatic zoom for one or more subsequent frames captured after the initial frame (e.g., occurring after the initial frame in the sequence of frames). At block 1312, the process 1310 includes obtaining the one or more subsequent frame. In some cases, a single iteration of the process 1310 can be performed for one frame at a time from the one or more subsequent frames. In some cases, a single iteration of the process 1310 can be performed for multiple frames frame at a time from the one or more subsequent frames. A subsequent frame being processed by the process 1310 is referred to as a current subsequent frame.

At block 1314, the process 1310 includes obtaining a frame from the display processing engine 807. The frame can be referred to as an analyze frame or preview frame. As described above with respect to FIG. 8A, the preview (or analyze) frame can have the same aspect ratio as an output frame but with lower resolution (a smaller size). For example, the preview frame can be a lower resolution version of the current subsequent frame as compared to a full output version of the current subsequent frame. The frame cropping and scaling system (e.g., the frame cropping and scaling system 815 and/or the frame cropping and scaling system 800) can use the preview frame for object detection and tracking processing. For example, at block 1316, the process 1310 performs object detection and/or tracking to detect and/or track the target object (determined from the initial frame) in the preview frame (the lower resolution version of the current subsequent frame being processed by the process 1310). As described above, the frame analysis engine 811 can perform the object detection and/or tracking on the analysis (preview) frame.

At block 1318, the process 1310 performs coordinate transformation on the preview (analyze) frame. For example, because the preview frame and the sensor frame meta data (corresponding to the full output frame) have the same image content but different image resolutions, the coordinate transformation can be performed to make the preview frame and the full output frame the same size. In one illustrative example, the coordinate transformation can be an upscaling process. For instance, the process 1310 can upscale the preview frame so that it has a same resolution as the full output frame corresponding to the sensor frame metadata.

At block 1320, the process 1310 determines the point (e.g., the center point or other point) and the scaling ratio for the target object in the current subsequent frame based on tracked target object information. The tracked target object information includes information associated with the detected and tracked target object from the current subsequent frame. The tracked object information can include the detected object bounding box for the target object, a location of the bounding box, and a center point (or other point) of the bounding box. The point determined for the target object can include the same point as that determined for the target object in the initial frame. For example, if the point determined at block 1306 for the target object in the initial frame is a center point of the object or ROI, then the point determined at block 1320 for the target object in the current subsequent can also include a center point of the object or ROI.

At block 1322, the process 1310 includes determining or calculating a step value for the object point (e.g., the center point) determined at block 1320 and a step value for the scaling ratio determined at block 1320. In one illustrative example, the step value for the x-coordinate of the point can be determined as diff_x=(curr_x−prev_x)/frame_count, which is a linear step function. The term frame_count can be a constant integer, and can be defined as any suitable value (e.g., a value of 1, 2, 3, or other suitable integer). Using the linear step function, the step count can be determined as the difference in the x-coordinate of the center point of the target object in the current subsequent frame and the center point of the target object in a previous frame (e.g., an immediately previous frame before the current subsequent frame of a video), divided by the frame count. In another illustrative example, the step value for the y-coordinate of the point can be determined as diff_y=(curr_y−prev_y)/frame_count, similar to that used for the x-coordinate. In another illustrative example, the step value for the scaling ratio can be determined as diff_zoom=(curr_ratio−prev_ratio)/frame_count. For instance, the step count for the scaling ratio can be determined as the difference in the scaling ratio of the target object in the current subsequent frame and the scaling ratio of the target object in a previous frame (e.g., an immediately previous frame before the current subsequent frame of a video), divided by the frame count.

At block 1324, the process 1310 includes obtaining sensor frame metadata from the sensor frame metadata engine 813. As described above, the sensor frame metadata meta data can represent the output image information, and has the same image resolution as the output image. The image meta data frame has the same aspect ratio of the preview frame, but has a higher resolution.

At block 1326, the process 1310 includes determining an updated scaling ratio and an updated point (e.g., a center point) based on the step value (e.g., determined using the linear step function described above). The step value is calculated from linear step, where the parameter is stepped from the Start Value to the Stop Value using the Number of Steps in a linearly spaced sequence. The number of steps run will always be the parameter entered into the Number of Steps field.

At block 1328, the process 1310 includes performing scaling ratio smoothing and/or bounding box point trajectory smoothing operations based on the output from block 1320 (the object scaling ratio and point determined for the object in the current subsequent frame) and the output from block 1326 (the updated scaling ratio and point for the object). For example, the smoothing engine 812 can determine a smoothed value for the scaling ratio by performing the scaling ratio smoothing. In another example, the smoothing engine 812 can determine a smoothed value for the center point of the ROI or object by performing the bounding box center point trajectory smoothing. As described above, the scaling ratio smoothing operation smooths the size change of the bounding box (e.g., the size change of the diagonal length), allowing size of the target object in the images to be gradually changed from frame to frame. The bounding box point trajectory smoothing operation allows the object (e.g., based on the center point of the object) to gradually move from frame to frame.

Figure 14:
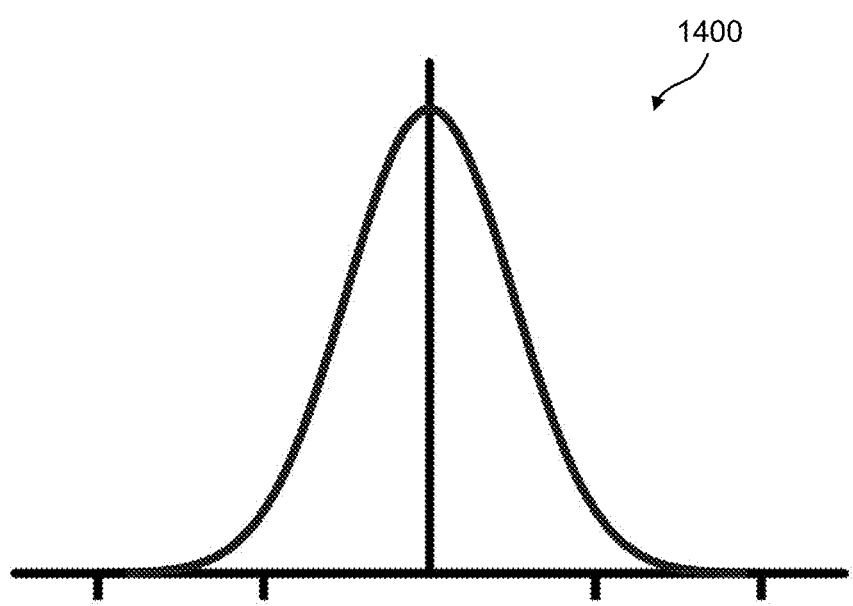
FIG. 14 is a graph illustrating an example of a Gaussian filter smoothing function, in accordance with some examples.

In some examples, the smoothing engine 812 can use the moving average algorithm described above to perform the scaling ratio smoothing and/or bounding box point trajectory smoothing operations. In some examples, the smoothing engine 812 can use a Gaussian filter function for the scaling ratio smoothing. FIG. 14 is a graph 1400 illustrating an example of a Gaussian filter smoothing function. For instance, a Gaussian Filter function with a window size of N can be used, where N represents an empirical threshold that can be set to any suitable value, such as N=31 or other value.

An illustrative example of a Gaussian filter smoothing function is shown below (with the window size N being shown as window_size):

```
function f = gaussian(window_size)
  sigma = double(window_size) / 5;
  h = exp(-((1:window_size) - ceil(window _size/2)).^2/(2* sigma ^2));
  f = h(:) / sum(h)
end
```

Figure 15:
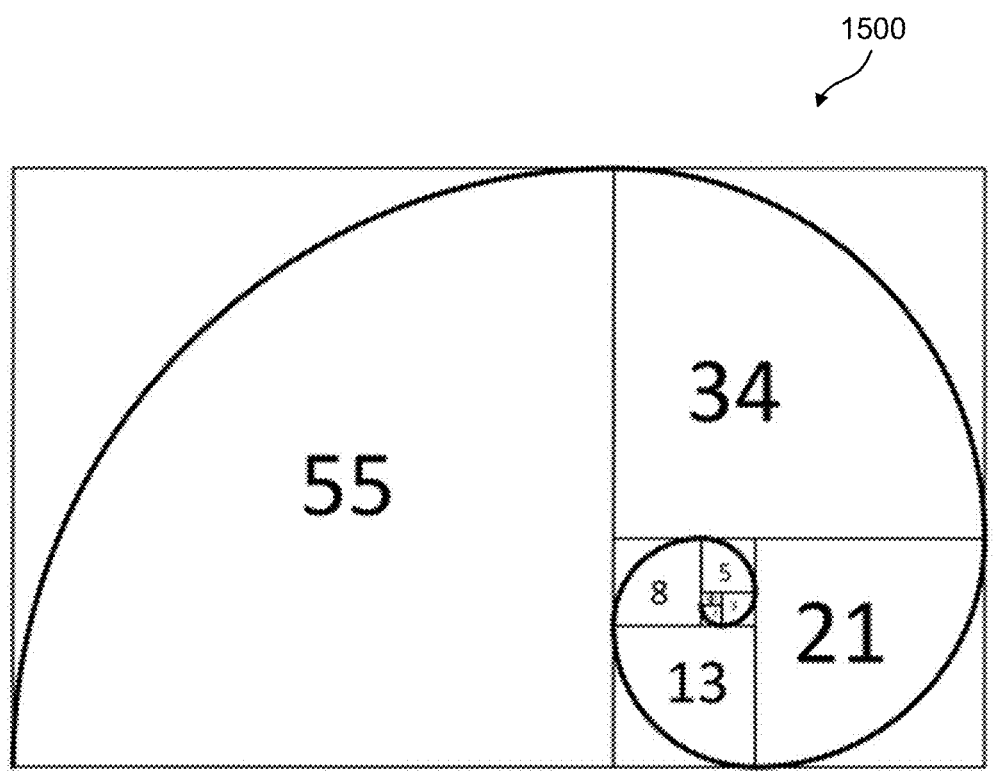
FIG. 15 is a graph illustrating an example of a Fibonacci filter smoothing function, in accordance with some examples.

In some examples, the smoothing engine 812 can use a median filter function with a window size of M for the scaling ratio smoothing. or other value In some examples, the smoothing engine 812 can use a Fibonacci series filter function with a window size of M for the scaling ratio smoothing. M represents an empirical threshold that can be set to any suitable value, such as M=31 or other value. FIG. 15 is a graph 1500 illustrating a Fibonacci filter smoothing function. An illustrative example of a Fibonacci filter smoothing function is shown below:

$$M = \text{window}_{size}$$

$$F_0 = 0, F_1 = 1$$

$$F_M = F_{M-1} + F_{M-2}$$

At block 1330, the process 1310 includes updating the region of the current subsequent frame for zooming. For instance, the process 1310 can send the region as zooming information (e.g., a zooming rectangle to upscale or upsample as the final output frame) to a camera pipeline, such as the image sensor 801, the image capture device 105A including the image sensor 130 and the one or more zoom control mechanisms 125C, etc. In one example, the one or more zoom control mechanisms 125C of the image capture device 105A can use the zooming information (the region for zooming) to crop and scale the captured frame so that the object has the desired zoom level. An illustrative example of information is provided below:

$$\text{curr\_ratio} += \text{diff\_zoom}$$

$$\text{curr\_x} += \text{diff\_x}$$

$$\text{curr\_y} += \text{diff\_y}$$

where curr_ratio is the zooming ratio value of the previous frame, and curr_x and curr_y are x- and y-coordinates, respectively, for the center point location of the previous frame. The symbols of diff_zoom, diff_x, and diff_y are the step values of the camera zooming ratio and the center point location of the current frame.

At block 1332, the process 1300 outputs a frame that has been cropped from an originally captured frame and scaled so that the target object is maintained at the size at which the target object was in the initial frame.

In some examples, an automatic zoom operation can be performed based on analyzing audio, in addition to or as an alternative to using one or more of the techniques described above. For instance, by analyzing audio data associated with a video, a system can automatically focus on a salient or target object that is making sound. In some cases, the audio source can automatically amplify along with the camera zooming and concentrate on the salient object. In some examples, background noise can be removed. For example, if a user is recording a video of a person during a performance, the voice of the person can be enhanced (e.g., made more clear, such as by increasing the volume, removing background noise, etc.) as the user zooms in on the person. Such techniques can be used to generate or record a video with a consistent target object size at a particular point in one or more video frames (e.g., at a center point). Such techniques can be applied in real-time video recording and/or other use cases.

Figure 13C:
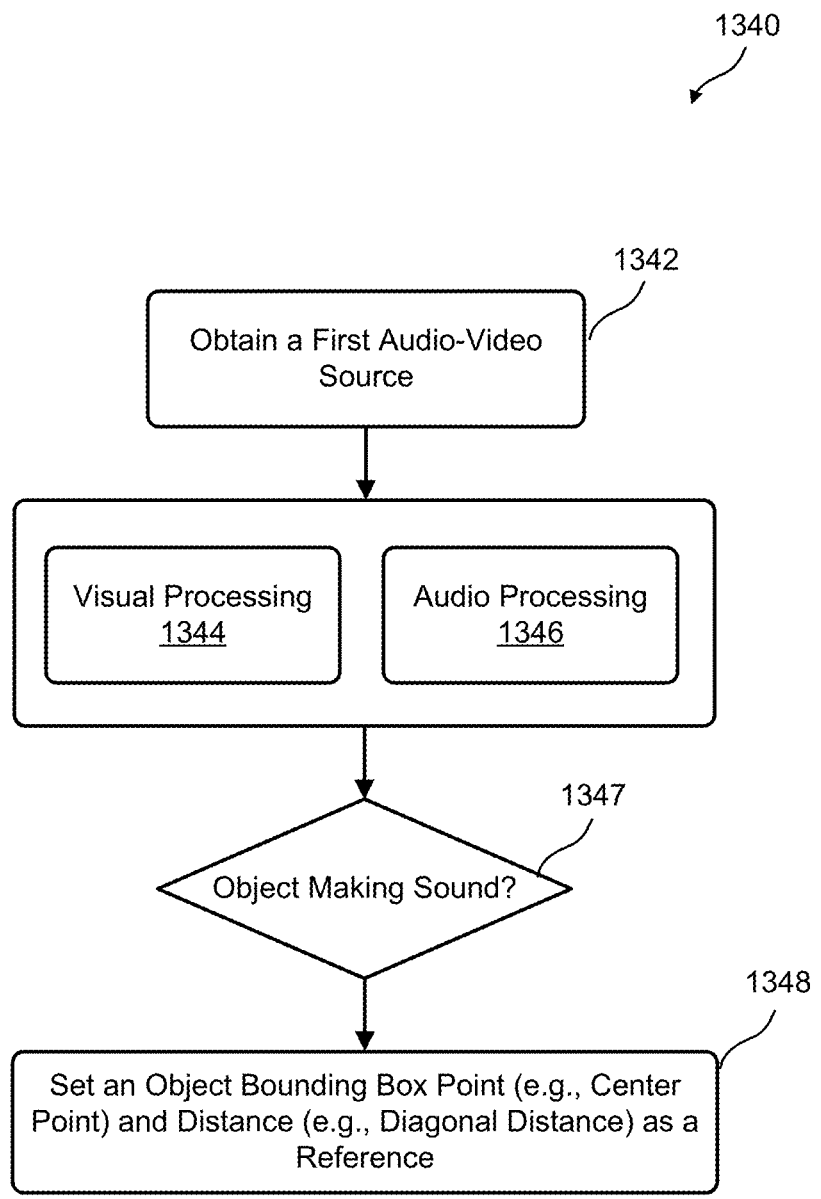
FIG. 13C is a diagram illustrating another example of a process for performing aspects of an automatic zoom function, in accordance with some examples.
Figure 13D:
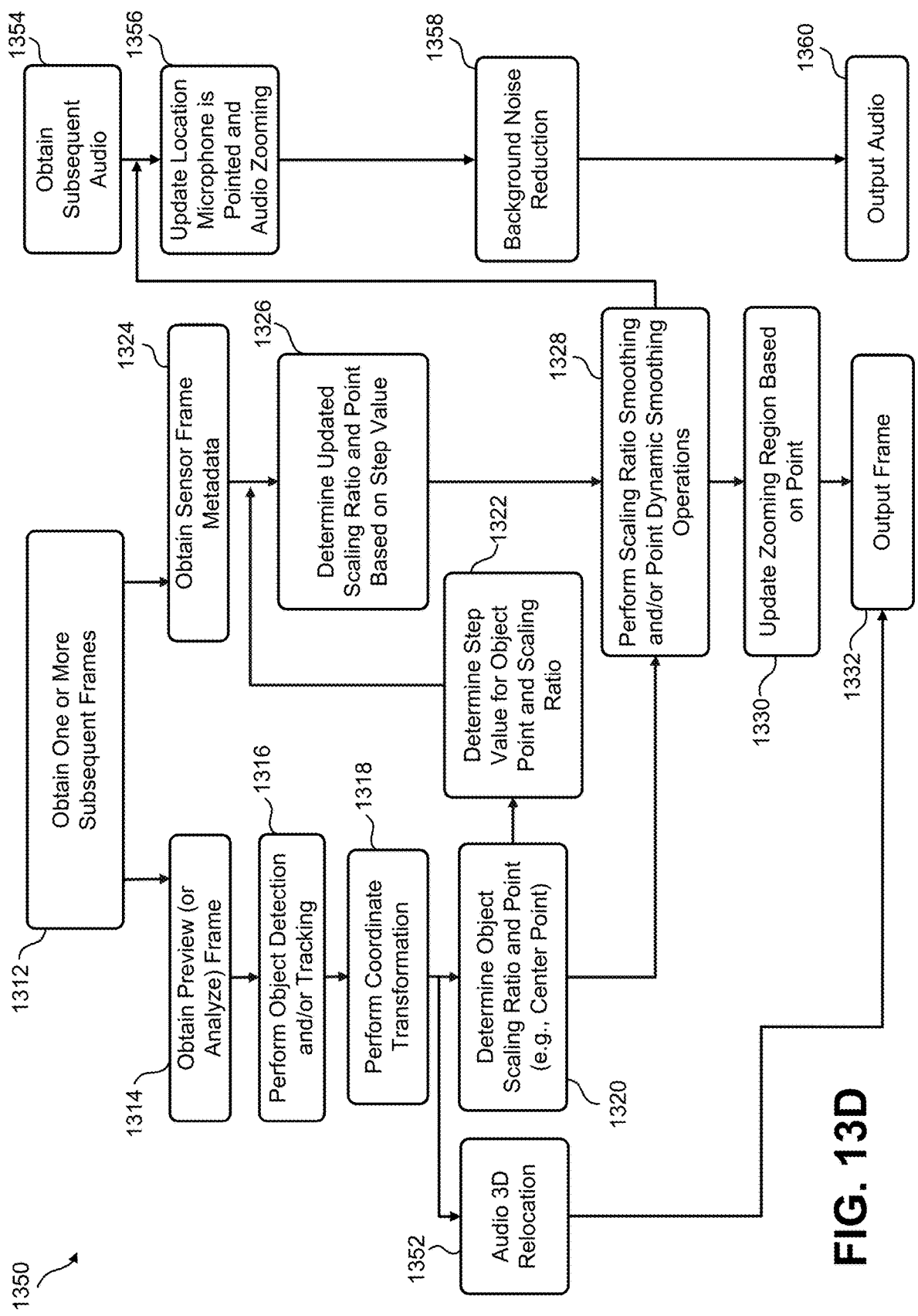
FIG. 13D is a diagram illustrating an example of a process for performing additional aspects of an automatic zoom function, in accordance with some examples.

FIG. 13C and FIG. 13D are diagrams illustrating examples of processes 1340 and 1350 for performing aspects of automatic zoom based on analyzing audio. Referring to FIG. 13C, at block 1342, the process 1340 includes obtaining a first (or initial) audio-video source. The first audio-video source can include a video frame and the audio information associated with the video frame.

At block 1344, the process 1340 performs visual processing to process the video data of the first audio-video source to detect one or more candidate target objects. For example, one or multiple target objects can be detected in a given frame. The visual processing can include detecting one or multiple salient objects (e.g., candidate objects of interest) from the video frame. At block 1346, the process 1340 performs audio processing to process the audio data of the first audio-video source to detect sound associated with a target object. The audio processing can include audio recognition and/or classification to recognize and/or classify the audio associated with the video frame. In one illustrative example, the visual and audio processing can be performed using a deep learning neural network (e.g., the deep learning network 4200 of FIG. 42, the convolutional neural network 4300 of FIG. 43, or other deep neural network). In such an example, the input is video (audio-video source), and the neural network output is an image with at least one object making sound highlighted.

At block 1347, the process 1340 includes determining whether a detected candidate object (detected based on the visual processing) is making a sound based on the audio processing. If it is determined that a candidate object is making a sound, the process 1340 at block 1348 can include determining or setting an object bounding box point and a distance as a reference, similar to block 1306 of the process 1300 in FIG. 13A. In one illustrative example, the point can include a center point of the bounding box, the distance can be a diagonal length of the bounding box (e.g., a length from a bottom-left point of the bounding box to a top-right point of the bounding box or a length from a bottom-right point of the bounding box to a top-left point of the bounding box). Other points and/or distances can be used, as described above. If it determined at block 1347 that a candidate target object is not making sound, a next candidate target object can be analyzed with respect to whether the object is making any sounds. Similar to that described with respect to FIG. 13A, by setting the point (e.g., the object center point) and the distance (e.g., the diagonal length) of the bounding box, the process 1340 can initialize the target object information including the object center point coordinates, the object bounding box diagonal length, and the current zooming ratio for the object.

Referring to FIG. 13D, the process 1350 is similar to the process 1320 of FIG. 13B, and further includes audio processing operations (at blocks 1352, 1354, 1356, 1358, and 1360). Blocks in FIG. 13D with like numerals as those in FIG. 13B are described above with respect to FIG. 13B. At block 1352, the process 1350 includes performing audio three-dimensional (3D) location. 3D sound localization refers to an acoustic technology that is used to locate the source of a sound in a 3D space. The source location can be determined by the direction of the incoming sound waves (e.g., horizontal and vertical angles) and the distance between the source and sensors. Once audio 3D relocation is performed, the process 1350 proceeds to block 1332 to output the cropped and scaled frame, as described above with respect to FIG. 13B.

At block 1354, the process 1300 includes obtaining subsequent audio. The subsequent audio can be the audio that is associated with the one or more subsequent frames obtained at block 1312. At block 1356, the process 1300 includes updating by zooming in on an audio source and amplifying its sound.

At block 1358, the process 1300 includes performing background noise reduction. For example, audio background noise, such as paper crunching, keyboard typing, fan noise, dog barking, and other noises, degrades the hearing perception of audio signals. The audio background noise removal, which can help remove distracting noises, filters out distracting noises to create a better audio experience. At block 1360, the process 1300 includes outputting the audio associated with the frame output at block 1332.

Figure 16:
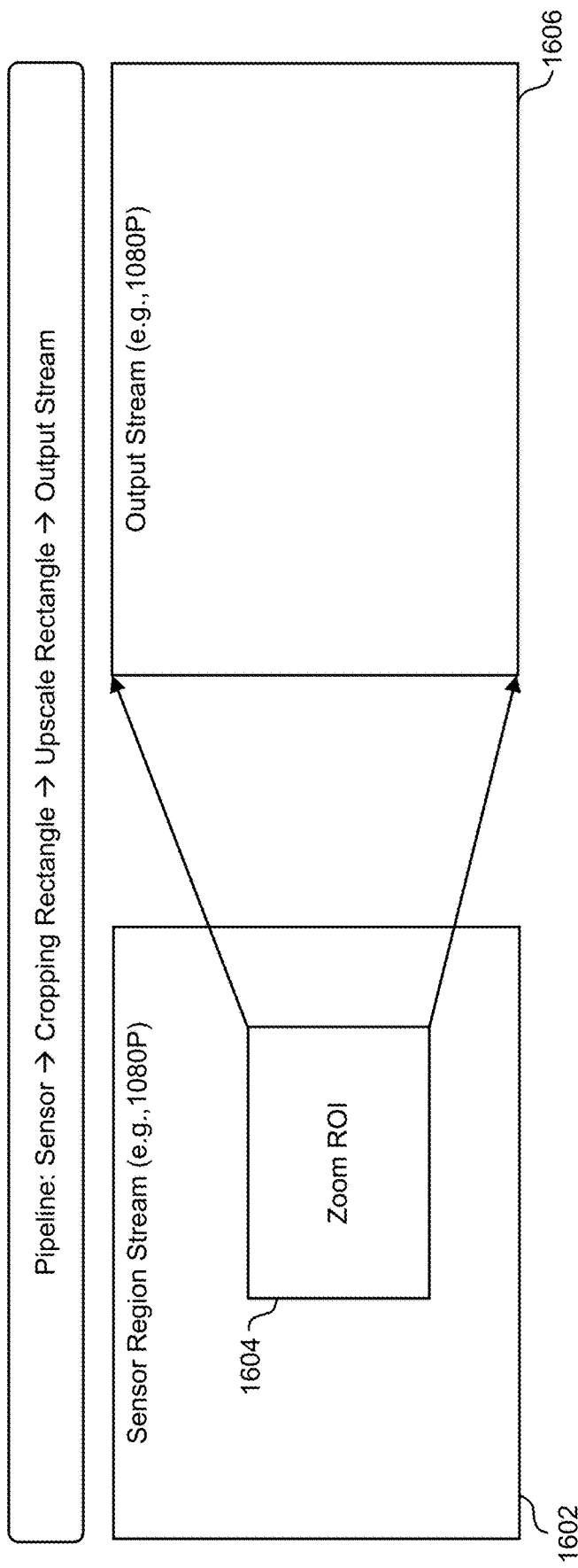
FIG. 16 is a diagram illustrating an example of a zooming process in a camera pipeline, in accordance with some examples.

FIG. 16 is a diagram illustrating a zooming process in a camera pipeline (e.g., image sensor 801, the image capture device 105A including the image sensor 130 and the one or more zoom control mechanisms 125C, or the like). As shown, the image capture device can stream (e.g., by default) outputs frames with a 1.0× zooming ratio (referring to zero or no zoom). A zoom region of interest (ROI) 1604 (also referred to as a cropping rectangle or a zoom rectangle) is shown in a frame 1602 that has a 1.0× zooming ratio. For instance, as described above, the ROI determination engine 804 of FIG. 8B can determine an initial region of interest (ROI) in particular frame based on user input and/or automatically. In one illustrative example, a user can provide user input defining the zooming ROI 1604, including the rectangle location and size. As shown, the zooming ROI 1604 cropped from the frame 1602. Once cropped from the frame 1602, the zooming ROI 1604 is upscaled or upsampled (shown as upscaled frame 1606) for the output stream.

Figure 17:
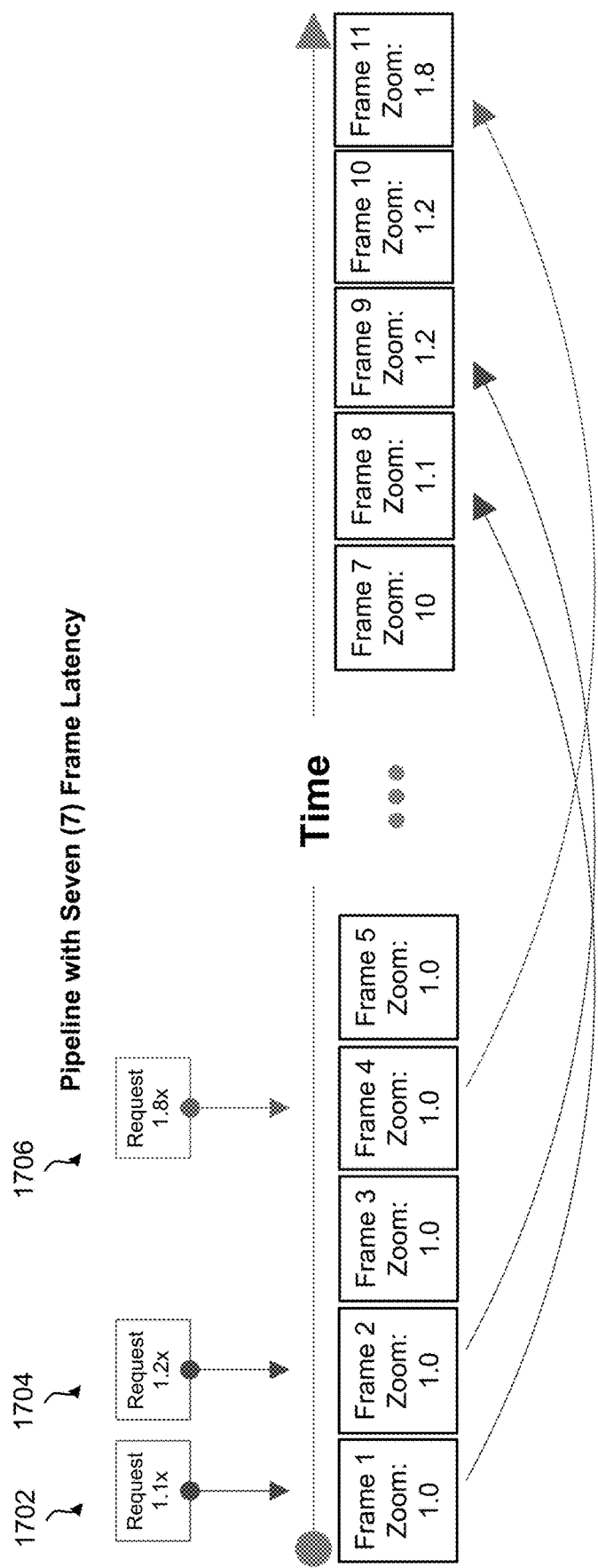
FIG. 17 is a diagram illustrating an example of zooming latency for a camera pipeline, in accordance with some examples.

FIG. 17 is a diagram illustrating zooming latency for a camera pipeline having a seven (7) frame latency for zoom requests. The example shown in FIG. 17 represents a frame latency of seven (7) frames, in which case a zoom request made in a given frame will be applied seven frames later. For instance, for a request 1702 for a 1.1× zoom made based on Frame 1 of FIG. 17, the corresponding zoom adjustments will be applied seven frames later at Frame 8. As shown, Frame 8 has a zoom amount of 1.1. Zoom increments can be adjusted every frame. For example, a request 1704 for a 1.2× zoom can be made based on Frame 2, and the corresponding zoom adjustments will be applied seven frames later at Frame 9 (which is shown having a zoom amount of 1.2). A request 1706 for a 1.8× zoom can be made based on Frame 4, and the corresponding zoom adjustments will be applied seven frames later at Frame 11 (shown having a zoom amount of 1.8).

Several advantages are achieved by using the above-described frame cropping and scaling techniques. For example, the cropping and scaling techniques enable the feature of providing a fixed size for target objects in video systems (e.g., mobile devices, video analytics systems, among others). A system implementing the cropping and scaling techniques can achieve good performance and can be deployed in any type of device, such as a mobile device, an IP camera, among others.

FIG. 18 is a flowchart illustrating an example of a process 1800 of processing one or more frames using the techniques described herein. At block 1802, the process 1800 includes determining a region of interest in a first frame of a sequence of frames. The region of interest in the first frame includes an object having a size in the first frame. The region of interest can be determined based on user input or can be automatically determined, as described above. In some examples, the process 1800 includes receiving user input corresponding to a selection of the object in the first frame, and determining the region of interest in the first frame based on the received user input. In some aspects, the user input includes a touch input provided using a touch interface of a device (e.g., selecting an object, drawing a shape around the object, etc.). The user input can include other types of user input, as described herein.

At block 1804, the process 1800 includes cropping a portion of a second frame of the sequence of frames, the second frame occurring after the first frame in the sequence of frames. At block 1806, the process 1800 includes scaling the portion of the second frame based on the size of the object in the first frame. For instance, scaling the portion of the second frame based on the size of the object in the first frame causes the object in the second frame to have a same size as the object in the first frame. In some examples, the cropping and scaling of the portion of the second frame maintains the object in a center of the second frame. In some cases, the process 1800 includes detecting and tracking the object in one or more frames of the sequence of frames.

In some examples, the process 1800 includes determining a point of an object region determined for the object in the second frame, and cropping and scaling the portion of the second frame with the point of the object region in a center of the cropped and scaled portion. In some cases, the point of the object region is a center point of the object region. In some cases, the object region is a bounding box (or other bounding region). In some cases, the center point is a center point of the bounding box (or other region region). In some cases, the center point is a center point of the object (e.g., the object's center of mass or center point). The center points can be found by performing object segmentation (e.g., using the system 600 shown in FIG. 6A).

In some aspects, the process 1800 includes determining a first length associated with the object in the first frame, and determining a second length associated with the object in the second frame. The process 1800 can include determining a scaling factor based on a comparison between the first length and the second length, and scaling the portion of the second frame based on the scaling factor. In some cases, scaling the portion of the second frame based on the scaling factor causes the second object region in the cropped and scaled portion to have a same size as the first object region in the first frame. In some examples, the first length is a length of a first object region determined for the object in the first frame, and the second length is a length of a second object region determined for the object in the second frame. In some cases, the first object region is a first bounding box (or other bounding region) and the second object region is a second bounding box (or other bounding region). The first length can be a diagonal length (or other length) of the first bounding box, and the second length can be a diagonal length (or other length) of the second bounding box. In some cases, the first length can be a length between points of the object in the first frame, and the second length can be a length between points of the object in the second frame.

In some aspects, the process 1800 includes determining a point of a first object region generated for the object in the first frame, and determining a point of a second object region generated for the object in the second frame. In some implementations, the point of the first object region is a center point of the first object region (e.g., a center point of the object in the first frame or a center point of a first bounding box), and the point of the second object region is a center point of the second object region (e.g., a center point of the object in the second frame or a center point of a second bounding box). The process 1800 can include determining a movement factor for the object based on a smoothing function using the point of the first object region and the point of the second object region. The smoothing function can control a change in position of the object in a plurality of frames of the sequence of frames. For instance, the smoothing function can control the change in position of the object so that a position of the object gradually changes (e.g., so that the change does not exceed a threshold position change, such as five pixels, ten pixels, or other threshold position change) in the plurality of frames of the sequence of frames. In some examples, the smoothing function includes a moving function (e.g., a moving average function or other moving function) that is used to determine a location of the point of a respective object region in each of the plurality of frames of the sequence of frames based on a statistical measure (e.g., average, mean, standard deviation, variance, or other statistical measure) of object movement. In one illustrative example, the smoothing function includes a moving average function that is used to determine an average location of the point of the respective object region in each of the plurality of frames. For instance, as described above, the moving average can reduce or remove false alarms (e.g., by minimizing a wrongly detected/tracked object bounding box locations). The process 1800 can include cropping the portion of the second frame based on the movement factor.

In some examples, the process 1800 includes determining a first length associated with the object in the first frame, and determining a second length associated with the object in the second frame. In some examples, the first length is a length of a first bounding box generated for the object in the first frame, and wherein the second length is a length of a second bounding box generated for the object in the second frame. In some cases, the first length is a diagonal length of the first bounding box, and wherein the second length is a diagonal length of the second bounding box. The process 1800 can include determining a scaling factor for the object based on a comparison between the first length and the second length and based on a smoothing function using the first length and the second length. The smoothing function can control a change in size of the object in a plurality of frames of the sequence of frames. For instance, the smoothing function can control the change in size of the object so that a size of the object gradually changes (e.g., so that the change does not exceed a threshold size change, such as by more than 5%, 10%, 20%, or other threshold size change) in the plurality of frames of the sequence of frames In some cases, the smoothing function includes a moving function (e.g., a moving average function or other moving function) that is used to determine a length associated with the object in each of the plurality of frames of the sequence of frames based on a statistical measure (e.g., average, mean, standard deviation, variance, or other statistical measure) of object size. In one illustrative example, the smoothing function includes a moving average function that is used to determine an average length associated with the object in each of the plurality of frames. For instance, as described above, the moving average can reduce or remove false alarms (e.g., by minimizing a wrongly detected/tracked object bounding box diagonal length or wrongly detected/tracked length between parts of the object). The process 1800 can include scaling the portion of the second frame based on the scaling factor. In some aspects, scaling the portion of the second frame based on the scaling factor causes the second bounding box in the cropped and scaled portion to have a same size as the first bounding box in the first frame.

Figure 19:
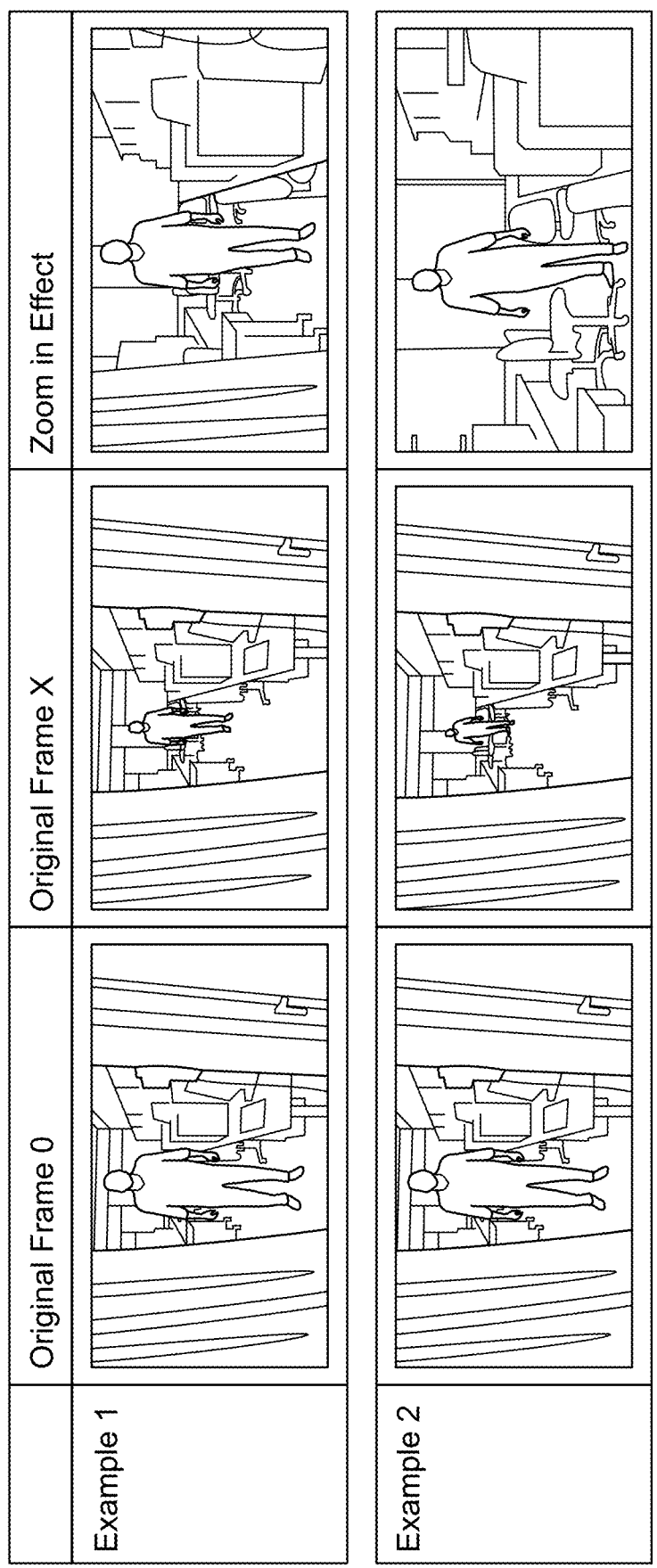
FIG. 19-FIG. 23 are images illustrating simulations using the cropping and scaling techniques described herein, in accordance with some examples.
Figure 20:
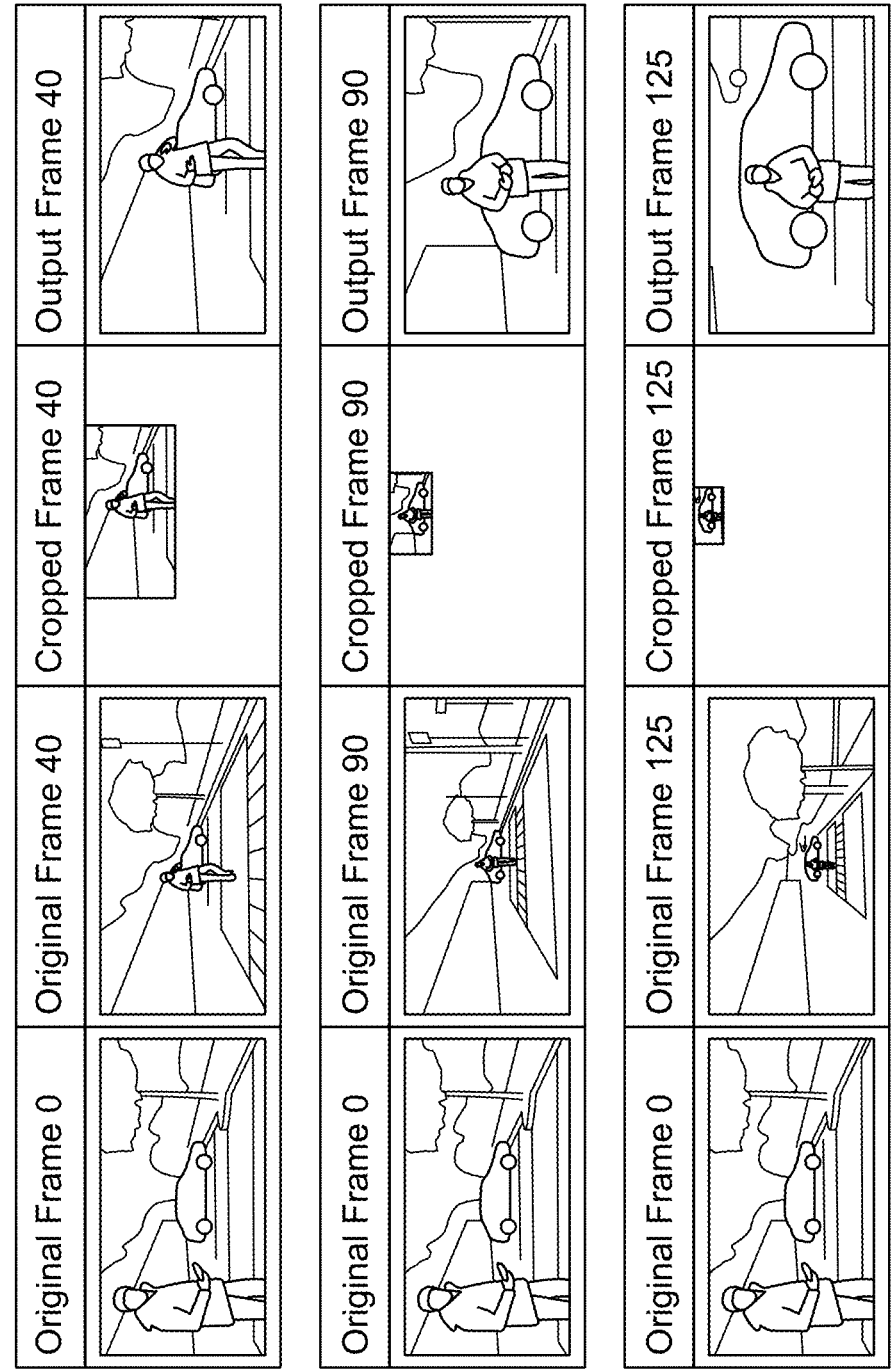

FIG. 19, FIG. 20, FIG. 21, FIG. 22, and FIG. 23 are illustrative of simulations conducted on four video clips. The video clips all include resolutions of 720p and 1080p, and are all captured at 30 frame per second (fps). Each of the examples in FIG. 19-FIG. 23 are illustrative examples of a zoom-in effect (where the frame is cropped and upsampled or upscaled, similar to the example of FIG. 10A and FIG. 10B). As shown in FIG. 19, an "Original frame 0" is the first frame from the video, and "Original frame X" is the current frame during the video recording. To achieve the zoom in effect, the frame cropping and scaling system 800 will crop a region from the original frame X, and will then upsample the region to the original frame size.

As noted above, a device can include multiple cameras and/or lenses (e.g., two cameras in a dual-camera lens system) for performing one or more dual camera mode features. For instance, a dual camera lens of a device (e.g., a mobile phone or smartphone including a rear dual camera lens or other dual camera lens) can be used to simultaneously record multiple videos (e.g., two videos), which can be referred to as a "dual camera video recording" feature. In some cases, a primary camera lens (e.g., a telephoto lens) of a dual camera lens of a device can capture (and/or record) a first video, and a secondary camera lens (e.g., a zoom lens, such as a wide angle lens) of the dual camera lens can capture (and/or record) a second video. In some cases, the second video can be used for performing the above-described frame cropping and scaling techniques to keep a size of a target object fixed during the video. Such a solution can be used as a video post-processing feature in some cases (e.g., processing an image output by the ISP and before being displayed or stored).

In some cases, the dual camera mode features can be implemented by simultaneously using two camera lenses of a device, such as the primary camera lens (e.g., a telephoto lens) and the secondary camera lens (e.g., a zoom lens) of the device. The dual camera video recording feature noted above allows the two camera lenses to simultaneously record two videos. For example, a device can record separate videos using a wide angle lens and using a standard lens. In some cases, a device can simultaneously record video using three, four, or even more camera lenses. The videos can then be displayed (e.g., simultaneously displayed), stored, transmitted to another device, and/or otherwise used. For example, using a dual camera mode feature (e.g., dual camera video recording), a device can display two perspectives of a scene at one time (e.g., split-screen videos) on a display. Various advantages are provided by the dual camera mode features, such as allowing a device to capture a wide view of a scene (e.g., with more of the background and surrounding objects in the scene), allowing the device to capture large scale events or the full view of a scene, among others.

In some cases, multiple camera modules and lenses can be used to perform zooming functions. For instance, a secondary camera lens can be set to a farther zoom level (e.g., such as a 2.0× camera zooming ratio) as compared to the primary camera and/or lens (e.g., which can have a 1.0× camera zooming ratio).

Various problems can occur with respect to maintaining a fixed size for a target object in a sequence of frames. In one example, a device may be unable to perform a zoom out effect when a target object moves towards the camera of a device. Such a problem can be due to a limitation of the field of view from the original video frame. For instance, there may not be enough space in the frame to zoom out enough to maintain the size of a target object (e.g., resulting in black space surrounding the scaled frame). In another example, when a target object moves away from the camera of the device, a zoomed-in image generated based on the original video frame may have poor quality, such as being blurry, including one or more visual artifacts, lacking sharpness, etc. Further, devices that implement dual camera mode features do not incorporate any artificial intelligent technologies. Such systems require end users to use video editing tools or software applications to manually edit the images.

As noted above, systems and techniques are described herein for switching between cameras or lenses of devices that can implement the one or more dual camera mode features noted above. While the systems and techniques are described herein with respect to dual or two camera systems, the systems and techniques can be applied to systems having more than two cameras (e.g., when three camera, four cameras, or other number of cameras are used to capture images or videos). In some cases, systems and techniques described herein can use a camera lens switching algorithm in a dual camera system for maintaining a fixed size for a target object in a sequence of frames of videos captured using the dual camera system. In some examples, the systems and techniques can perform dual camera zooming, which can be used to provide a more detailed object zooming effect.

As described above, an object detection and tracking system (e.g., object detection and tracking system 806) can detect and/or track an object in one or more frames. The object detection and tracking system can use any suitable object detection and tracking technique for the multi-camera (e.g., dual camera) implementations described herein, such as those described above. In some cases, a region of interest (ROI) or target object can be identified based on user input or automatically, as described above.

In some examples, the object detection and tracking system can detect and/or track objects in frames by performing object matching for dual camera video analytics using a machine learning object detection and tracking system. For example, the object detection and tracking system can extract points of interest from one or more input frames. The points of interest can include two-dimensional (2D) locations in a frame that are stable and repeatable from different lighting conditions and viewpoints. The points of interest can also be referred to as keypoints or landmarks (e.g., facial landmarks on a face of a person). An example of a machine learning system is a convolutional neural network (CNN). In some cases, CNNs can be superior to hand-engineered representations on various tasks that use frames or images as input. For instance, CNNs can be used to predict 2D keypoints or landmarks for a variety of tasks, such as object detection and/or tracking.

Figure 24:
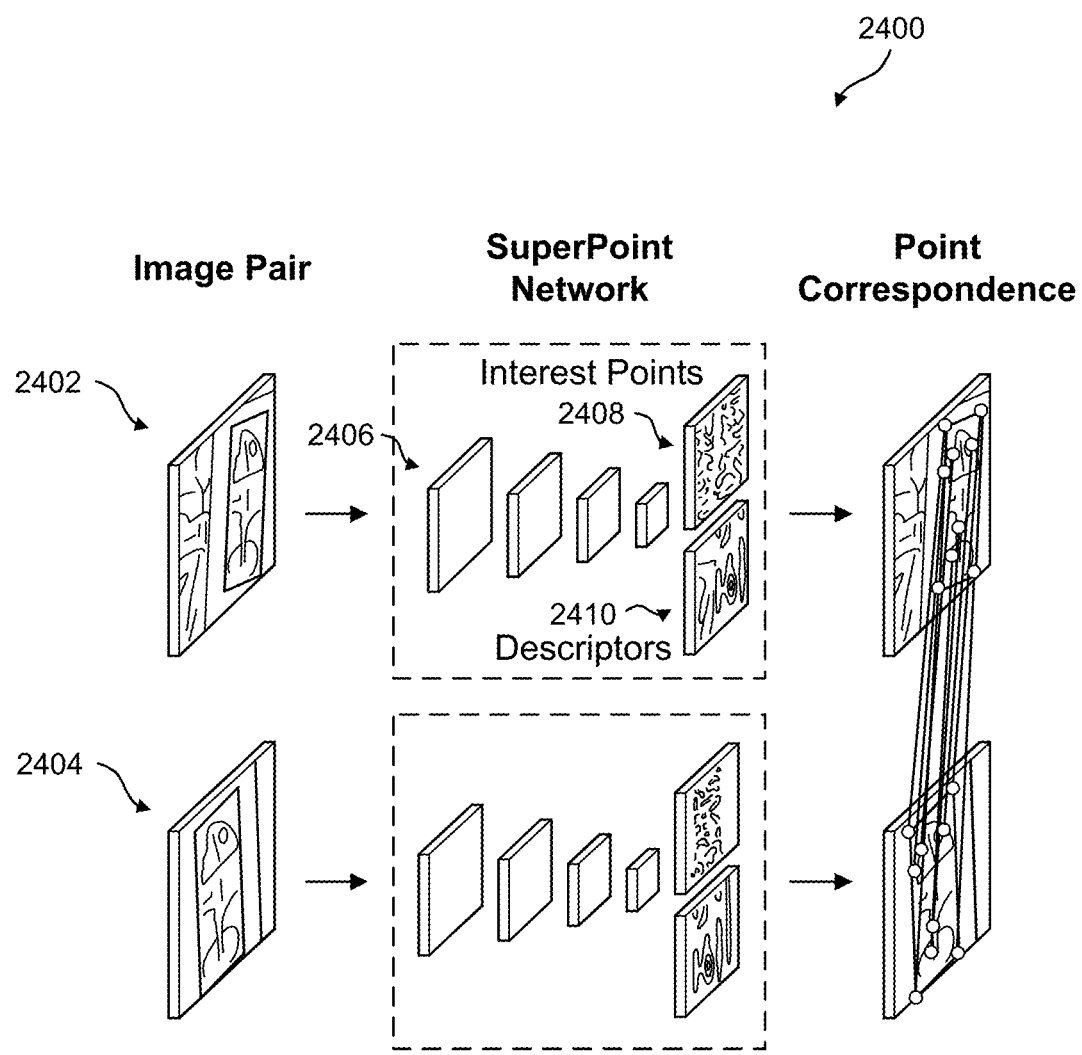
FIG. 24 is a diagram illustrating an example of machine learning based object detection and tracking system, in accordance with some examples.

FIG. 24 is a diagram illustrating an example of machine learning based object detection and tracking system 2400. In some cases, the system 2400 is self-supervised using self-training (rather than using human supervision to define points of interest in real training images). And the object tracking is conducted by the point correspondence with point feature matching. In some cases, a large dataset of pseudo-ground truth locations of points of interest in real images or frames is used, which can be pre-configured or pre-set by the system 2400 itself, rather than a large-scale human annotation effort.

The system 2400 includes a fully-convolutional neural network architecture. In some examples, the system 2400 receives as input and operates on one or more full-sized images. For instance, as shown in FIG. 24, an image pair including image 2402 and image 2404 can be input to the system (e.g., during training and/or during inference). In some cases, the system 2400 (using full-sized images as input) produces points of interest detections accompanied by fixed length descriptors in a single forward pass. The neural network model of the system 2400 includes a single, shared encoder 2406 (shown as having four convolutional layers, but can include more or less layers) to process and reduce the dimensionality of the input images. After the encoder, the neural network architecture splits into two decoder heads, which learn task specific weights. For example, a first decoder head 2408 is trained for point of interest detection, and a second decoder head 2410 is trained for generating point of interest descriptions (referred to as descriptors). The task of finding points of interest can include detection and description (e.g., performed by the decoder heads 2408 and 2410, respectively). Detection is the localization of points of interest in an image or frame, and a description describe each of the detected points (e.g., with a vector). An overall goal of the system 2400 is to find characteristic and stable visual features effectively and efficiently.

In some examples, the system 2400 can warp each region of pixels (e.g., each 8×8 pixel region) in an input image. The region can be considered as one pixel after the warping, in which case each region of pixels can be represented by a particular pixel in a feature map with 64 channels, followed by one dustbin channel. If there is no point of interest (e.g., keypoint) detected in a particular 8×8 region, the dustbin can have a high activation. If a keypoint is detected in an 8×8 region, the 64 other channels can pass through a softmax architecture to find the key point in the 8×8 region. In some cases, the system 2400 can compute 2D point of interest locations and descriptors in a single forward pass and can run at 70 frames per second (fps) on 480×640 images with a Titan X graphics processing unit (GPU).

Figure 25:
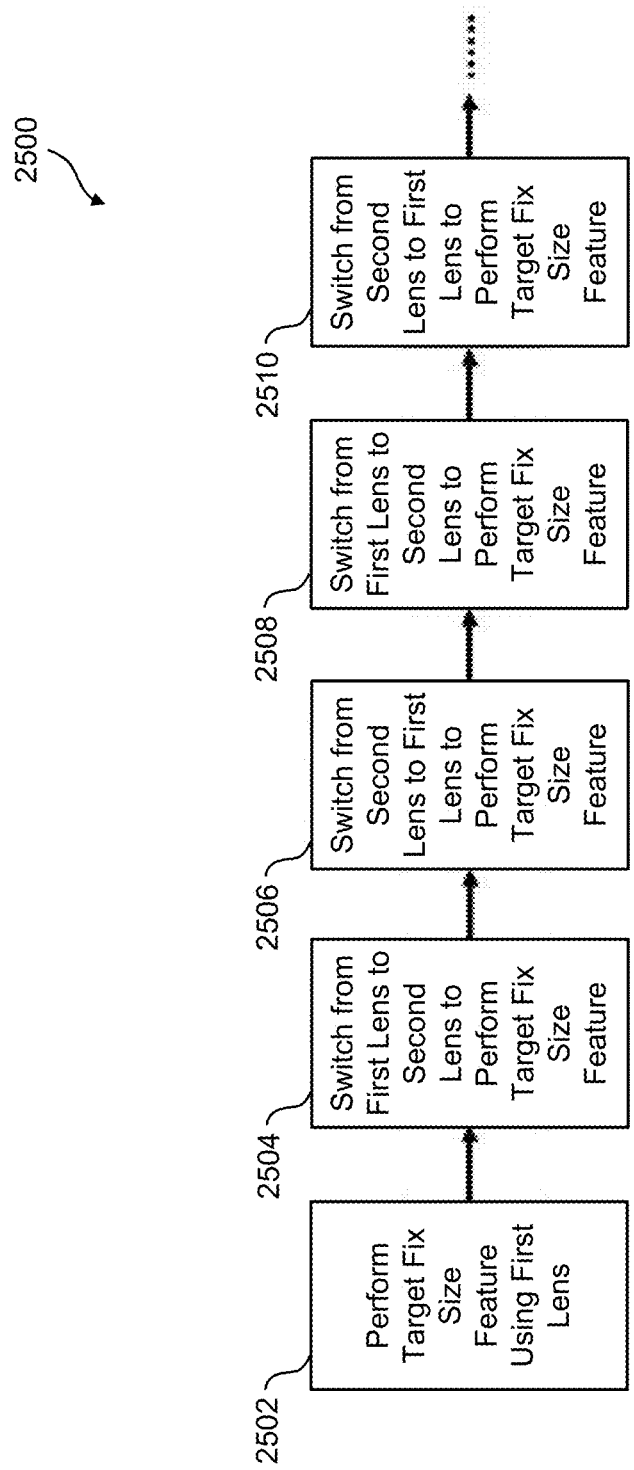
FIG. 25 is a flow diagram illustrating an example of a camera lens switching pipeline, in accordance with some examples.

FIG. 25 is a flow diagram illustrating an example of a camera lens switching pipeline 2500. The pipeline 2500 is an example of dual camera lens switching logic. The first lens referred to in FIG. 25 is a lens and/or camera a device uses (e.g., based on user input) as a primary lens for capturing video. In some cases, the first lens can be a telephoto lens, and the second lens referred to in FIG. 25 can be a wide angle lens. In some cases, the first lens can be a wide angle lens, and the second lens can be a telephoto lens. Any other type of lenses can be used for the first and second lenses.

At block 2502, the target fix size feature can start from the first lens (e.g., the telephoto lens in the event the user selects the telephoto lens as the primary lens to record video). When certain conditions are met (as described below), block 2504 and block 2508 of the pipeline 2500 can switch a primary lens from the first lens (e.g., telephoto lens) to the second lens (e.g., a wide angle lens) for performing the target fix size feature. In such cases, the second lens can be used to capture one or more primary video frames. When certain conditions are met (as described below), block 2506 and block 2510 of the pipeline 2500 can switch the primary lens back to the first lens (e.g., telephoto lens) from the second lens (e.g., the wide angle lens) for performing the target fix size feature. In such cases, the first lens can be used to capture any primary video frames.

An example of an algorithm (referred to as Algorithm 1A) that can be used to perform camera lens switching is as follows (using a telephoto (tele) lens as an example of the first lens and a wide angle lens as an example of the second lens):

Initialize disp_xy based on target object bounding box center x and y displacement from the center point of the first or initial frame
Initialize done_by_tele as True, tele_lens_ratio as 1.0
Initialize the camera zooming_ratio value for tele and wide lens When the term done_by_tele is true (e.g., assigned a value of 1), the telephoto lens is used for performing the target fix size feature. The zooming_ratio is the scaling (or zooming) ratio described above, and is used to determine how much to scale an ROI or object in from an input frame.

In some cases, the above camera lens switching algorithm can continue as follows (referred to as Algorithm 1B):

```
For each iteration of an input video frame
# option 1) First the first video frame, start from tele camera lens
# option 2) Keep using tele lens
# option 3) Switch from wide lens to tele lens
if tele_zooming_ratio 1.0
    resize object bbox width and height based on tele_zooming_ratio
    relocate object location
    if object bbox width or height outside the image
        # switch to wide lens
        done_by_tele == False
        skip
    process video frame cropping and resizing
    update disp_xy displacement
    done_by_tele = True
    set wide_lens_times_ratio = 1.0
else
    done_by_tele = False
# option 1) Keep using wide lens
# option 2) Switch from tele lens to wide lens
if done_by_tele == False
    if previous iteration was done by tele lens
        update wide lens times ratio
    if wide_lens_times_ratio * wide_zooming_ratio 1.0
        if disp_xy != 0 and
            update disp_xy displacement
        process video frame cropping and resizing
    else
        keep original video frame without cropping and resizing
```

Figure 26:
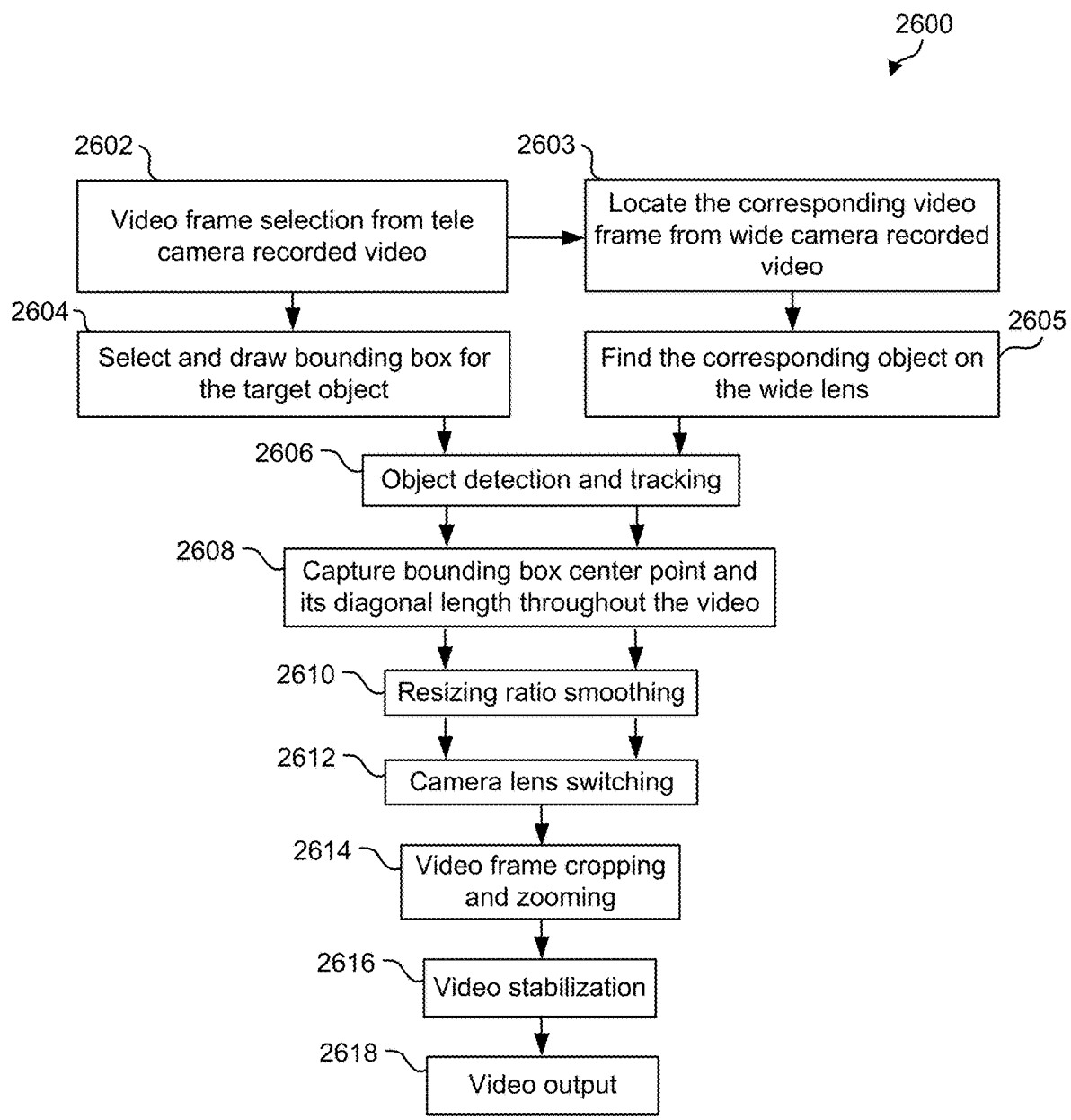
FIG. 26 is a flow diagram illustrating an example of a camera lens switching process, in accordance with some examples.

FIG. 26 is a flow diagram illustrating an example of a camera lens switching process 2600. At block 2602, for a primary video including frames captured using a first camera lens, the process 2600 can perform video frame selection from a video captured using a first lens (e.g., a telephoto camera lens). For example, a user can select a video frame as a first frame that will be used as the starting point for performing target fix size feature. For example, as described above, the first frame can be used to define a ROI and/or target object size, point (e.g., a center point of a bounding box), and distance (e.g., diagonal length of the bounding box). At block 2603, the process 2600 can determine or locate the corresponding video frame from a video being captured or recorded using a second camera lens (e.g., a wide angle camera lens). In one illustrative example, the video frames from the first and the second camera lenses can have reference numbers that can correspond to an output time for those frames. The process 2600 (at block 2603) can use the reference numbers of the frames to determine the corresponding video frame. The first camera lens is illustrated in FIG. 26 as a telephoto lens (also denoted herein as a "tele lens") and second lens is illustrated in FIG. 26 as a wide angle camera lens. However, one of ordinary skill will appreciate that the first lens and the second can be any other suitable lenses.

At block 2604, the process 2600 includes selecting and/or drawing a bounding box (or other bounding region) for the target object in the first video frame. For example, from the first video frame, a user can choose a target object (e.g., a single object or multiple objects in some cases) by providing a user input (e.g., tapping on the target object in the frame displayed on a touchscreen display, drawing a bounding box around the target object, or by providing any other suitable type of input). In another example, the target object can be automatically determined (e.g., by the object detection and tracking system 806) using the techniques described above.

At block 2605, the process 2600 determines or finds the same target object in the corresponding video frame of the video captured using the second lens determined at block 2603. In some cases, to find the same object from the video captured using the second lens, the process 2600 can determine (e.g., using the object detection and tracking system 806) the approximate location of the target object from the video captured using the first lens. The process 2600 can then apply an object matching algorithm (e.g., using the system 2400 from FIG. 24) to locate the target object in the video captured using the second lens, which can be associated with a bounding box and information.

At block 2606, the process 2600 can perform object detection and tracking. In some cases, the object detection and tracking can be similar to the object detection and tracking described above with respect to FIG. 8B-FIG. 13B. For example, the object detection and tracking system 806 can automatically detect and track the object in the two videos (the video captured by the first lens and the video captured by the second lens) in parallel. At block 2608, the process 2600 determines or captures coordinates of a point (e.g., a center point) and a distance (e.g., diagonal length) of the bounding boxes determined for the target object (e.g., by the object detection and tracking system 806) across the frames of the two videos. In some cases, the points (e.g., center points) and the distances (e.g., the diagonal lengths) can be stored for later use by the process 2600.

At block 2610, the process 2600 applies a smoothing function. For example, as described above, the smoothing engine 812 can apply a smoothing function to smooth the frame scaling ratio (or resizing ratio). The scaling or resizing ratio can be calculated by comparing the target object bounding box diagonal length (or other distance) in first selected video frame with the target object bounding box diagonal length (or other distance) in the current frame. As described above, the smoothing function can include a moving average function in some cases. For instance, the smoothing function can be used to determine an average length associated with the object in each of a plurality of frames of the sequence of frames.

At block 2612, the process 2600 can determine whether to perform camera lens switching. For example, the process 2600 can determine whether to use the video frame from the first lens (e.g., tele lens) or from the second lens (e.g., the wide lens) using the camera lens switching algorithm provided above (e.g., Algorithm 1A and/or Algorithm 1B). At block 2614, the process 2600 can perform frame cropping and scaling (or zooming). For example, the frame scaling engine 810 can upsample (or upscale) a ROI (e.g., a bounding box) of the target object based on the object bounding box point coordinates (e.g., center point coordinates) and scaling or resizing ratio. At block 2616, the process 2600 performs video stabilization, such as using the image stabilization techniques described above with respect to FIG. 12. At block 2618, the process 2600 outputs a frame that has been cropped from an originally captured frame and scaled so that the target object is maintained at the size at which the target object was in the initial or first frame.

In some cases, as noted above, the camera lens switching systems and techniques described herein can be applied or extended to other multi-camera systems (e.g., camera systems including three cameras, four cameras, five cameras) that record multiple images and/or videos at a time.

Figure 32:
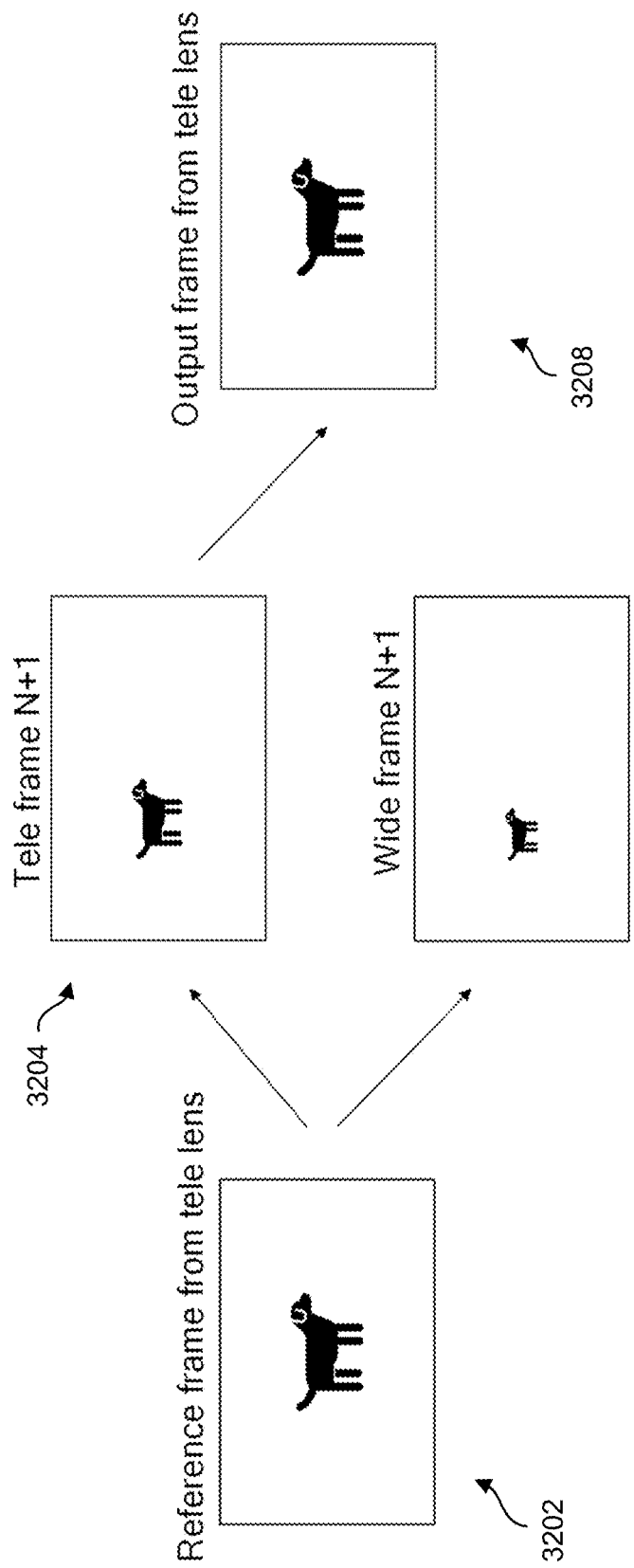
Figure 33:
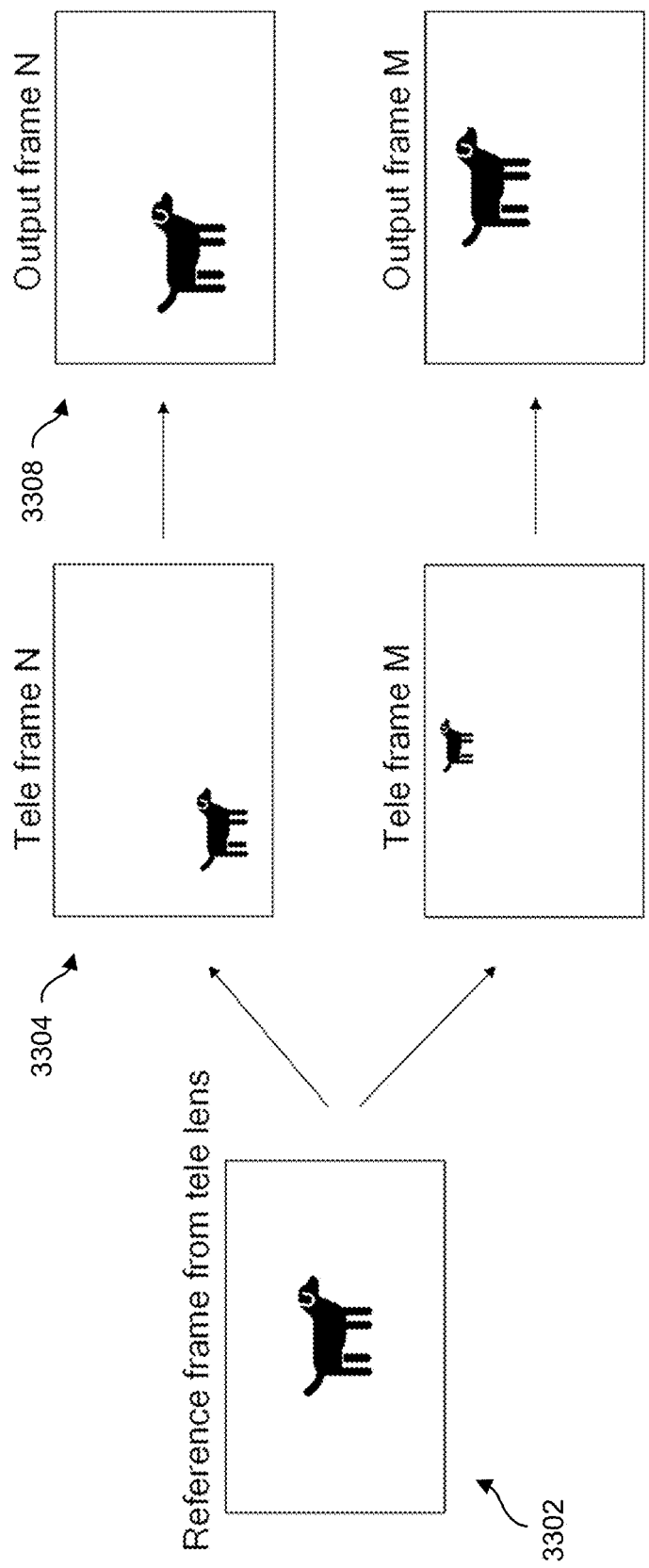
Figure 34:
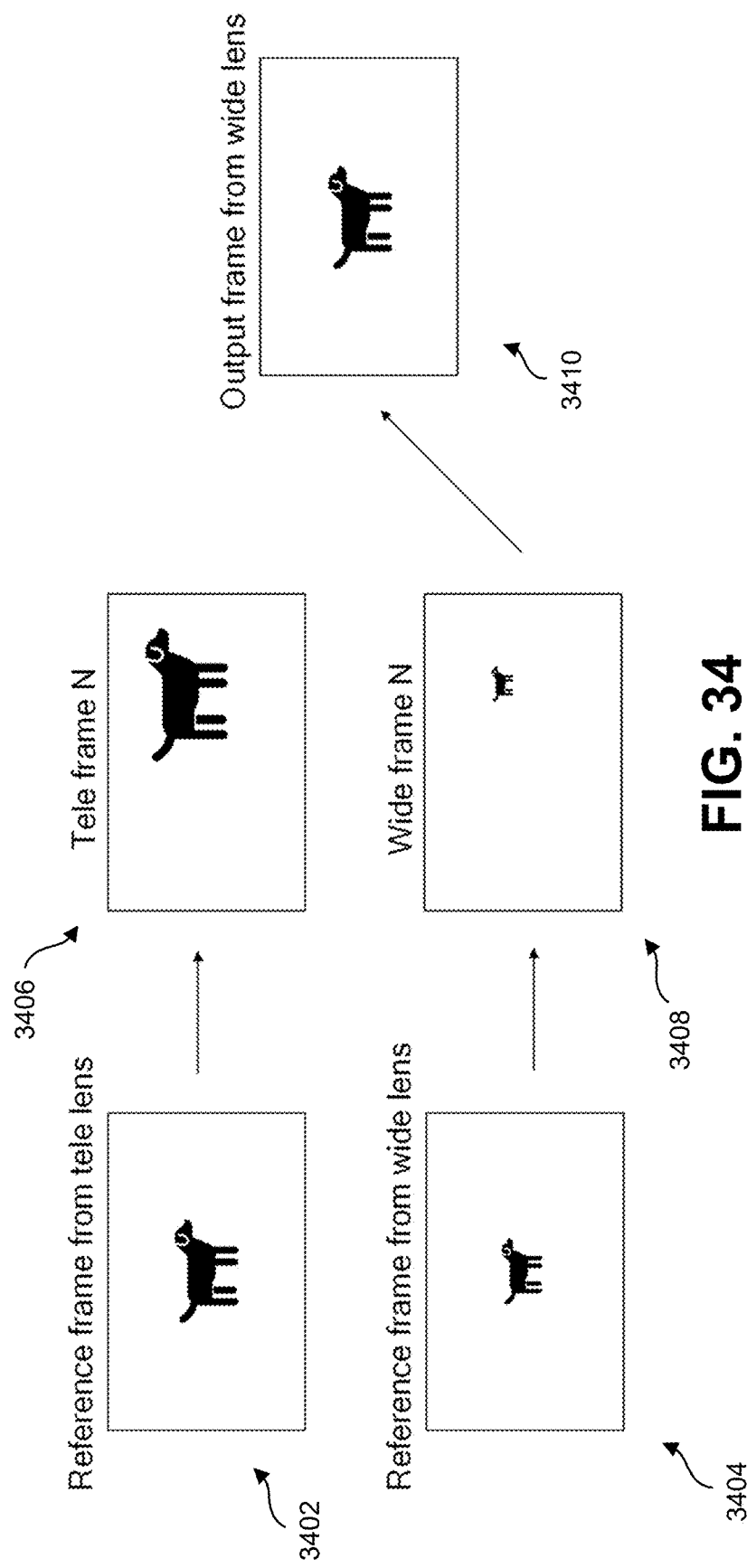
Figure 35:
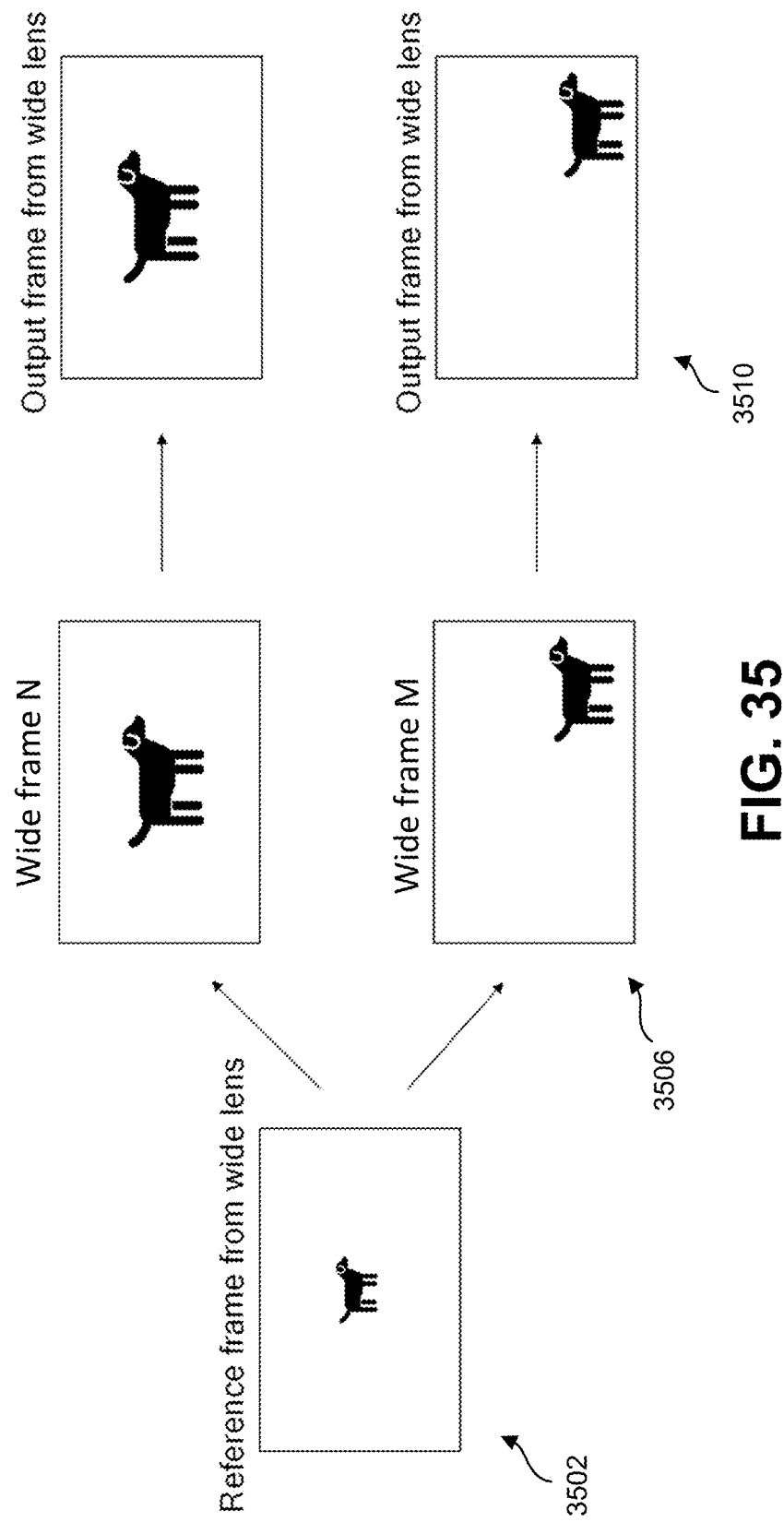
Figure 36:
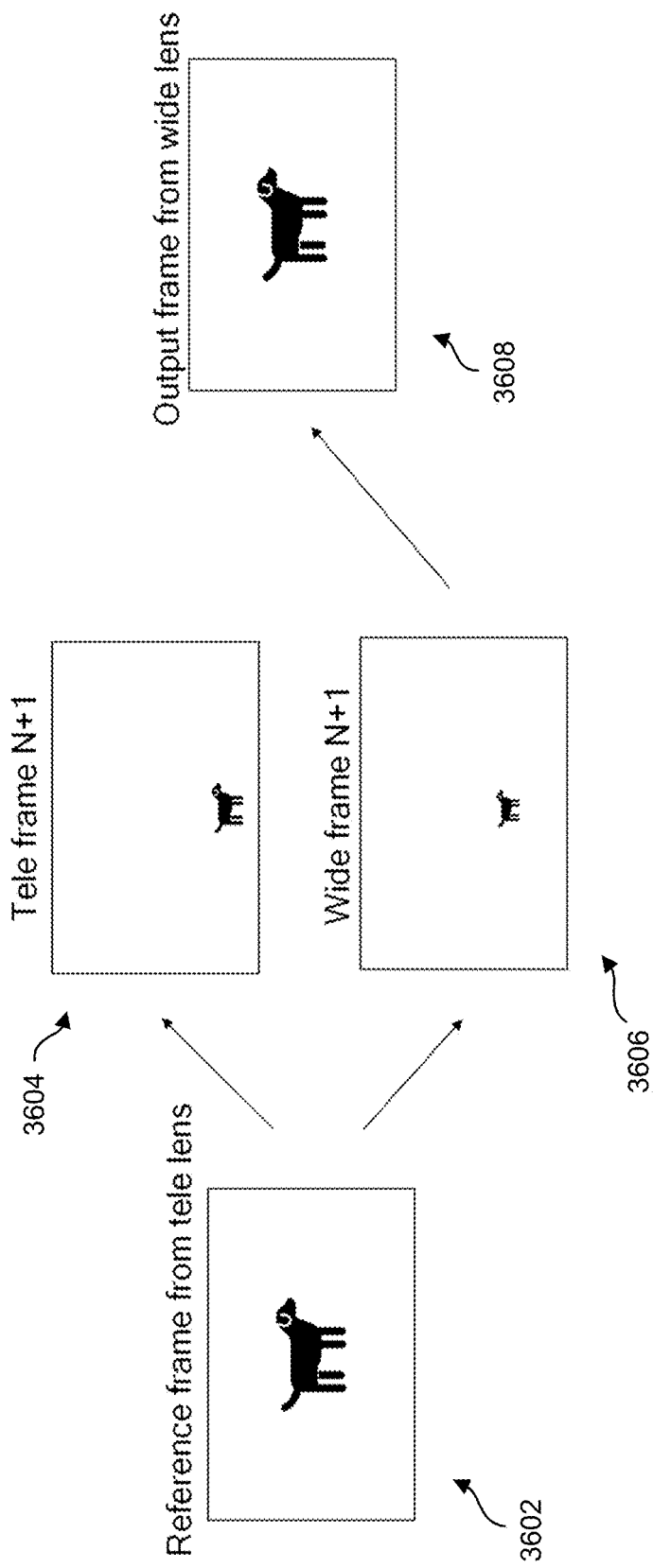

In some examples, a moving step algorithm can be used to obtain a smoothed effect. In some cases, the techniques described above using a moving step value can be used (e.g., as described with respect to FIG. 13B). An illustrative example of a moving step algorithm is provided as follows:
(1) Operation 1: Initialize the target object coordinate center_xy as (w/2, h/2) in the output frame, where w is the output frame width and h is the output frame height
(2) Operation 2: When the lens is maintained as a tele lens (e.g., as illustrated in FIG. 32 and FIG. 33, described below) or the lens is maintained as a wide lens (e.g., as illustrated in FIG. 34, FIG. 35, and FIG. 36, described), update center_xy
(3) Operation 3: When the case in operation 2 changes (switch from tele lens to wide lens or switch from wide lens to tele lens), update the target object coordinate to (center_xy[1]±moving_step, center_xy[2]±moving_step), and apply this target object coordinate on the output frame
(4) Operation 4: From operation 3, update center_xy by moving_step to get closer to (w/2, h/2)
(5) Operation 5: Repeat operations 3 and 4 until center_xy=(w/2, h/2)

FIG. 27-FIG. 36 are diagrams illustrating examples using the camera lens switching techniques described above. The examples of FIG. 27-FIG. 36 are described using a telephoto camera lens (shown as "tele frame") as an example of a lens selected (e.g., by a user) as a primary lens and a wide angle lens (shown as "wide frame") as an example of a secondary lens.

Figure 27:
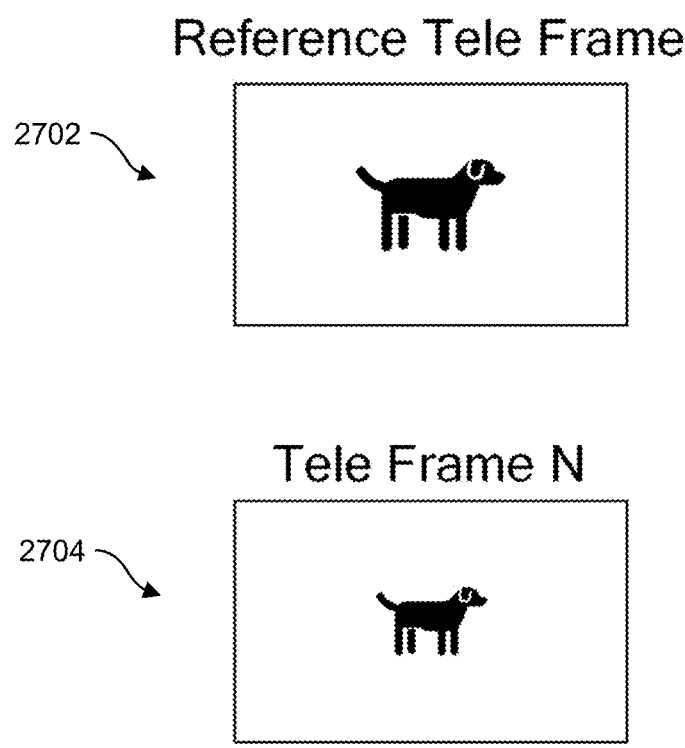

FIG. 27 is a diagram illustrating an example of lens selection. For example, when a size of a target object in a current tele frame 2704 (shown as tele frame N) is smaller than a size of the target object in a reference tele frame 2702, a device or system can determine (e.g., at block 2612 of FIG. 26) to use the tele lens frame 2704 to generate the output frame result. FIG. 28 is another diagram illustrating an example of lens selection. For example, when a size of the target object in a current tele frame 2804 (shown as tele frame M) is larger than a size of the object in a reference tele frame 2802, the device or system can determine to use a wide lens frame 2806 (shown as wide frame M to indicate the wide frame M and the tele frame M are captured at the same time from a same angle with respect to the cameras) to generate the output frame results. FIG. 29 is another diagram illustrating an example of lens selection. For example, when a size of a target object in a current wide frame 2904 (shown as wide frame P) is larger than a size of the object in a reference wide frame 2902, the device or system can determine to use the current wide frame 2904 to generate the output frame results.

Figure 30:
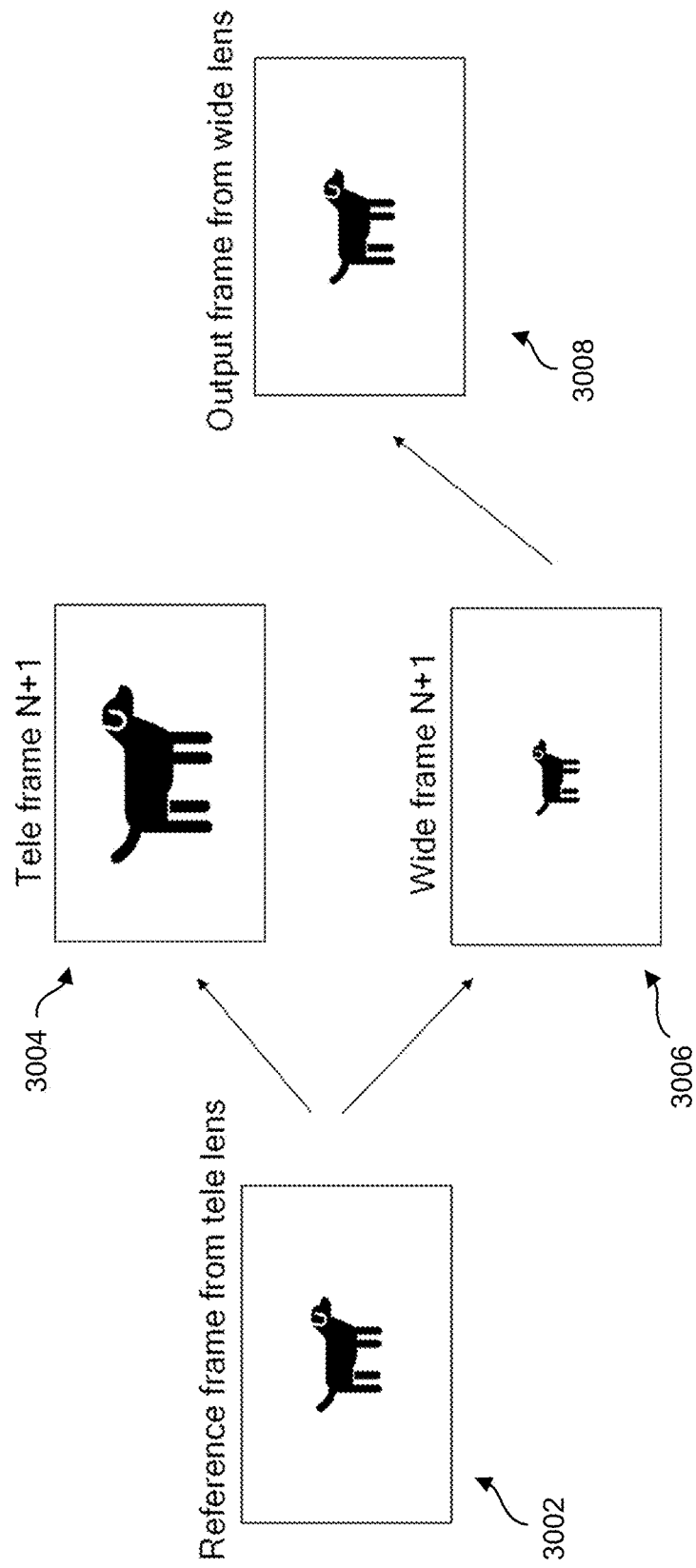

FIG. 30 is a diagram illustrating an example of switching from a tele lens to a wide lens. For example, if an output frame N is generated by a tele frame N and a size of the target object in the current tele frame 3004 (shown as tele frame N+1) is larger than a size of the object in a reference tele frame 3002, the device or system can switch to the wide frame 3006 (shown as wide frame N+1) to generate the output frame 3008.

Figure 31:
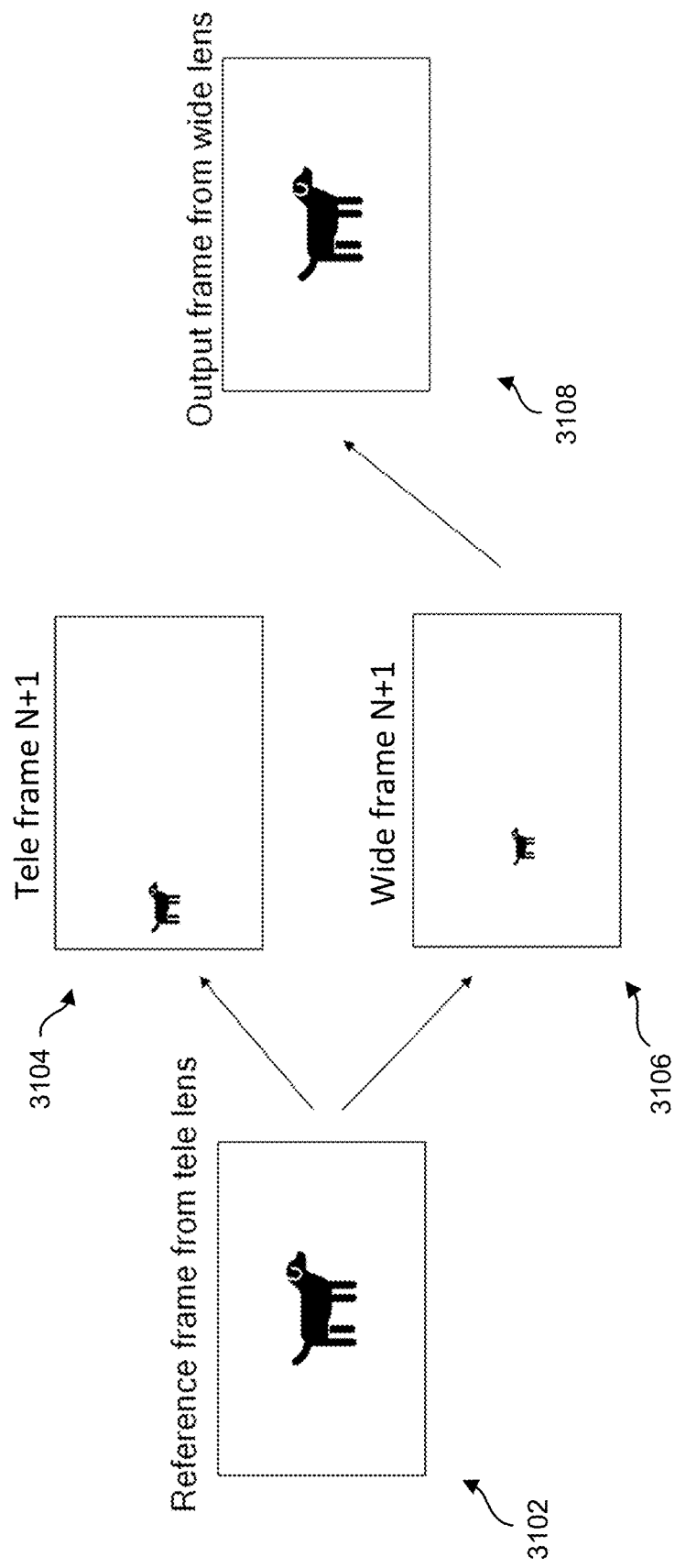

FIG. 31 is another diagram illustrating an example of switching from a tele lens to a wide lens. For example, if an output frame N is generated by a tele frame N and a location of the target in the current tele frame 3104 (shown as tele frame N+1) is near the frame boundary (e.g., in which case the object is not in the center of the frame after scaling or zooming), the device or system can switch from tele to wide frame to generate the output frame 3108. In some cases, the device or system can determine if an object is near the frame boundary by determining if a point of the target object (e.g., center point of the bounding box of the object) is within a threshold distance of the boundary, such as within 10 pixels, 20 pixels, or other distance. The switch from the current tele frame 3104 (captured using the tele lens) to the wide frame 3106 (captured using the wide lens) can be performed when the object is near the boundary even if a size of the target object in the current tele frame 3104 is smaller than the a size of the target object in a reference tele frame 3102.

FIG. 32 is a diagram illustrating an example of switching from a wide lens to a tele lens. For example, if an output frame N is generated by a wide frame N, if a size of a target object in a current wide frame 3206 (shown as wide frame N+1) is smaller than a size of the object in a reference tele frame 3202, and a location of the target object is within the image boundary after zooming in, the device or system can switch from the current wide frame 3206 to the current tele frame 3204 (shown as tele frame N+1) to generate the output frame 3208.

Referring again to FIG. 32, an example of maintaining use of a tele lens is provided. For example, if the output frame N is generated by a tele frame N, if the size of a target object in the current tele frame 3204 (tele frame N+1) is smaller than the size of the target object in the reference tele frame 3202, and the location of the target object is within the image boundary after zooming in, the device or system can continue to use the tele frame 3204 to generate the output frame 3208.

FIG. 33 is a diagram illustrating another example of maintaining use of a tele lens. For example, starting from a current tele frame 3304 (shown as tele frame N), if a size of a target object in a current tele frame 3304 (tele frame N) is smaller than a size of the target object in a reference tele frame 3302, a location of the object is near the frame boundary (e.g., a center point of the target object or a bounding box of the target object is within the threshold distance of the boundary), and the camera lens switching has not occurred within a threshold period (e.g., the camera lens switching has not occurred within a certain number of frames, a certain amount of time, and/or other period), the device or system can continue to use the tele frame 3304 to generate the output frame 3308.

FIG. 34 is a diagram illustrating an example of maintaining use of a wide lens. For example, if a size of a target object in a current wide frame 3408 (shown as wide frame N) is smaller than a size of the target object in a reference wide frame 3404 and the object size in a current tele frame 3406 (shown as tele frame N) is larger than the object size in a reference tele frame 3402, the device or system can continue to use the current wide frame 3408 to generate the output frame 3410.

FIG. 35 is a diagram illustrating another example of maintaining use of a wide lens. For example, if a size of a target object in a current wide frame 3506 (shown as wide frame M) is larger than a size of the target object in a reference wide frame 3502, the device or system can continue to use the current wide frame 3506 to generate the output frame 3510.

FIG. 36 is a diagram illustrating another example of maintaining use of a wide lens. For example, if the output frame N is generated by wide frame N and a location of the target object in a current tele frame 3604 (shown as tele frame N+1) is near the frame boundary (e.g., a center point of the target object or a bounding box of the target object is within the threshold distance of the boundary), in which case the frame may not be able to be scaled or zoomed to get the output frame, the device or system can continue to use the current wide lens frame 3606 (shown as wide lens N+1) to generate the output frame 3608. The device or system can continue to use the current wide lens frame 3606 (shown as wide lens N+1) to generate the output frame 3608 when the object is near the boundary even if a size of the target object in the current tele frame 3604 is smaller than the a size of the target object in a reference tele frame 3602.

FIG. 37-FIG. 41 are images illustrating simulations using the camera lens switching systems and techniques described herein. For example, to simulate dual camera video recording simultaneously, two rear cameras on a mobile phone (e.g., a smartphone) are used, including a tele camera lens a wide camera lens. The dual recorded video starting and ending points are manually aligned from the dual camera lenses. The test sample videos used in the simulation results have 1080P resolution with 30 frame per second (fps). As noted above, an end user can select a target object from a tele lens video frame (e.g., using a touch screen displaying the video frame).

Figure 37:
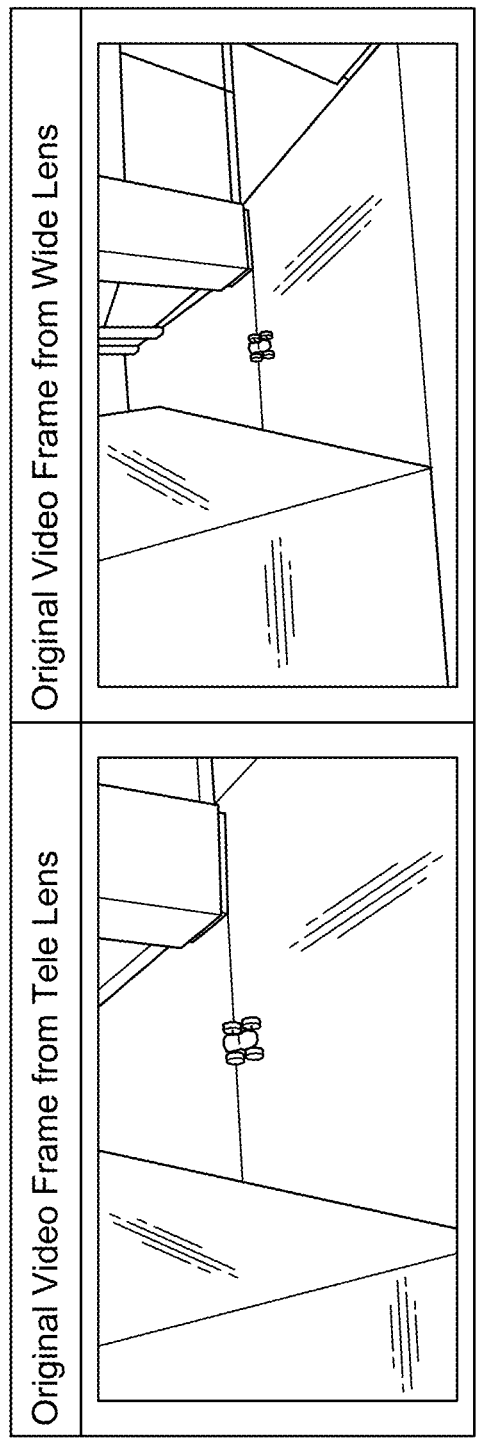
FIG. 37-FIG. 41 are images illustrating simulations using the camera lens switching techniques described herein, in accordance with some examples.
Figure 38:
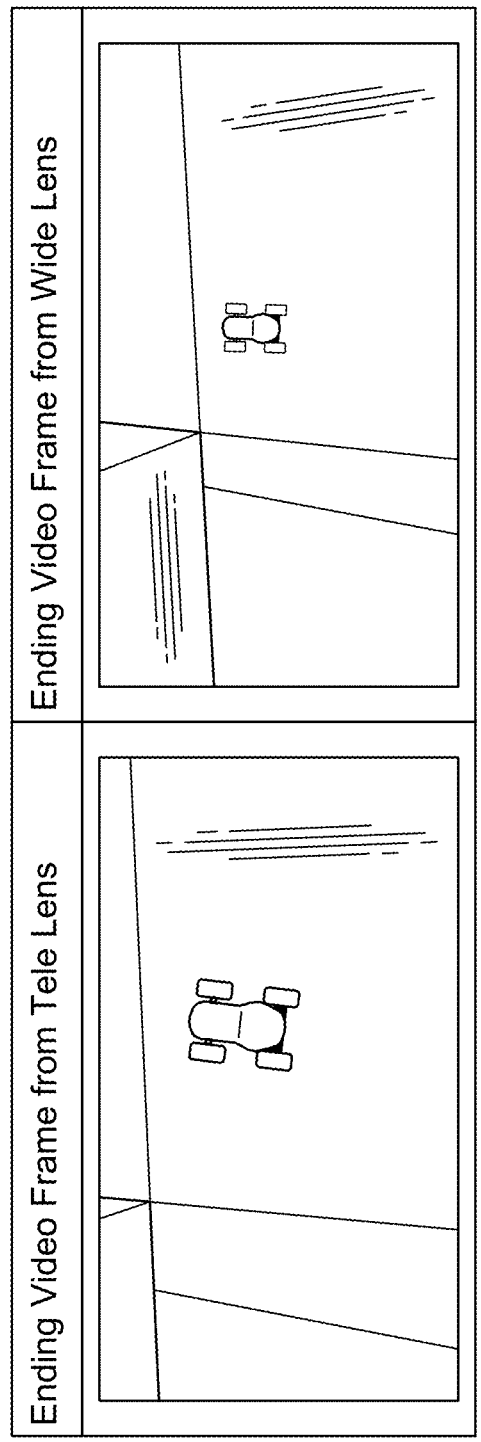
Figure 39:
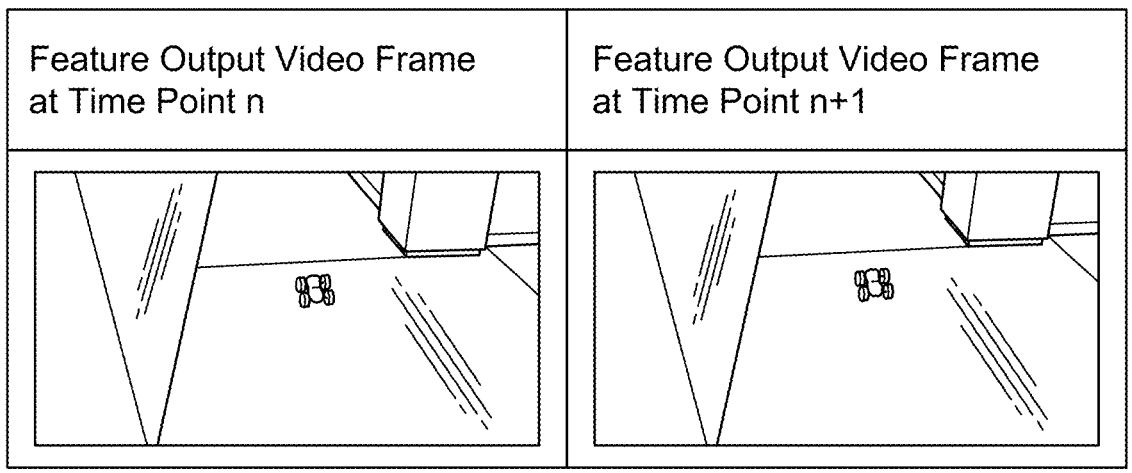
Figure 40:
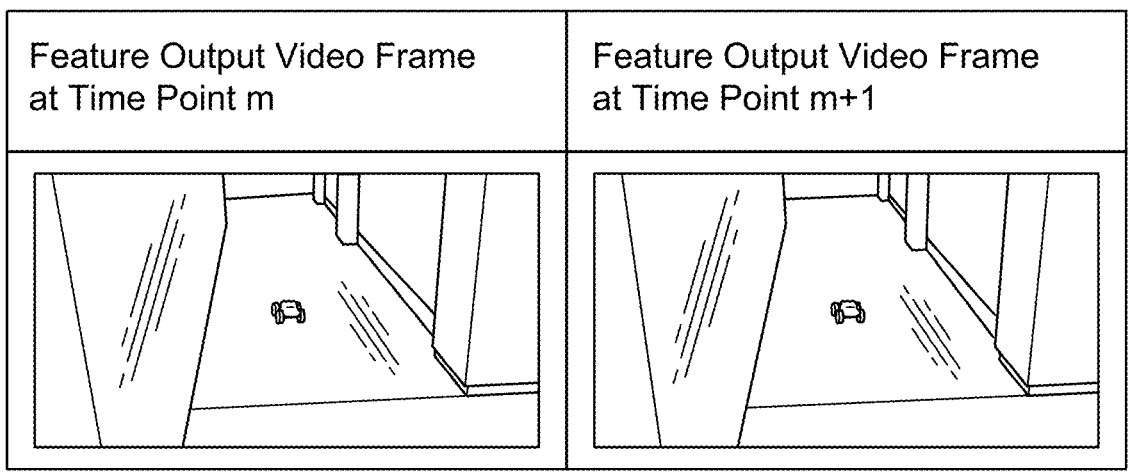
Figure 41:
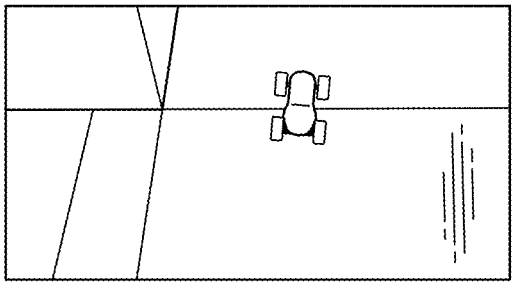

FIG. 37 illustrates a starting or initial video frame from a tele lens (left side of FIG. 37) and a starting or initial video frame from a wide lens (right side of FIG. 37). FIG. 38 illustrates an ending video frame from a tele lens (left side of FIG. 38) and an ending video frame from a wide lens (right side of FIG. 38). FIG. 39 illustrates the target fix size feature applied on the tele lens video frame at time point n (left side of FIG. 39), and the target fix size feature applied on the wide lens video frame at time point n+1 (right side of FIG. 39) after a switch from the tele lens to the wide lens. FIG. 40 illustrates the target fix size feature applied on the wide lens video frame at time point m (left side of FIG. 40), and the target fix size feature applied on the tele lens video frame at time point m+1 (right side of FIG. 40) after a switch from the wide lens to the tele lens. FIG. 41 illustrates the target fix size feature applied on the tele lens video frame at time point p (left side of FIG. 41), and the target fix size feature applied on the wide lens video frame at time point p+1 (right side of FIG. 41) after a switch from the tele lens to the wide lens.

The lens switching systems and techniques described herein provide various advantages. For example, lens switching systems and techniques enable the target fix size feature described above to be used in multi-recorded video scenarios (e.g., in dual recorded video using two camera lenses), while achieving high quality results.

In some examples, the processes described herein (e.g., process 820, 930, 1200, 1300, 1310, 1800, 2500, 2600, and/or other process described herein) may be performed by a computing device or apparatus. In one example, one or more of the processes can be performed by the image capture and processing system 100 of FIG. 1. In another example, one or more of the processes can be performed by the frame cropping and scaling system 800 of FIG. 8B. In another example, one or more of the processes can be performed by the computing system 4700 shown in FIG. 47.

Figure 8C:
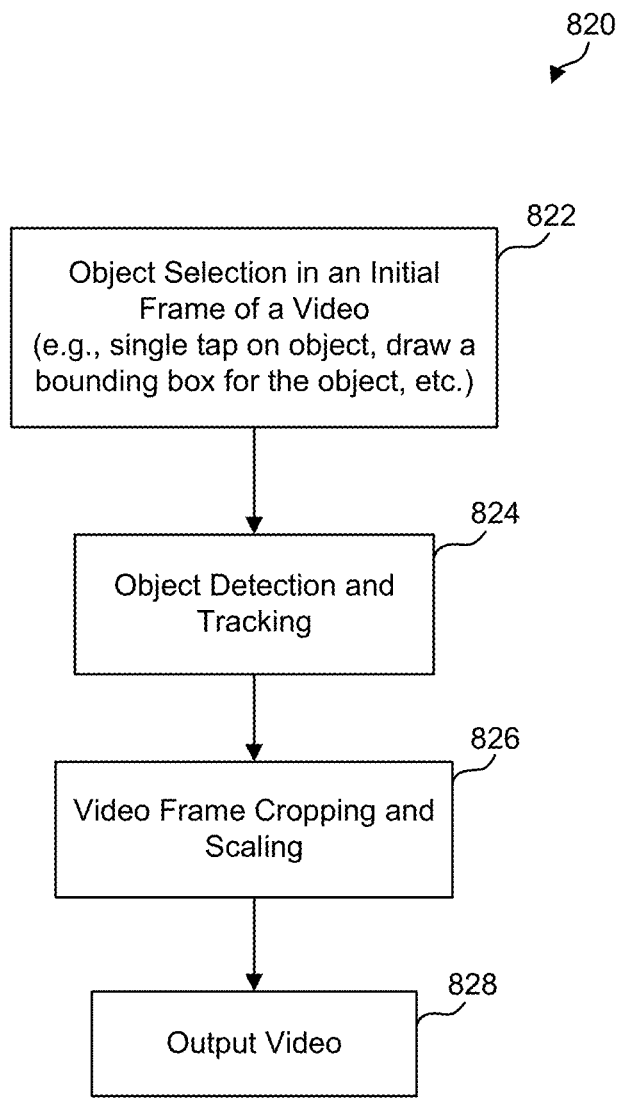
FIG. 8C is a diagram illustrating an example of a frame cropping and scaling process, in accordance with some examples.
Figure 47:
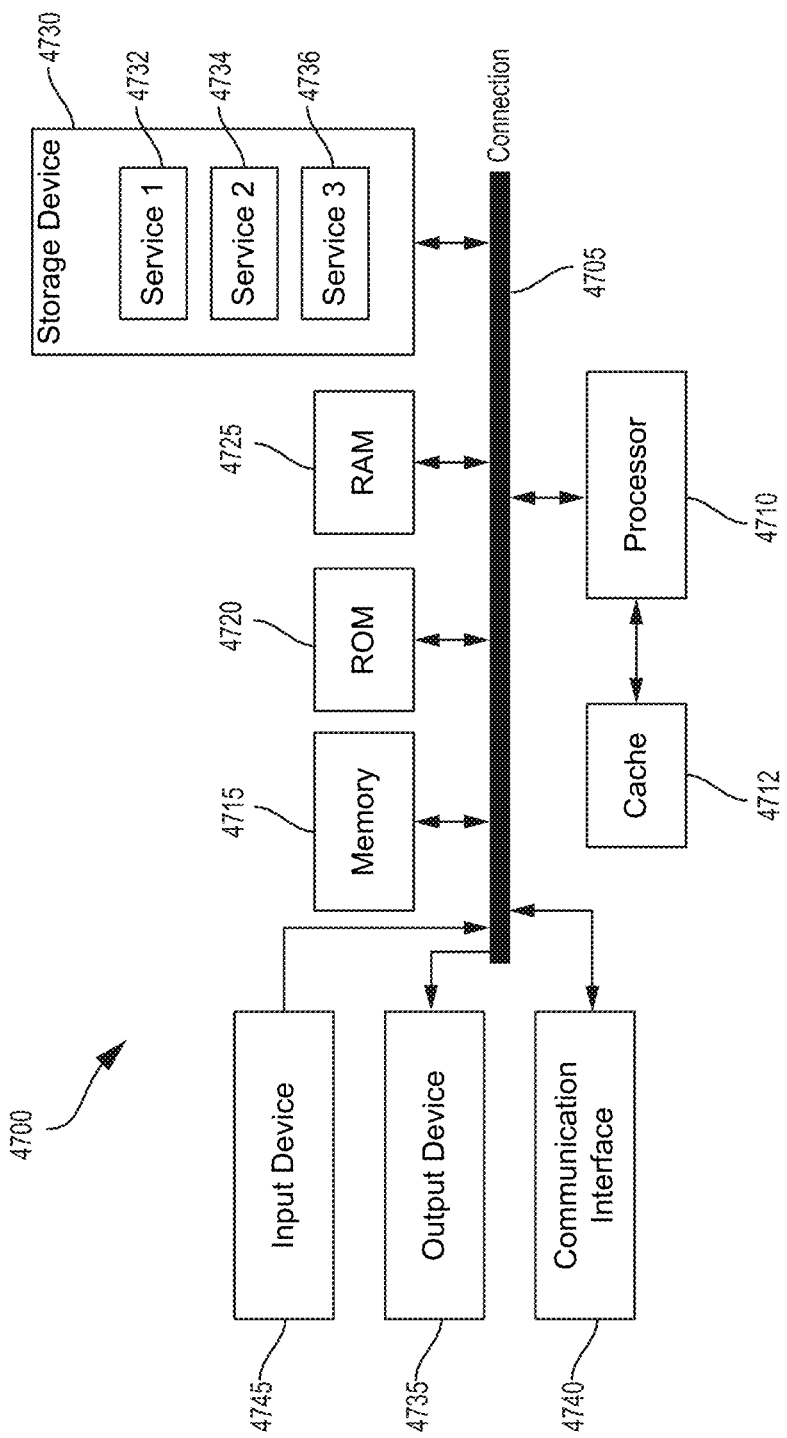
FIG. 47 is a diagram illustrating an example of a system for implementing certain aspects described herein.

For instance, a computing device with the computing system 4700 shown in FIG. 47 can include the components of the frame cropping and scaling system 800 and can implement the operations of the process 820 of FIG. 8C, the process 930 of FIG. 9A, the process 935 of FIG. 9B, the process 1300 of FIG. 13A, the process 1310 of FIG. 13B, the process 1800 of FIG. 18, and/or other process described herein.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the process 820, the process 930, the process 935, the process 1800, and/or other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 820, 930, 1200, 1300, 1310, 1800, 2500, 2600 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 820, 930, 1200, 1300, 1310, 1800, 2500, 2600, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 42:
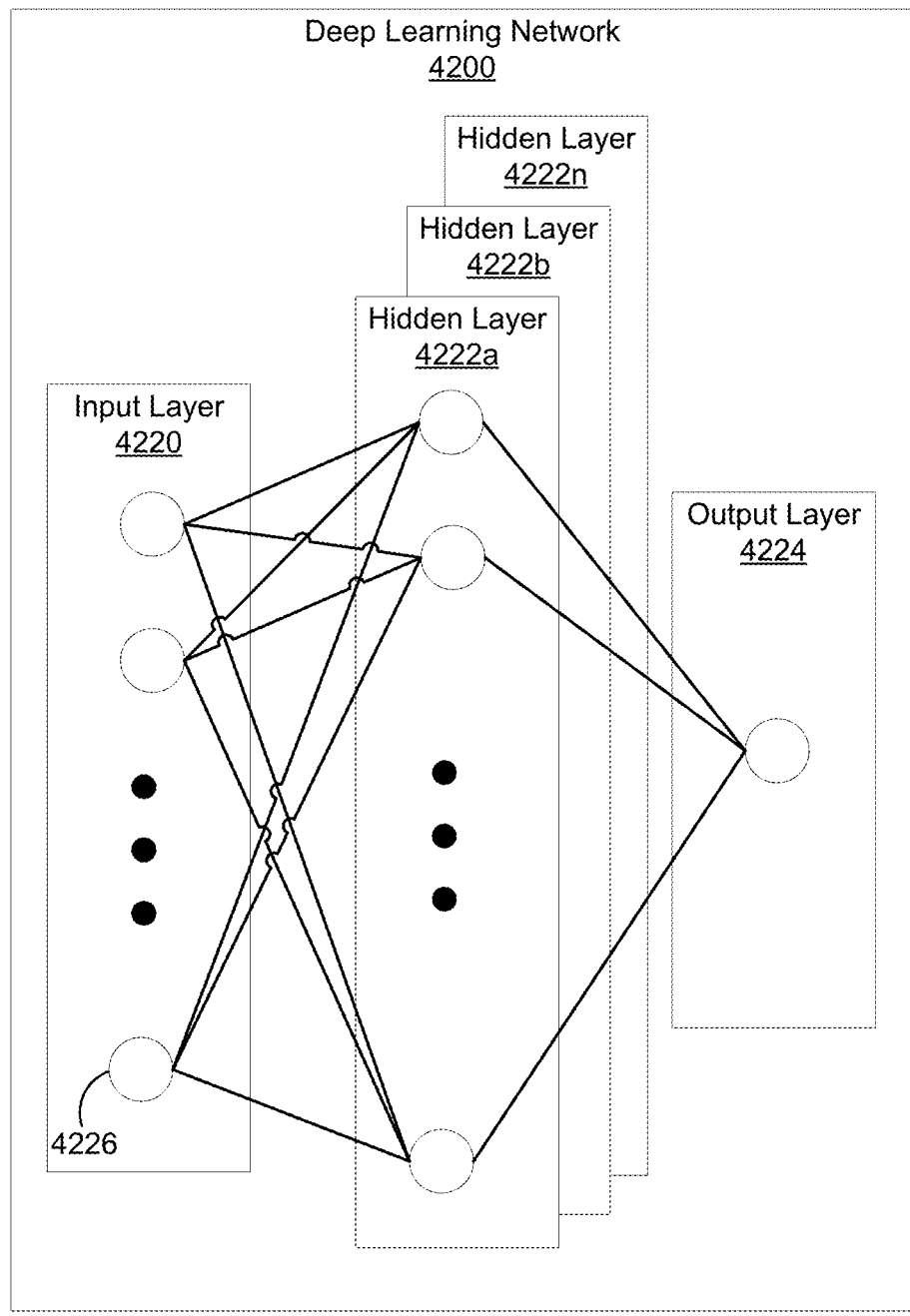
FIG. 42 is a block diagram illustrating an example of a deep learning network, in accordance with some examples.

As noted above, various aspects of the present disclosure can use machine learning systems, such as object tracking, object classification, among others. FIG. 42 is an illustrative example of a deep learning neural network 4200 that can be used to implement the machine learning based object tracking and/or classification described above. An input layer 4220 includes input data. In one illustrative example, the input layer 4220 can include data representing the pixels of an input video frame. The neural network 4200 includes multiple hidden layers 4222a, 4222b, through 4222n. The hidden layers 4222a, 4222b, through 4222n include "n" number of hidden layers, where "n" is an integer greater than or equal to one. The number of hidden layers can be made to include as many layers as needed for the given application. The neural network 4200 further includes an output layer 4224 that provides an output resulting from the processing performed by the hidden layers 4222a, 4222b, through 4222n. In one illustrative example, the output layer 4224 can provide a classification for an object in an input video frame. The classification can include a class identifying the type of object (e.g., a person, a dog, a cat, or other object).

The neural network 4200 is a multi-layer neural network of interconnected nodes. Each node can represent a piece of information. Information associated with the nodes is shared among the different layers and each layer retains information as information is processed. In some cases, the neural network 4200 can include a feed-forward network, in which case there are no feedback connections where outputs of the network are fed back into itself. In some cases, the neural network 4200 can include a recurrent neural network, which can have loops that allow information to be carried across nodes while reading in input.

Information can be exchanged between nodes through node-to-node interconnections between the various layers. Nodes of the input layer 4220 can activate a set of nodes in the first hidden layer 4222a. For example, as shown, each of the input nodes of the input layer 4220 is connected to each of the nodes of the first hidden layer 4222a. The nodes of the first hidden layer 4222a can transform the information of each input node by applying activation functions to the input node information. The information derived from the transformation can then be passed to and can activate the nodes of the next hidden layer 4222b, which can perform their own designated functions. Example functions include convolutional, up-sampling, data transformation, and/or any other suitable functions. The output of the hidden layer 4222b can then activate nodes of the next hidden layer, and so on. The output of the last hidden layer 4222n can activate one or more nodes of the output layer 4224, at which an output is provided. In some cases, while nodes (e.g., node 4226) in the neural network 4200 are shown as having multiple output lines, a node has a single output and all lines shown as being output from a node represent the same output value.

In some cases, each node or interconnection between nodes can have a weight that is a set of parameters derived from the training of the neural network 4200. Once the neural network 4200 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 4200 to be adaptive to inputs and able to learn as more and more data is processed.

The neural network 4200 is pre-trained to process the features from the data in the input layer 4220 using the different hidden layers 4222a, 4222b, through 4222n in order to provide the output through the output layer 4224. In an example in which the neural network 4200 is used to identify objects in images, the neural network 4200 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the neural network 4200 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 4200 is trained well enough so that the weights of the layers are accurately tuned.

For the example of identifying objects in images, the forward pass can include passing a training image through the neural network 4200. The weights are initially randomized before the neural network 4200 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 4200, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 4200 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $$E_{total} = \sum \frac{1}{2}(\text{target} - \text{output})^2,$$

which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 4200 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and $\eta$ denotes a learning rate. The learning rate can be set to any suitable value, with a high learning rate including larger weight updates and a lower value indicating smaller weight updates.

The neural network 4200 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 4200 can include any other deep network other than a CNN, such as an autoencoder, a deep belief nets (DBNs), a Recurrent Neural Networks (RNNs), among others.

Figure 43:
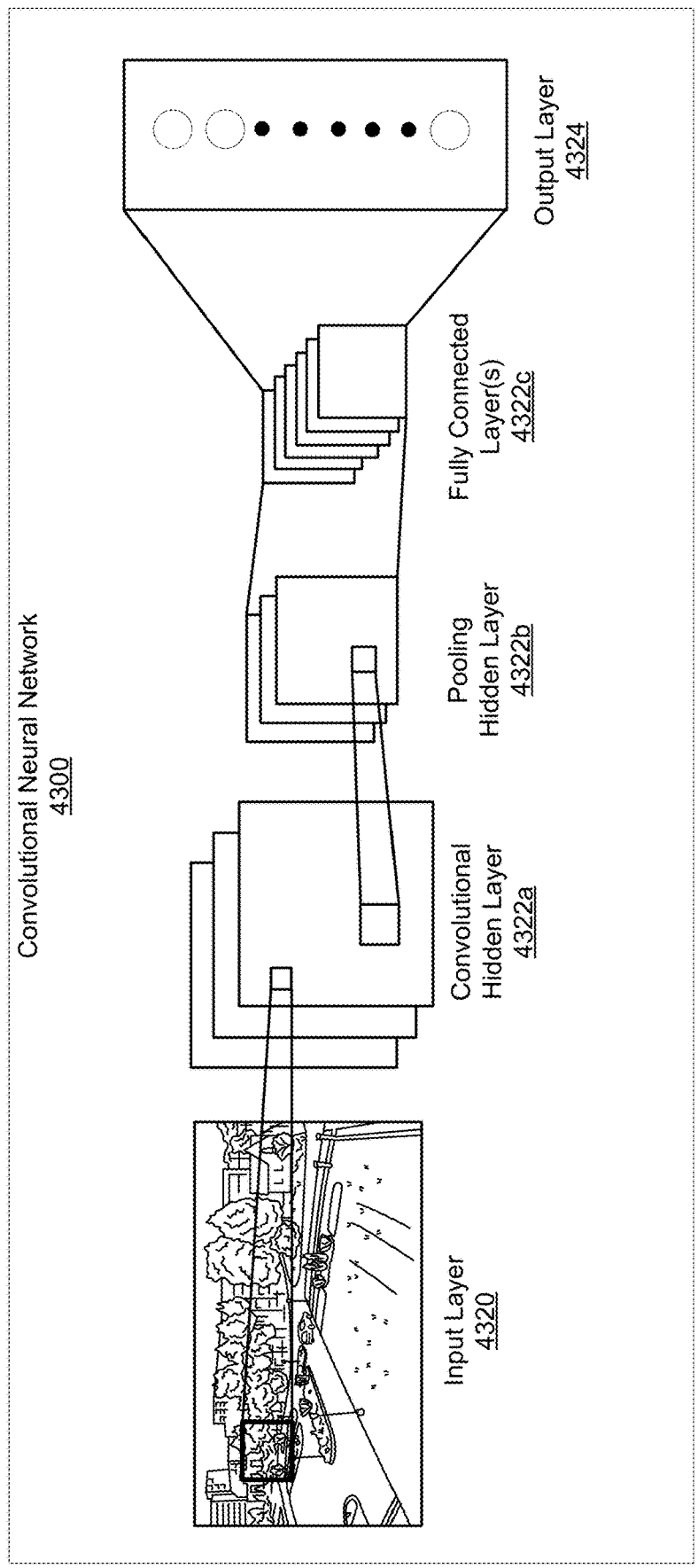
FIG. 43 is a block diagram illustrating an example of a convolutional neural network, in accordance with some examples.

FIG. 43 is an illustrative example of a convolutional neural network (CNN) 4300. The input layer 4320 of the CNN 4300 includes data representing an image. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 4322a, an optional non-linear activation layer, a pooling hidden layer 4322b, and fully connected hidden layers 4322c to get an output at the output layer 4324. While only one of each hidden layer is shown in FIG. 43, one of ordinary skill will appreciate that multiple convolutional hidden layers, non-linear layers, pooling hidden layers, and/or fully connected layers can be included in the CNN 4300. As previously described, the output can indicate a single class of an object or can include a probability of classes that best describe the object in the image.

The first layer of the CNN 4300 is the convolutional hidden layer 4322a. The convolutional hidden layer 4322a analyzes the image data of the input layer 4320. Each node of the convolutional hidden layer 4322a is connected to a region of nodes (pixels) of the input image called a receptive field. The convolutional hidden layer 4322a can be considered as one or more filters (each filter corresponding to a different activation or feature map), with each convolutional iteration of a filter being a node or neuron of the convolutional hidden layer 4322a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 4322a. Each connection between a node and a receptive field for that node learns a weight and, in some cases, an overall bias such that each node learns to analyze its particular local receptive field in the input image. Each node of the hidden layer 4322a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 4322a is due to each node of the convolutional layer being applied to its corresponding receptive field. For example, a filter of the convolutional hidden layer 4322a can begin in the top-left corner of the input image array and can convolve around the input image. As noted above, each convolutional iteration of the filter can be considered a node or neuron of the convolutional hidden layer 4322a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 4322a. For example, a filter can be moved by a step amount (referred to as a stride) to the next receptive field. The stride can be set to 1 or other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 4322a.

The mapping from the input layer to the convolutional hidden layer 4322a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 4322a can include several activation maps in order to identify multiple features in an image. The example shown in FIG. 43 includes three activation maps. Using three activation maps, the convolutional hidden layer 4322a can detect three different kinds of features, with each feature being detectable across the entire image.

In some examples, a non-linear hidden layer can be applied after the convolutional hidden layer 4322a. The non-linear layer can be used to introduce non-linearity to a system that has been computing linear operations. One illustrative example of a non-linear layer is a rectified linear unit (ReLU) layer. A ReLU layer can apply the function f(x)=max(0, x) to all of the values in the input volume, which changes all the negative activations to 0. The ReLU can thus increase the non-linear properties of the network 4300 without affecting the receptive fields of the convolutional hidden layer 4322a.

The pooling hidden layer 4322b can be applied after the convolutional hidden layer 4322a (and after the non-linear hidden layer when used). The pooling hidden layer 4322b is used to simplify the information in the output from the convolutional hidden layer 4322a. For example, the pooling hidden layer 4322b can take each activation map output from the convolutional hidden layer 4322a and generates a condensed activation map (or feature map) using a pooling function. Max-pooling is one example of a function performed by a pooling hidden layer. Other forms of pooling functions be used by the pooling hidden layer 4322a, such as average pooling, L2-norm pooling, or other suitable pooling functions. A pooling function (e.g., a max-pooling filter, an L2-norm filter, or other suitable pooling filter) is applied to each activation map included in the convolutional hidden layer 4322a. In the example shown in FIG. 43, three pooling filters are used for the three activation maps in the convolutional hidden layer 4322a.

In some examples, max-pooling can be used by applying a max-pooling filter (e.g., having a size of 2×2) with a stride (e.g., equal to a dimension of the filter, such as a stride of 2) to an activation map output from the convolutional hidden layer 4322a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 4322a having a dimension of 24×24 nodes, the output from the pooling hidden layer 4322b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 4300.

The final layer of connections in the network is a fully-connected layer that connects every node from the pooling hidden layer 4322b to every one of the output nodes in the output layer 4324. Using the example above, the input layer includes 28×28 nodes encoding the pixel intensities of the input image, the convolutional hidden layer 4322a includes 3×24×24 hidden feature nodes based on application of a 5×5 local receptive field (for the filters) to three activation maps, and the pooling hidden layer 4322b includes a layer of 3×12×12 hidden feature nodes based on application of max-pooling filter to 2×2 regions across each of the three feature maps. Extending this example, the output layer 4324 can include ten output nodes. In such an example, every node of the 3×12×12 pooling hidden layer 4322b is connected to every node of the output layer 4324.

The fully connected layer 4322c can obtain the output of the previous pooling hidden layer 4322b (which should represent the activation maps of high-level features) and determines the features that most correlate to a particular class. For example, the fully connected layer 4322c layer can determine the high-level features that most strongly correlate to a particular class, and can include weights (nodes) for the high-level features. A product can be computed between the weights of the fully connected layer 4322c and the pooling hidden layer 4322b to obtain probabilities for the different classes. For example, if the CNN 4300 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 4324 can include an M-dimensional vector (in the prior example, M=10), where M can include the number of classes that the program has to choose from when classifying the object in the image. Other example outputs can also be provided. Each number in the N-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 44:
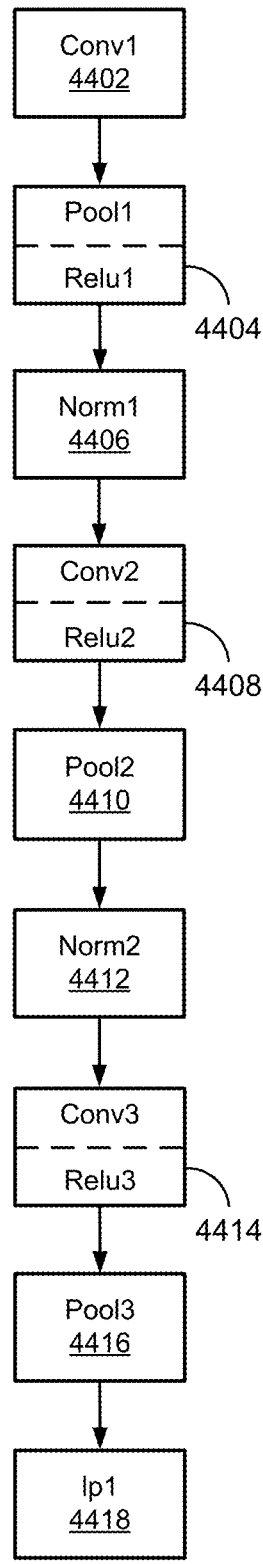
FIG. 44 is a diagram illustrating an example of the Cifar-10 neural network, in accordance with some examples.

Various object detectors can be used to perform object detection and/or classification. One example includes a Cifar-10 neural network based detector. FIG. 44 is a diagram illustrating an example of the Cifar-10 neural network 4400. In some cases, the Cifar-10 neural network can be trained to classify persons and cars only. As shown, the Cifar-10 neural network 4400 includes various convolutional layers (Conv1 layer 4402, Conv2/Relu2 layer 4408, and Conv3/Relu3 layer 4414), numerous pooling layers (Pool1/Relu1 layer 4404, Pool2 layer 4410, and Pool3 layer 4416), and rectified linear unit layers mixed therein. Normalization layers Norm1 4406 and Norm2 4412 are also provided. A final layer is the ip1 layer 4418.

Figure 45C:
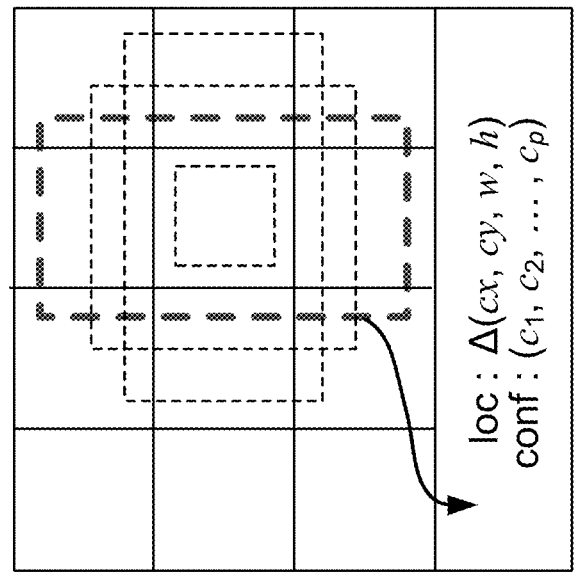
FIG. 45A-FIG. 45C are diagrams illustrating an example of a single-shot object detector, in accordance with some examples.
Figure 45B:
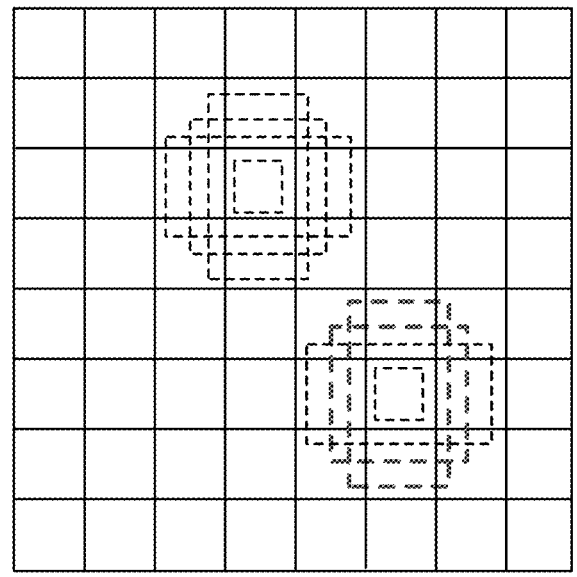
Figure 45A:
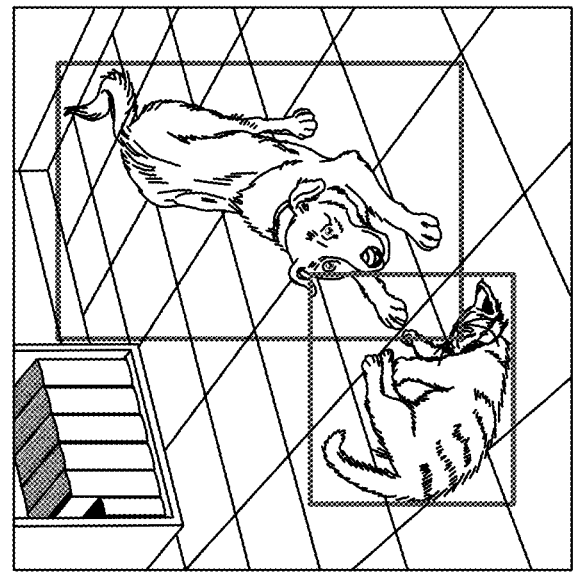

Another deep learning-based detector that can be used to detect and/or classify objects in images includes the SSD detector, which is a fast single-shot object detector that can be applied for multiple object categories or classes. The SSD model uses multi-scale convolutional bounding box outputs attached to multiple feature maps at the top of the neural network. Such a representation allows the SSD to efficiently model diverse box shapes. FIG. 45A includes an image and FIG. 45B and FIG. 45C include diagrams illustrating how an SSD detector (with the VGG deep network base model) operates. For example, SSD matches objects with default boxes of different aspect ratios (shown as dashed rectangles in FIG. 45B and FIG. 45C). Each element of the feature map has a number of default boxes associated with it. Any default box with an intersection-over-union with a ground truth box over a threshold (e.g., 0.4, 0.5, 0.6, or other suitable threshold) is considered a match for the object. For example, two of the 8×8 boxes (shown in blue in FIG. 45B) are matched with the cat, and one of the 4×4 boxes (shown in red in FIG. 45C) is matched with the dog. SSD has multiple features maps, with each feature map being responsible for a different scale of objects, allowing it to identify objects across a large range of scales. For example, the boxes in the 8×8 feature map of FIG. 45B are smaller than the boxes in the 4×4 feature map of FIG. 45C. In one illustrative example, an SSD detector can have six feature maps in total.

For each default box in each cell, the SSD neural network outputs a probability vector of length c, where c is the number of classes, representing the probabilities of the box containing an object of each class. In some cases, a background class is included that indicates that there is no object in the box. The SSD network also outputs (for each default box in each cell) an offset vector with four entries containing the predicted offsets required to make the default box match the underlying object's bounding box. The vectors are given in the format (cx, cy, w, h), with cx indicating the center x, cy indicating the center y, w indicating the width offsets, and h indicating height offsets. The vectors are only meaningful if there actually is an object contained in the default box. For the image shown in FIG. 45A, all probability labels would indicate the background class with the exception of the three matched boxes (two for the cat, one for the dog).

Figure 46A:
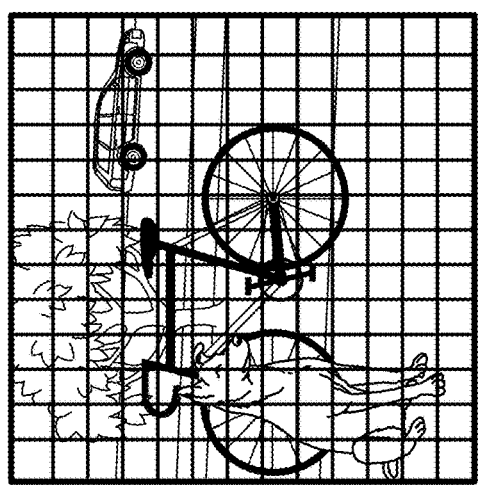
FIG. 46A-FIG. 46C are diagrams illustrating an example of a you only look once (YOLO) detector, in accordance with some examples.
Figure 46B:
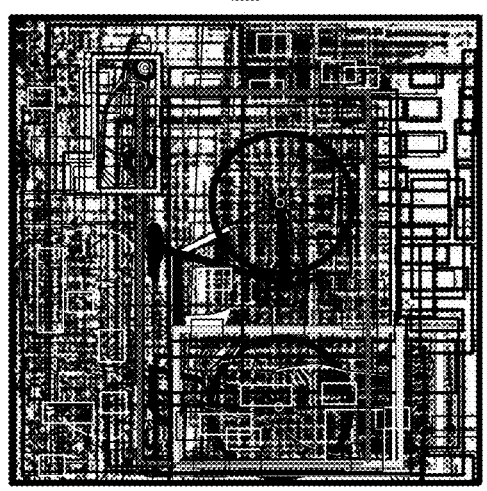

Another deep learning-based detector that can be used to detect and/or classify objects in images includes the You only look once (YOLO) detector, which is an alternative to the SSD object detection system. FIG. 46A includes an image and FIG. 46B and FIG. 46C include diagrams illustrating how the YOLO detector operates. The YOLO detector can apply a single neural network to a full image. As shown, the YOLO network divides the image into regions and predicts bounding boxes and probabilities for each region. These bounding boxes are weighted by the predicted probabilities. For example, as shown in FIG. 46A, the YOLO detector divides up the image into a grid of 13-by-13 cells. Each of the cells is responsible for predicting five bounding boxes. A confidence score is provided that indicates how certain it is that the predicted bounding box actually encloses an object. This score does not include a classification of the object that might be in the box, but indicates if the shape of the box is suitable. The predicted bounding boxes are shown in FIG. 46B. The boxes with higher confidence scores have thicker borders.

Figure 46C:
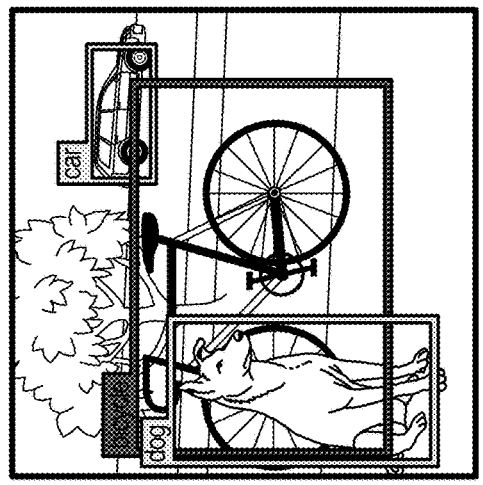

Each cell also predicts a class for each bounding box. For example, a probability distribution over all the possible classes is provided. Any number of classes can be detected, such as a bicycle, a dog, a cat, a person, a car, or other suitable object class. The confidence score for a bounding box and the class prediction are combined into a final score that indicates the probability that that bounding box contains a specific type of object. For example, the yellow box with thick borders on the left side of the image in FIG. 46B is 85% sure it contains the object class "dog." There are 169 grid cells (13×13) and each cell predicts 5 bounding boxes, resulting in 4645 bounding boxes in total. Many of the bounding boxes will have very low scores, in which case only the boxes with a final score above a threshold (e.g., above a 30% probability, 40% probability, 50% probability, or other suitable threshold) are kept. FIG. 46C shows an image with the final predicted bounding boxes and classes, including a dog, a bicycle, and a car. As shown, from the 4645 total bounding boxes that were generated, only the three bounding boxes shown in FIG. 46C were kept because they had the best final scores.

FIG. 47 is a diagram illustrating an example of a system for implementing certain aspects of the present technology. In particular, FIG. 47 illustrates an example of computing system 4700, which can be for example any computing device making up internal computing system, a remote computing system, a camera, or any component thereof in which the components of the system are in communication with each other using connection 4705. Connection 4705 can be a physical connection using a bus, or a direct connection into processor 4710, such as in a chipset architecture. Connection 4705 can also be a virtual connection, networked connection, or logical connection.

In some embodiments, computing system 4700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 4700 includes at least one processing unit (CPU or processor) 4710 and connection 4705 that couples various system components including system memory 4715, such as read-only memory (ROM) 4720 and random access memory (RAM) 4725 to processor 4710. Computing system 4700 can include a cache 4712 of high-speed memory connected directly with, in close proximity to, or integrated as part of processor 4710.

Processor 4710 can include any general purpose processor and a hardware service or software service, such as services 4732, 4734, and 4736 stored in storage device 4730, configured to control processor 4710 as well as a special-purpose processor where software instructions are incorporated into the actual processor design. Processor 4710 may essentially be a completely self-contained computing system, containing multiple cores or processors, a bus, memory controller, cache, etc. A multi-core processor may be symmetric or asymmetric.

To enable user interaction, computing system 4700 includes an input device 4745, which can represent any number of input mechanisms, such as a microphone for speech, a touch-sensitive screen for gesture or graphical input, keyboard, mouse, motion input, speech, etc. Computing system 4700 can also include output device 4735, which can be one or more of a number of output mechanisms. In some instances, multimodal systems can enable a user to provide multiple types of input/output to communicate with computing system 4700. Computing system 4700 can include communications interface 4740, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 4740 may also include one or more Global Navigation Satellite System (GNSS) receivers or transceivers that are used to determine a location of the computing system 4700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 4730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 4730 can include software services, servers, services, etc., that when the code that defines such software is executed by the processor 4710, it causes the system to perform a function. In some embodiments, a hardware service that performs a particular function can include the software component stored in a computer-readable medium in connection with the necessary hardware components, such as processor 4710, connection 4705, output device 4735, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the present disclosure include:

Aspect 1: A method of processing one or more frames, the method comprising: determining a region of interest in a first frame of a sequence of frames, the region of interest in the first frame including an object having a size in the first frame; cropping a portion of a second frame of the sequence of frames, the second frame occurring after the first frame in the sequence of frames; and scaling the portion of the second frame based on the size of the object in the first frame.

Aspect 2: The method of aspect 1, further comprising: receiving user input corresponding to a selection of the object in the first frame; and determining the region of interest in the first frame based on the received user input.

Aspect 3: The method of aspect 2, wherein the user input includes a touch input provided using a touch interface of a device.

Aspect 4: The method of any one of aspects 1 to 3, further comprising: determining a point of an object region determined for the object in the second frame; and cropping and scaling the portion of the second frame with the point of the object region in a center of the cropped and scaled portion.

Aspect 5: The method of aspect 4, wherein the point of the object region is a center point of the object region.

Aspect 6: The method of any one of aspects 1 to 5, wherein scaling the portion of the second frame based on the size of the object in the first frame causes the object in the second frame to have a same size as the object in the first frame Aspect 7: The method of any one of aspects 1 to 6, further comprising: determining a first length associated with the object in the first frame; determining a second length associated with the object in the second frame; determining a scaling factor based on a comparison between the first length and the second length; and scaling the portion of the second frame based on the scaling factor.

Aspect 8: The method of aspect 7, wherein the first length is a length of a first object region determined for the object in the first frame, and wherein the second length is a length of a second object region determined for the object in the second frame.

Aspect 9: The method of aspect 8, wherein the first object region is a first bounding box and the first length is a diagonal length of the first bounding box, and wherein the second object region is a second bounding box and the second length is a diagonal length of the second bounding box.

Aspect 10: The method of any one of aspects 8 or 9, wherein scaling the portion of the second frame based on the scaling factor causes the second object region in the cropped and scaled portion to have a same size as the first object region in the first frame.

Aspect 11: The method of any one of aspects 1 to 10, further comprising: determining a point of a first object region generated for the object in the first frame; determining a point of a second object region generated for the object in the second frame; determining a movement factor for the object based on a smoothing function using the point of the first object region and the point of the second object region, wherein the smoothing function controls a change in position of the object in a plurality of frames of the sequence of frames; and cropping the portion of the second frame based on the movement factor.

Aspect 12: The method of aspect 11, wherein the point of the first object region is a center point of the first object region, and wherein the point of the second object region is a center point of the second object region.

Aspect 13: The method of any one of aspects 11 or 12, wherein the smoothing function includes a moving function, the moving function being used to determine a location of the point of a respective object region in each of a plurality of frames of the sequence of frames based on a statistical measure of object movement.

Aspect 14: The method of any one of aspects 1 to 13, further comprising: determining a first length associated with the object in the first frame; determining a second length associated with the object in the second frame; determining a scaling factor for the object based on a comparison between the first length and the second length and based on a smoothing function using the first length and the second length, wherein the smoothing function controls a change in size of the object in a plurality of frames of the sequence of frames; and scaling the portion of the second frame based on the scaling factor.

Aspect 15: The method of aspect 14, wherein the smoothing function includes a moving function, the moving function being used to determine a length associated with the object in each of a plurality of frames of the sequence of frames based on a statistical measure of object size.

Aspect 16: The method of any one of aspects 14 or 15, wherein the first length is a length of a first bounding box generated for the object in the first frame, and wherein the second length is a length of a second bounding box generated for the object in the second frame.

Aspect 17: The method of aspect 16, wherein the first length is a diagonal length of the first bounding box, and wherein the second length is a diagonal length of the second bounding box.

Aspect 18: The method of any one of aspects 16 or 17, wherein scaling the portion of the second frame based on the scaling factor causes the second bounding box in the cropped and scaled portion to have a same size as the first bounding box in the first frame.

Aspect 19: The method of any one of aspects 1 to 18, wherein the cropping and scaling of the portion of the second frame maintains the object in a center of the second frame.

Aspect 20: The method of any one of aspects 1 to 19, further comprising: detecting and tracking the object in one or more frames of the sequence of frames.

Aspect 21: An apparatus for processing one or more frames, comprising: a memory configured to store at least one frame; and a processor implemented in circuitry and configured to: determine a region of interest in a first frame of a sequence of frames, the region of interest in the first frame including an object having a size in the first frame; crop a portion of a second frame of the sequence of frames, the second frame occurring after the first frame in the sequence of frames; and scale the portion of the second frame to maintain the size of the object in the second frame.

Aspect 22: The apparatus of aspect 21, wherein the processor is configured to: receive user input corresponding to a selection of the object in the first frame; and determine the region of interest in the first frame based on the received user input.

Aspect 23: The apparatus of aspect 22, wherein the user input includes a touch input provided using a touch interface of a device.

Aspect 24: The apparatus of any one of aspects 21 to 23, wherein the processor is configured to: determine a point of an object region determined for the object in the second frame; and crop and scale the portion of the second frame with the point of the object region in a center of the cropped and scaled portion.

Aspect 25: The apparatus of aspect 24, wherein the point of the object region is a center point of the object region.

Aspect 26: The apparatus of any one of aspects 21 to 25, wherein scaling the portion of the second frame based on the size of the object in the first frame causes the object in the second frame to have a same size as the object in the first frame Aspect 27: The apparatus of any one of aspects 21 to 26, wherein the processor is configured to: determine a first length associated with the object in the first frame; determine a second length associated with the object in the second frame; determine a scaling factor based on a comparison between the first length and the second length; and scale the portion of the second frame based on the scaling factor.

Aspect 28: The apparatus of aspect 27, wherein the first length is a length of a first object region determined for the object in the first frame, and wherein the second length is a length of a second object region determined for the object in the second frame.

Aspect 29: The apparatus of aspect 28, wherein the first object region is a first bounding box and the first length is a diagonal length of the first bounding box, and wherein the second object region is a second bounding box and the second length is a diagonal length of the second bounding box.

Aspect 30: The apparatus of any one of aspects 28 or 29, wherein scaling the portion of the second frame based on the scaling factor causes the second object region in the cropped and scaled portion to have a same size as the first object region in the first frame.

Aspect 31: The apparatus of any one of aspects 21 to 30, wherein the processor is configured to: determine a point of a first object region generated for the object in the first frame; determine a point of a second object region generated for the object in the second frame; determine a movement factor for the object based on a smoothing function using the point of the first object region and the point of the second object region, wherein the smoothing function controls a change in position of the object in a plurality of frames of the sequence of frames; and crop the portion of the second frame based on the movement factor.

Aspect 32: The apparatus of aspect 31, wherein the point of the first object region is a center point of the first object region, and wherein the point of the second object region is a center point of the second object region.

Aspect 33: The apparatus of any one of aspects 31 or 32, wherein the smoothing function includes a moving average function, the moving average function being used to determine an average location of the point of a respective object region in each of a plurality of frames of the sequence of frames.

Aspect 34: The apparatus of any one of aspects 21 to 33, wherein the processor is configured to: determine a first length associated with the object in the first frame; determine a second length associated with the object in the second frame; determine a scaling factor for the object based on a comparison between the first length and the second length and based on a smoothing function using the first length and the second length, the smoothing function causing a size of the object to gradually change in a plurality of frames of the sequence of frames; and scale the portion of the second frame based on the scaling factor.

Aspect 35: The apparatus of aspect 34, wherein the smoothing function includes a moving average function, the moving average function being used to determine an average length associated with the object in each of a plurality of frames of the sequence of frames.

Aspect 36: The apparatus of any one of aspects 34 or 35, wherein the first length is a length of a first bounding box generated for the object in the first frame, and wherein the second length is a length of a second bounding box generated for the object in the second frame.

Aspect 37: The apparatus of aspect 36, wherein the first length is a diagonal length of the first bounding box, and wherein the second length is a diagonal length of the second bounding box.

Aspect 38: The apparatus of any one of aspects 34 to 37, wherein scaling the portion of the second frame based on the scaling factor causes the second bounding box in the cropped and scaled portion to have a same size as the first bounding box in the first frame.

Aspect 39: The apparatus of any one of aspects 21 to 38, wherein the cropping and scaling of the portion of the second frame maintains the object in a center of the second frame.

Aspect 40: The apparatus of any one of aspects 21 to 39, wherein the processor is configured to: detect and tracking the object in one or more frames of the sequence of frames.

Aspect 41: The apparatus of any one of aspects 21 to 40, wherein the apparatus comprises a mobile device with a camera for capturing the at least one frame.

Aspect 42: The apparatus of any one of aspects 21 to 41, further comprising a display for displaying the one or more images.

Aspect 43: A computer readable medium having stored thereon instructions that when executed by a processor perform any of the operations of aspects 1 to 40.

Aspect 44: An apparatus comprising means for performing any of the operations of aspects 1 to 40.

What is claimed is:

1. An apparatus for processing one or more frames, the apparatus comprising:
at least one memory; and
at least one processor coupled to the at least one memory and configured to:
determine a region of interest in a first frame of a sequence of frames;
determine a point of a first object region generated for the region of interest in the first frame;
determine a point of a second object region generated for the region of interest in a second frame of the sequence of frames, the second frame being captured after the first frame;
determine a movement factor for the region of interest based on a smoothing function using the point of the first object region and the point of the second object region; and
crop a portion of the second frame based on the movement factor.

2. The apparatus of claim 1, wherein the smoothing function is configured to control a change in position of the region of interest between the first frame and the second frame.

3. The apparatus of claim 1, wherein at least one processor is configured to crop the portion of the second frame further based on a size of the region of interest in the first frame.

4. The apparatus of claim 3, wherein at least one processor is configured to scale the cropped portion of the second frame based on the size of the region of interest in the first frame.

5. The apparatus of claim 4, wherein the region of interest in the second frame has a same size as the region of interest in the first frame based the cropped and scaled portion of the second frame.

6. The apparatus of claim 1, wherein at least one processor is configured to:
determine a first length associated with the region of interest in the first frame;
determine a second length associated with the region of interest in the second frame;
determine a scaling factor for the region of interest based on a comparison between the first length and the second length and based on the smoothing function using the first length and the second length, wherein the smoothing function controls a change in size of the region of interest between the first frame and the second frame; and
scale the cropped portion of the second frame based on the scaling factor.

7. The apparatus of claim 6, wherein the smoothing function includes a moving function, and wherein at least one processor is configured to use the moving function to determine a respective length associated with the region of interest in each of the sequence of frames based on a statistical measure of region of interest size.

8. The apparatus of claim 6, wherein the first length is a length of the first object region, and wherein the second length is a length of the second object region.

9. The apparatus of claim 8, wherein the first length is a diagonal length of the first object region, and wherein the second length is a diagonal length of the second object region.

10. The apparatus of claim 8, wherein the second object region in the cropped and scaled portion have a same size as the first object region in the first frame.

11. The apparatus of claim 1, wherein the point of the first object region is a center point of the first object region, and wherein the point of the second object region is a center point of the second object region.

12. The apparatus of claim 1, wherein the smoothing function includes a moving function, and wherein at least one processor is configured to use the moving function to determine a respective location of the point of a respective object region in each of the sequence of frames based on a statistical measure of region of interest movement.

13. The apparatus of claim 1, wherein the first object region is a first bounding box, and wherein the second object region is a second bounding box.

14. The apparatus of claim 1, wherein at least one processor is configured to:
receive user input corresponding to a selection of an object in the first frame; and
determine the region of interest in the first frame based on the received user input.

15. The apparatus of claim 1, wherein at least one processor is configured to:
detect and track the region of interest in one or more frames of the sequence of frames.

16. A method of processing one or more frames, the method comprising:
determining a region of interest in a first frame of a sequence of frames;
determining a point of a first object region generated for the region of interest in the first frame;
determining a point of a second object region generated for the region of interest in a second frame of the sequence of frames, the second frame being captured after the first frame;
determining a movement factor for the region of interest based on a smoothing function using the point of the first object region and the point of the second object region; and
cropping a portion of the second frame based on the movement factor.

17. The method of claim 16, wherein the smoothing function is configured to control a change in position of the region of interest between the first frame and the second frame.

18. The method of claim 16, wherein the portion of the second frame is cropped further based on a size of the region of interest in the first frame.

19. The method of claim 18, further comprising scaling the cropped portion of the second frame based on the size of the region of interest in the first frame.

20. The method of claim 19, wherein scaling the cropped portion of the second frame based on the size of the region of interest in the first frame causes the region of interest in the second frame to have a same size as the region of interest in the first frame.

21. The method of claim 16, further comprising:
determining a first length associated with the region of interest in the first frame;
determining a second length associated with the region of interest in the second frame;
determining a scaling factor for the region of interest based on a comparison between the first length and the second length and based on the smoothing function using the first length and the second length, wherein the smoothing function controls a change in size of the region of interest between the first frame and the second frame; and
scaling the cropped portion of the second frame based on the scaling factor.

22. The method of claim 21, wherein the smoothing function includes a moving function, the moving function being used to determine a respective length associated with the region of interest in each of the sequence of frames based on a statistical measure of region of interest size.

23. The method of claim 21, wherein the first length is a length of the first object region, and wherein the second length is a length of the second object region.

24. The method of claim 23, wherein the first length is a diagonal length of the first object region, and wherein the second length is a diagonal length of the second object region.

25. The method of claim 23, wherein scaling the cropped portion of the second frame based on the scaling factor causes the second object region in the cropped and scaled portion to have a same size as the first object region in the first frame.

26. The method of claim 16, wherein the point of the first object region is a center point of the first object region, and wherein the point of the second object region is a center point of the second object region.

27. The method of claim 16, wherein the smoothing function includes a moving function, the moving function being used to determine a respective location of the point of a respective object region in each of the sequence of frames based on a statistical measure of region of interest movement.

28. The method of claim 16, wherein the first object region is a first bounding box, and wherein the second object region is a second bounding box.

29. The method of claim 16, further comprising:
    receiving user input corresponding to a selection of an object in the first frame; and
    determining the region of interest in the first frame based on the received user input.

30. The method of claim 16, further comprising:
    detecting and tracking the region of interest in one or more frames of the sequence of frames.

* * * * *